US012388599B2

(12) United States Patent
Yuan et al.

(10) Patent No.: US 12,388,599 B2
(45) Date of Patent: Aug. 12, 2025

(54) USER EQUIPMENT (UE) INITIATED REFERENCE SIGNAL REQUESTS

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/011,039

(22) PCT Filed: Aug. 17, 2021

(86) PCT No.: PCT/CN2021/113022
§ 371 (c)(1),
(2) Date: Dec. 16, 2022

(87) PCT Pub. No.: WO2022/048437
PCT Pub. Date: Mar. 10, 2022

(65) Prior Publication Data
US 2023/0216640 A1    Jul. 6, 2023

(30) Foreign Application Priority Data

Sep. 1, 2020  (WO) ................ PCT/CN2020/112757
Sep. 1, 2020  (WO) ................ PCT/CN2020/112810

(51) Int. Cl.
*H04L 5/00*  (2006.01)
*H04B 7/06*  (2006.01)

(52) U.S. Cl.
CPC .......... *H04L 5/0051* (2013.01); *H04L 5/0053* (2013.01); *H04B 7/0626* (2013.01)

(58) Field of Classification Search
CPC .... H04L 5/0051; H04L 5/0053; H04B 7/0626
See application file for complete search history.

(56) References Cited

U.S. PATENT DOCUMENTS

| 2018/0287757 | A1* | 10/2018 | Onggosanusi ........ H04L 5/0092 |
| 2019/0273637 | A1  | 9/2019  | Zhang et al. |
| 2019/0356431 | A1  | 11/2019 | Manolakos et al. |
| 2022/0103227 | A1  | 3/2022  | Lee et al. |
| 2023/0345468 | A1* | 10/2023 | He .................... H04L 1/1864 |

FOREIGN PATENT DOCUMENTS

| CN | 103813375 A | 5/2014 |
| CN | 105848281 A | 8/2016 |

(Continued)

OTHER PUBLICATIONS

Qualcomm Incorporated, "RAT-dependent DL-only positioning techniques", 3GPP TSG-RAN WG1 Meeting AH-1901, Taipei, Taiwan, Jan. 21-25, 2019, R1-1900914 (Year: 2019).*

(Continued)

*Primary Examiner* — Joseph A Bednash
(74) *Attorney, Agent, or Firm* — Arun Swain

(57) ABSTRACT

A user equipment (UE) and a base station (BS) may transmit reference signals (RS) for the other device to estimate a channel and perform measurements. This disclosure provides for a UE to request a reference signal such as a channel state information (CSI) or a sounding reference signal (SRS). The BS transmits a radio resource control (RRC) message that configures the UE with one or more trigger states for CSI, SRS, or a combination thereof and a media access control (MAC) control element (CE) that activates a subset of the configured trigger states. In one aspect, the UE transmits an uplink request that indicates a trigger state for the UE. corresponding to at least one configured RS. The UE (Continued)

and the BS communicate the at least one RS corresponding to the trigger state for example, based on a grant from the BS or a time offset from the uplink request.

27 Claims, 24 Drawing Sheets

(56) References Cited

FOREIGN PATENT DOCUMENTS

| | | |
|---|---|---|
| CN | 109413739 A | 3/2019 |
| CN | 110034875 A | 7/2019 |
| CN | 110149187 A | 8/2019 |
| CN | 110582980 A | 12/2019 |
| CN | 110662301 A | 1/2020 |
| CN | 111106919 A | 5/2020 |
| CN | 111201733 A | 5/2020 |
| EP | 3697014 A1 | 8/2020 |
| WO | 2019189751 A1 | 10/2019 |
| WO | 2020015614 A1 | 1/2020 |
| WO | 2020038546 A1 | 2/2020 |
| WO | 2020103011 | 5/2020 |
| WO | 2020159172 A1 | 8/2020 |

OTHER PUBLICATIONS

Final Report of 3GPP TSG RAN WG1 #99 v1.0.0 (Reno, USA, Nov. 18-22, 2019), 3GPP TSG RAN WG1 Meeting #100 -e, e-Meeting, Feb. 24-Mar. 6, 2020, R1-2000151 (Year: 2020).*

International Search Report and Written Opinion—PCT/CN2020/112757—ISA/EPO'May 26, 2021.
International Search Report and Written Opinion—PCT/CN2021/113022—ISA/EPO—Nov. 18, 2021.
Mediatek Inc: "Clarifications on Beam Management", 3GPP Draft, 3GPP TSG RAN WG1 Meeting AH1801, R1-1800159_BM_FINAL, 3rd Generation Partnership Project (3GPP), Mobile Competence Centre, 650, Route Des Lucioles, F-06921 Sophia-Antipolis Cedex, France, vol. RAN WG1, No. Vancouver, Jan. 22, 2018-Jan. 26, 2018, Jan. 13, 2018 (Jan. 13, 2018), XP051384649, 10 Pages, p. 1, 1 Introduction pp. 3-7, 3. Configuration for UL Beam Management.
Moderator (CATT): "FL Summary for Potential Positioning Enhancements", 3GPP Draft, 3GPP TSG RAN WG1 Meeting #102-e, R1-2006972, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, Aug. 21, 2020 (Aug. 21, 2020), XP051921156, 68 Pages, p. 53, Chapter 5.7 Methods for Reducing Positioning Latency, p. 54, Proposal 11, Section 5.2 and 5.3.
NOKIA: "Introduction of NR URLLC Support", R1-1913650, 3GPP TSG-RAN WG1 Meeting #99, Reno, USA, Nov. 18-22, 2019 (Nov. 22, 2019), 56 Pages, section 5.1 and 6.1.
International Search Report and Written Opinion—PCT/CN2020/112810—ISA/EPO—Jun. 1, 2021.
SONY: "Summary of SRS," 3GPP TSG RAN WG1 Meeting #92, R1-1803410, Athens, Greece, Feb. 26-Mar. 2, 2018, (Feb. 3, 2018), the whole document, 31 pages.
Supplementary European Search Report—EP21863504—Search Authority—The Hague—Sep. 9, 2024.

* cited by examiner

USER EQUIPMENT (UE) INITIATED REFERENCE SIGNAL REQUESTS

CROSS REFERENCE TO RELATED APPLICATIONS

This application is a 35 U.S.C. § 371 National Phase of International Patent Application No. PCT/CN2021/113022 titled "USER EQUIPMENT (UE) INITIATED REFERENCE SIGNAL REQUESTS," filed on Aug. 17, 2021, which claims priority to International Application Number PCT/CN2020/112757 titled "USER EQUIPMENT (UE) INITIATED REFERENCE SIGNAL REQUESTS," filed Sep. 1, 2020 and International Application Number PCT/CN2020/112810 titled "MEDIA ACCESS CONTROL (MAC) CONTROL ELEMENT (CE) BASED ACTIVATION FOR USER EQUIPMENT (UE) INITIATED REFERENCE SIGNAL REQUESTS," filed Sep. 1, 2020, both of which are assigned to the assignee hereof, and incorporated herein by reference in their entirety.

TECHNICAL FIELD

The present disclosure relates to user equipment (UE) initiated reference signal requests.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include transmitting an uplink request for at least one reference signal, the uplink request indicating a trigger state for the UE. The method may include communicating the at least one reference signal corresponding to the trigger state in response to the uplink request.

In some implementations, the method may further include receiving a downlink control information (DCI) scheduling the at least one reference signal.

In some implementations, transmitting the uplink request includes transmitting the uplink request on an uplink resource defined by a mapping from the trigger state to the uplink resource.

In some implementations, the method further includes: receiving a radio resource control (RRC) configuration message indicating one or more CSI trigger states or SRS trigger states for the uplink request for the at least one reference signal; and receiving a media access control (MAC) control element (CE) that activates a subset of the one or more CSI trigger states or SRS trigger states. There is a one-to-one mapping between activated trigger states and physical uplink resources, and where transmitting the request for the at least one reference signal is on a physical uplink resource corresponding to the indicated trigger state of the UE.

Another innovative aspect of the subject matter described in this disclosure can be implemented in an apparatus for wireless communication including an interface and a processing system coupled to the interface. The processing system is configured to output an uplink request for at least one reference signal, the uplink request indicating a trigger state for the UE. The processing system is configured to communicate, via the interface, the at least one reference signal corresponding to the trigger state in response to the uplink request. The apparatus can be configured to perform any of the innovative method aspects.

Another innovative aspect of the subject matter described in this disclosure can be implemented in an apparatus for wireless communication. The apparatus includes means for transmitting an uplink request for at least one reference signal, the uplink request indicating a trigger state for the UE. The apparatus includes means for communicating the at least one reference signal corresponding to the trigger state in response to the uplink request. The apparatus can be configured to perform any of the innovative method aspects.

Another innovative aspect of the subject matter described in this disclosure can be implemented in a non-transitory computer-readable medium including stored instructions for wireless communication at an apparatus of a UE. The non-transitory computer-readable medium includes instructions to transmit an uplink request for at least one reference signal, the uplink request indicating a trigger state for the UE. The non-transitory computer-readable medium includes instructions to communicate the at least one reference signal corresponding to the trigger state in response to the uplink request. The non-transitory computer-readable medium can include instructions to perform any of the innovative method aspects.

One innovative aspect of the subject matter described in this disclosure can be implemented in a method of wireless communication at an apparatus of a base station (BS). The method may include receiving, from a UE, an uplink request for at least one reference signal, the uplink request indicating a trigger state for the UE. The method may include communicating the at least one reference signal corresponding to the trigger state in response to the uplink request.

In some implementations, the method further includes transmitting a DCI scheduling the at least one reference signal.

In some implementations, receiving the uplink request includes determining the trigger state based on a mapping between the trigger state and an uplink resource on which the uplink request is received.

In some implementations, the method further includes: transmitting a RRC configuration message indicating one or more CSI trigger states or SRS trigger states for the uplink request for the at least one reference signal; and transmitting a MAC-CE that activates a subset of the one or more CSI trigger states or SRS trigger states. There is a one-to-one mapping between activated trigger states and physical uplink resources, and where receiving the request for the at least one reference signal is on a physical uplink resource corresponding to the indicated trigger state of the UE.

Another innovative aspect of the subject matter described in this disclosure can be implemented in an apparatus for wireless communication including an interface and a processing system coupled to the interface. The processing system is configured to obtain an uplink request for at least one reference signal, the uplink request indicating a trigger state for a UE. The processing system is configured to communicate the at least one reference signal corresponding to the trigger state in response to the uplink request. The apparatus can be configured to perform any of the innovative method aspects.

Another innovative aspect of the subject matter described in this disclosure can be implemented in an apparatus for wireless communication. The apparatus includes means for receiving, from a UE, an uplink request for at least one reference signal, the uplink request indicating a trigger state for the UE. The apparatus includes means for communicating the at least one reference signal corresponding to the trigger state in response to the uplink request. The apparatus can be configured to perform any of the innovative method aspects.

Another innovative aspect of the subject matter described in this disclosure can be implemented in a non-transitory computer-readable medium including stored instructions for wireless communication at an apparatus of a BS. The non-transitory computer-readable medium includes instructions to receive, from a UE, an uplink request for at least one reference signal, the uplink request indicating a trigger state for the UE. The non-transitory computer-readable medium includes instructions to communicate the at least one reference signal corresponding to the trigger state in response to the uplink request. The non-transitory computer-readable medium can include instructions to perform any of the innovative method aspects.

One innovative aspect of the subject matter described in this disclosure can be implemented in a method of wireless communication at an apparatus of a user equipment (UE). The method may include receiving a radio resource control (RRC) configuration message indicating one or more channel state information (CSI) trigger states, one or more sounding reference signal (SRS) trigger states, or a combination thereof for a UE initiated uplink reference signal (RS) request. The method may include receiving a media access control (MAC) control element (CE) that activates a subset of the one or more CSI trigger states, the one or more SRS trigger states, or the combination thereof. There is a one-to-one mapping between the activated subset of the one or more CSI trigger states, the one or more SRS trigger states, or the combination thereof and one or more physical uplink resources. The method may include selecting an activated trigger state from the activated subset of the one or more CSI trigger states, the one or more SRS trigger states, or the combination thereof. The method may include transmitting the UE initiated uplink RS request on a physical uplink resource of the one or more physical uplink resources that corresponds to the selected activated trigger state based on the one-to-one mapping.

In some implementations, the one or more CSI trigger states, the one or more SRS trigger states, or the combination thereof are also for a downlink scheduled reference signal.

In some implementations, the MAC-CE also activates the subset of the one or more CSI trigger states, the one or more SRS trigger states, or the combination thereof for the downlink scheduled reference signal.

In some implementations, the MAC-CE activates the subset of the one or more CSI trigger states, the one or more SRS trigger states, or the combination thereof for uplink RS requests.

In some implementations, the MAC-CE downselects the subset of the one or more CSI trigger states, the one or more SRS trigger states, or the combination thereof for uplink RS requests from a set of one or more CSI trigger states or one or more SRS trigger states for a downlink scheduled reference signal.

In some implementations, the one or more CSI trigger states are separate from a configuration of CSI trigger states for downlink scheduled CSI-RS, or the one or more SRS trigger states are separate from a configuration of SRS trigger states for downlink scheduled SRS.

In some implementations, the MAC-CE activates the one or more CSI trigger states, the one or more SRS trigger states, or the combination thereof are for different component carriers.

In some implementations, the MAC-CE includes a request identifier (ID), a serving cell ID, and a bandwidth part ID for each of the different component carriers.

Another innovative aspect of the subject matter described in this disclosure can be implemented in an apparatus for wireless communication including an interface and a processing system coupled to the interface. The interface is configured to obtain a RRC configuration message indicating one or more CSI trigger states, one or more SRS trigger states, or a combination thereof for a UE initiated uplink RS request. The interface is configured to obtain a MAC-CE that activates a subset of the one or more CSI trigger states, the one or more SRS trigger states, or the combination thereof. There is a one-to-one mapping between the activated subset of the one or more CSI trigger states, the one or more SRS trigger states, or the combination thereof and one or more physical uplink resources. The processing system is configured to select an activated trigger state from the activated subset of the one or more CSI trigger states, the one or more SRS trigger states, or the combination thereof. The interface is further configured to output the UE initiated uplink RS request on a physical uplink resource of the one or more physical uplink resources that corresponds to the selected activated trigger state. The apparatus can be configured to perform any of the innovative method aspects.

Another innovative aspect of the subject matter described in this disclosure can be implemented in an apparatus for wireless communication. The apparatus includes means for receiving a RRC configuration message indicating one or more CSI trigger states, one or more SRS trigger states, or a combination thereof. The apparatus includes means for receiving a MAC-CE that activates a subset of the one or more CSI trigger states, the one or more SRS trigger states, or the combination thereof. There is a one-to-one mapping between the activated subset of the one or more CSI trigger states, the one or more SRS trigger states, or the combination thereof and one or more physical uplink resources. The apparatus includes means for selecting an activated trigger state from the activated subset of the one or more CSI trigger states, the one or more SRS trigger states, or the combination thereof. The apparatus includes means for transmitting the UE initiated uplink RS request on a physical uplink resource of the one or more physical uplink resources that corresponds to the selected activated trigger state. The apparatus can be configured to perform any of the innovative method aspects.

Another innovative aspect of the subject matter described in this disclosure can be implemented in a non-transitory computer-readable medium including stored instructions for wireless communication at an apparatus of a UE. The non-transitory computer-readable medium includes instructions to receive a RRC configuration message indicating one or more CSI trigger states, one or more SRS trigger states, or a combination thereof for a UE initiated uplink RS request. The non-transitory computer-readable medium includes instructions to receive a MAC-CE that activates a subset of the one or more CSI trigger states, the one or more SRS trigger states, or the combination thereof. There is a one-to-one mapping between the activated subset of the one or more CSI trigger states, the one or more SRS trigger states, or the combination thereof and one or more physical uplink resources. The non-transitory computer-readable medium includes instructions to select an activated trigger state from the activated subset of the one or more CSI trigger states, the one or more SRS trigger states, or the combination thereof. The non-transitory computer-readable medium includes instructions to transmit the UE initiated uplink RS request on a physical uplink resource of the one or more physical uplink resources that corresponds to the selected activated trigger state. The non-transitory computer-readable medium can include instructions to perform any of the innovative method aspects.

One innovative aspect of the subject matter described in this disclosure can be implemented in a method of wireless communication at an apparatus of a BS. The method may include transmitting a RRC configuration message indicating one or more CSI trigger states, one or more SRS trigger states, or a combination thereof for a UE initiated uplink RS request. The method may include transmitting a MAC-CE that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources. The method may include receiving the UE initiated uplink RS request on a physical uplink resource of the one or more physical uplink resources. The method may include determining that the UE initiated uplink RS request corresponds to an activated trigger state from the activated subset of the one or more CSI trigger states, the one or more SRS trigger states, or the combination thereof based on the one-to-one mapping.

In some implementations, the one or more CSI trigger states, the one or more SRS trigger states, or the combination thereof are also for a downlink scheduled reference signal.

In some implementations, the MAC-CE also activates the subset of the one or more CSI trigger states, the one or more SRS trigger states, or the combination thereof for the downlink scheduled reference signal.

In some implementations, the MAC-CE activates the subset of the one or more CSI trigger states, the one or more SRS trigger states, or the combination thereof for uplink RS requests.

In some implementations, the MAC-CE downselects the subset of the one or more CSI trigger states, the one or more SRS trigger states, or the combination thereof for uplink RS requests from a set of one or more CSI trigger states or one or more SRS trigger states for a downlink scheduled reference signal.

In some implementations, the one or more CSI trigger states are separate from a configuration of CSI trigger states for downlink scheduled CSI-RS, or the one or more SRS trigger states are separate from a configuration of SRS trigger states for downlink scheduled SRS.

In some implementations, the MAC-CE activates the one or more CSI trigger states, the one or more SRS trigger states, or the combination thereof for different component carriers.

In some implementations, the MAC-CE includes a request identifier (ID), a serving cell ID, and a bandwidth part ID for each of the different component carriers.

Another innovative aspect of the subject matter described in this disclosure can be implemented in an apparatus for wireless communication including at least one interface and a processing system coupled to the at least one interface. The at least one interface is configured to output a RRC configuration message indicating one or more CSI trigger states, one or more SRS trigger states, or a combination thereof for a UE initiated uplink RS request. The at least one interface is configured to output a MAC-CE that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources. The at least one interface is configured to obtain the UE initiated uplink RS request on a physical uplink resource of the one or more physical uplink resources. The processing system is configured to determine that the UE initiated uplink RS request corresponds to an activated trigger state from the activated subset of the one or more CSI trigger states, the one or more SRS trigger states, or the combination thereof based on the one-to-one mapping. The apparatus can be implemented in a base station (BS). The apparatus can be configured to perform any of the innovative method aspects.

Another innovative aspect of the subject matter described in this disclosure can be implemented in an apparatus for wireless communication. The apparatus includes means for transmitting a RRC configuration message indicating one or more CSI trigger states, one or more SRS trigger states, or a combination thereof for a UE initiated uplink RS request. The apparatus includes means for transmitting a MAC-CE that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources. The apparatus includes means for receiving the UE initiated uplink RS request on a physical uplink resource of the one or more physical uplink resources. The apparatus includes means for determining that the UE initiated uplink RS request corresponds to an activated trigger state from the activated subset of the one or more CSI trigger states, the one or more SRS trigger states, or the combination thereof based on the one-to-one mapping. The apparatus can be configured to perform any of the innovative method aspects.

Another innovative aspect of the subject matter described in this disclosure can be implemented in a non-transitory computer-readable medium including stored instructions for wireless communication at an apparatus of a BS. The non-transitory computer-readable medium includes instructions to transmit a RRC configuration message indicating one or more CSI trigger states, one or more SRS trigger states, or a combination thereof for a UE initiated uplink RS request. The non-transitory computer-readable medium includes instructions to transmit a MAC-CE that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources. The non-transitory computer-readable medium includes instructions to receive the UE initiated uplink RS request on a physical uplink resource of the one or more physical uplink resources. The non-transitory computer-readable medium includes instructions to determine that the UE initiated uplink RS request corresponds an activated trigger state from the activated subset of the one or more CSI trigger states, the one or more SRS trigger states, or the combination thereof based on the one-to-one mapping. The non-transitory computer-readable medium can include instructions to perform any of the innovative method aspects.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
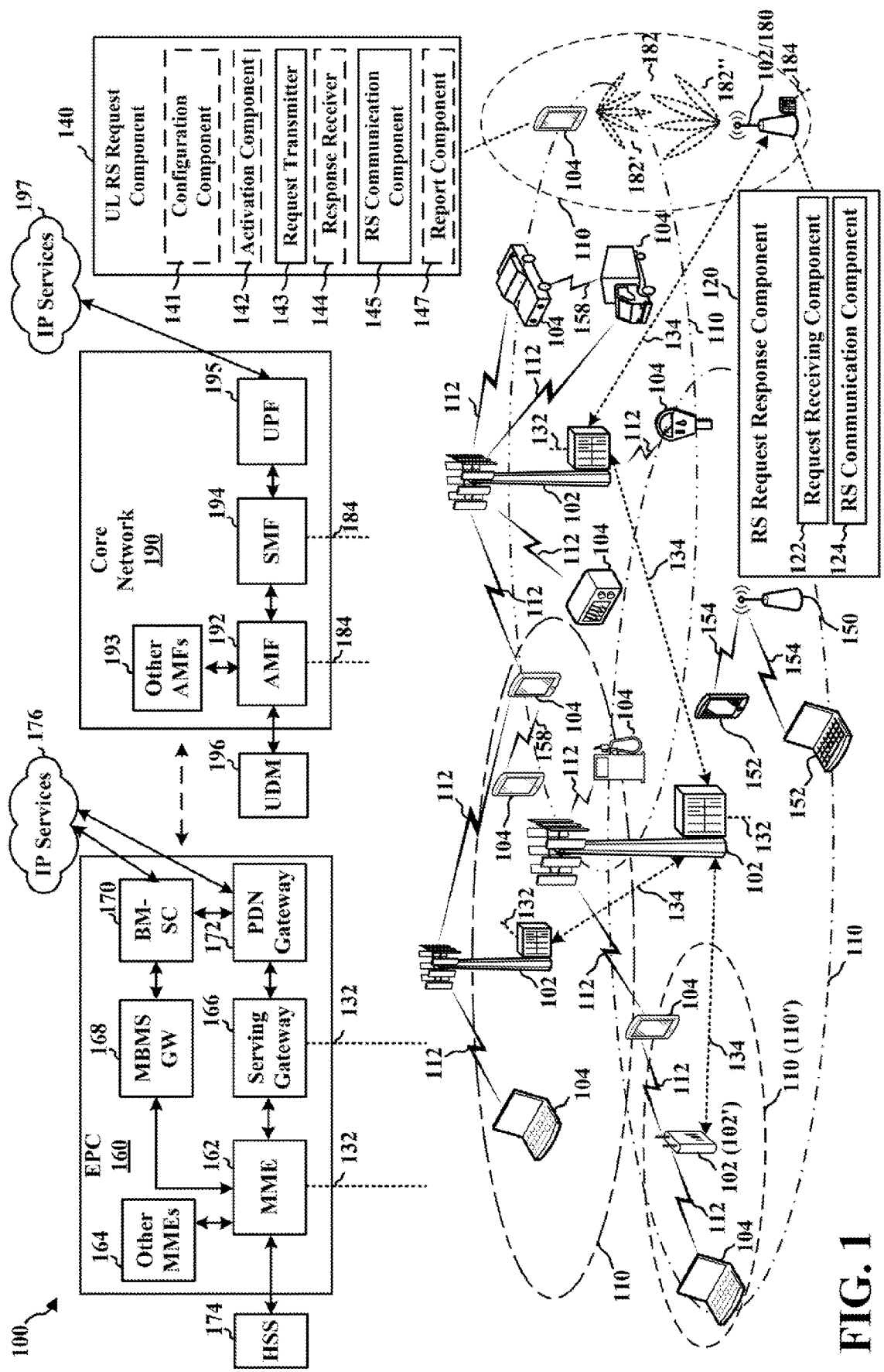
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) and a base station may transmit reference signals (RS) for the other device to estimate a channel and perform measurements. For example, a base station (BS) may transmit a channel state information (CSI)-RS and the UE may transmit a sounding reference signal (SRS). Conventionally, the base station configures the UE with a set of RSs and indicates when each RS is to be communicated. For example, the UE may be configured to receive a periodic CSI, an aperiodic (A-CSI), or both. For the A-CSI, the base station may transmit an uplink grant that schedules specific resources for the A-CSI and provides a physical uplink shared channel (PUSCH) resource for a CSI report. Similarly, the UE may be configured to transmit a periodic SRS or an aperiodic SRS. For aperiodic SRS, a grant may schedule specific resources for the SRS. Conventional RS scheduling techniques may have limitations with respect to a feedback delay and overhead. In particular, although the network may trigger aperiodic RSs, there may be a delay between a time that a UE detects an issue and a time that the base station detects the issue and is able to schedule the aperiodic CSI or SRS.

In an aspect, the present disclosure provides for UE initiated requests for reference signals such as CSI-RS and SRS. The UE may autonomously determine to request a RS from the BS. The UE may transmit an uplink request for at least one reference signal. The uplink request may indicate a trigger state for the BS. For example, the uplink request may be transmitted on an uplink resource mapped to the trigger state. The trigger state may correspond to at least one configured RS such as the CSI-RS or the SRS. Accordingly, the BS may determine which reference signal is requested. The UE may communicate the at least one RS corresponding to the trigger state in response to the uplink request. For example, the UE may transmit an SRS or receive a CSI-RS. In some implementations, the BS may transmit a grant such as a downlink control information (DCI) message that schedules the RS in response to the uplink request. In some implementations, the trigger state may be associated with a time offset and the RS may be transmitted at the time offset after the uplink request, for example, without a grant from the BS.

In an aspect, the present disclosure further provides for configuration and activation of UE initiated requests for reference signals such as CSI-RS and SRS based on a media access control (MAC) control element (CE). The BS may transmit a radio resource control (RRC) message that configures the UE with one or more trigger states for CSI, SRS, or a combination thereof. The BS may transmit a MAC-CE that activates a subset of the configured trigger states. For example, the MAC-CE may indicate the subset of active trigger states and the other configured trigger states may be inactive. The UE may be configured with a one-to-one mapping between one or more active trigger states in the subset and one or more physical uplink resource. For example, each active trigger state may be mapped to a different physical uplink resource. The UE may autonomously determine to request a RS from the BS based on a selected activated trigger state from the subset. The UE may transmit a UE initiated uplink RS request to the BS on an uplink physical resource that corresponds to the selected activated trigger state based on the one-to-one mapping. Accordingly, the BS may determine the requested RS based on the trigger state mapped to the uplink resource on which the uplink RS request is received. The UE and the BS may communicate the at least one reference signal corresponding to the trigger state in response to the uplink request. For example, the UE may transmit an SRS or receive a CSI-RS. In some implementations, the BS may transmit a grant such as a downlink control information (DCI, or DCI message) that schedules the RS in response to the uplink RS request. In some implementations, the trigger state may be associated with a time offset and the RS may be transmitted at the time offset after the uplink RS request, for example, without a grant from the BS.

Particular implementations of the subject matter described in this disclosure can be implemented to realize one or more of the following potential advantages. A UE may use UE initiated requests for reference signals to increase flexibility in channel measurements. For example, when the UE detects a change in channel conditions, the UE may request a CSI-RS to perform a measurement and report updated CSI to the base station. Accordingly, the UE initiated request for reference signals may reduce latency in CSI reporting. As another example, if the UE determines a change in beamforming parameters that may improve performance, the UE may request a CSI-RS to perform a measurement and refine its reception beams. As a further example, if the UE determines a change in precoding parameters that may improve performance, the UE may request an SRS in order to refine its precoders in uplink transmission for the base station to update reception parameters. By using a MAC-CE to select a sub-list of active trigger states, the number of trigger states for the UE to monitor may be reduced to the number of configured trigger states. Additionally, if the active trigger states are mapped to uplink resources, the number of resources reserved for RS requests may be reduced which may reduce overhead.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include at least one interface or be coupled to at least one interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 may include an uplink (UL) RS request component 140 that transmits an uplink request for at least one reference signal and communicates the requested reference signal. The UL RS request component 140 may include a configuration component 141 configured to receive a RRC configuration message indicating one or more CSI trigger states or one or more SRS trigger states for a UE initiated uplink RS request. The UL RS request component 140 may include an activation component 142 configured to receive a MAC-CE that activates a subset of the one or more CSI trigger states or the one or more SRS trigger states. The UL RS request component 140 may include a request transmitter 143 configured to select an activated trigger state of the one or more activated trigger states. The request transmitter 143 may be configured to transmit the UE initiated uplink RS request on a physical uplink resource of the one or more physical uplink resources that corresponds to the selected activated trigger state based on the one-to-one mapping. The UL RS request component 140 may optionally include a response receiver 144 configured to receive a grant in response to the uplink request. The UL RS request component 140 may include a RS communication component 145 configured to communicate the at least one reference signal corresponding to the trigger state in response to the uplink request. The UL RS request component 140 may optionally include a report component 147 configured to transmit a CSI report based on the at least one reference signal.

Figure 18:
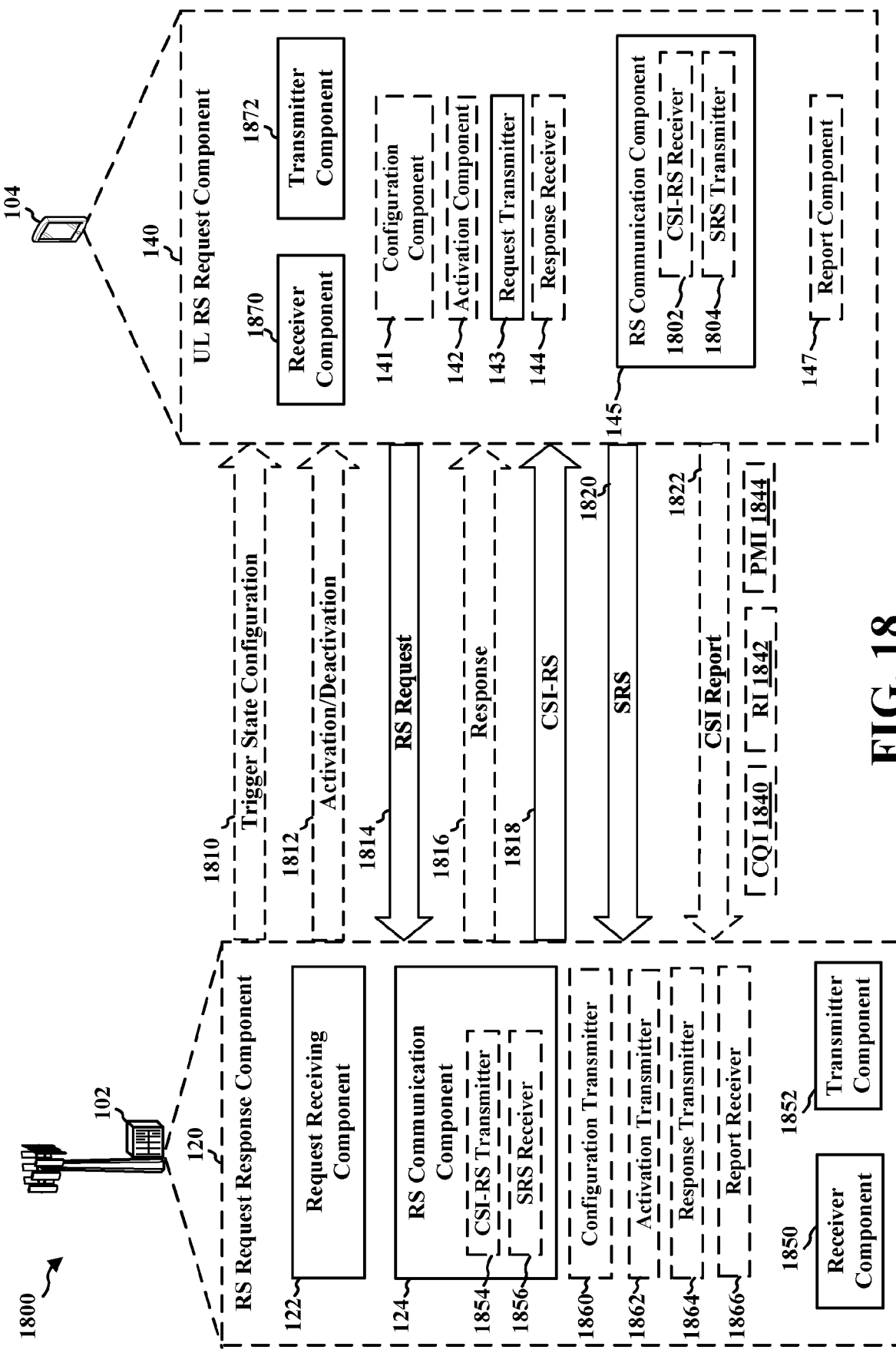
FIG. 18 is a diagram illustrating example communications and components of a base station and a UE.
Figure 19:
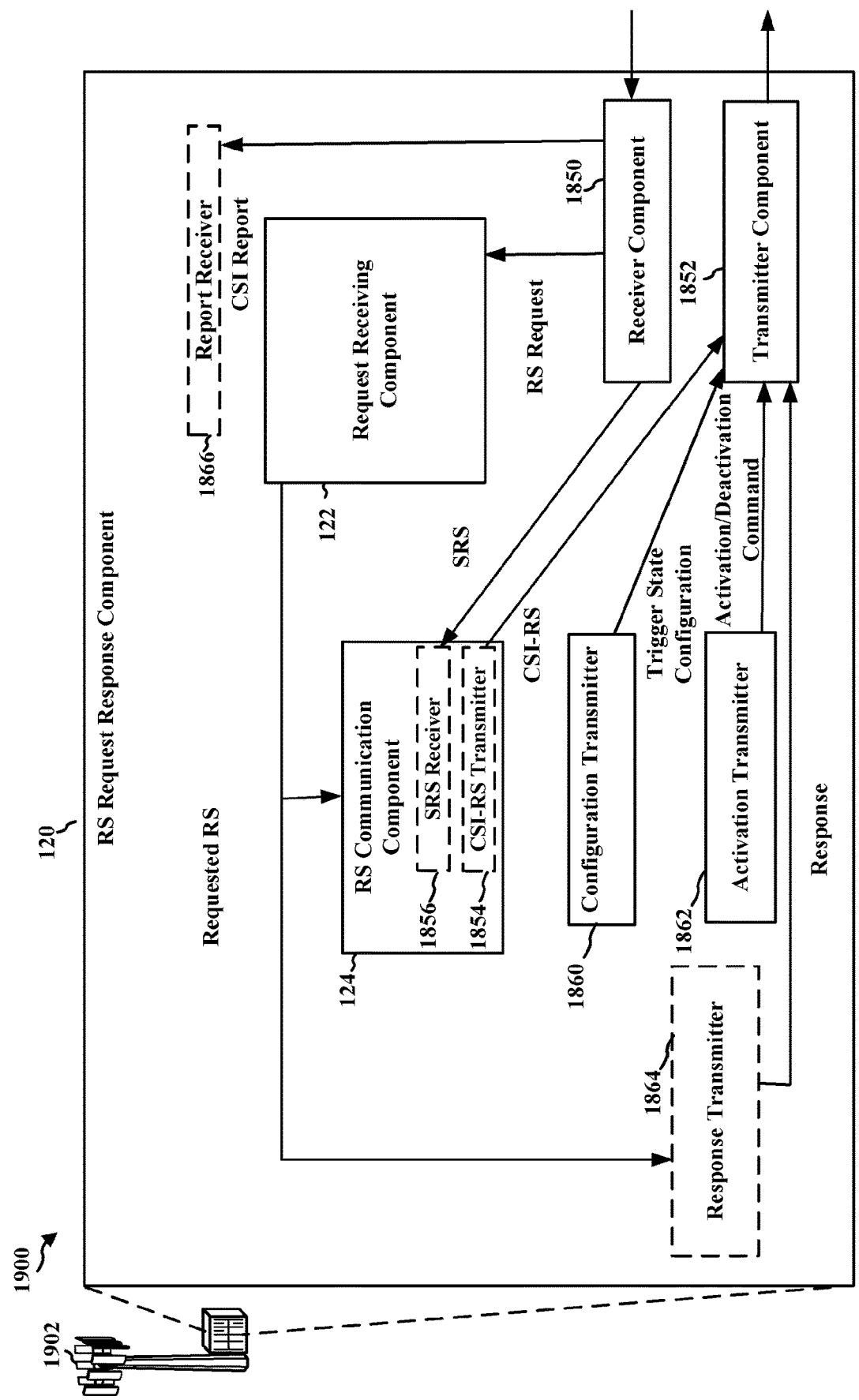
FIG. 19 is a conceptual data flow diagram illustrating the data flow between different means/components in an example BS.

In some implementations, one or more of the base stations 102 may include a RS request response component 120 that receives an uplink request for at least one reference signal and communicates the at least one reference signal in response to the request. As illustrated in FIGS. 18 and 19, the RS request response component 120 may include a configuration transmitter 1860 configured to transmit a RRC configuration message indicating one or more CSI trigger states or one or more SRS trigger states for a UE initiated uplink RS request. The RS request response component 120 may include an activation transmitter 1862 configured to transmit a MAC-CE that activates a subset of the one or more CSI trigger states or the one or more SRS trigger states. The RS request response component 120 may include a receiver component 1850 configured to receive the UE initiated uplink RS request on a physical uplink resource of the one or more physical uplink resources. The RS request response component 120 may include a request receiving component 122 configured to receive, from a UE, an uplink request for at least one reference signal, the uplink request indicating a trigger state for the UE. The request receiving component 122 may be configured to determine that the UE initiated uplink RS request corresponds to one of the activated trigger states based on the one-to-one mapping. The RS request response component 120 may include a RS communication component 124 configured to communicate the at least one reference signal corresponding to the trigger state in response to the uplink request.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. A base station may be implemented as an aggregated base station or a disaggregated base station, and the disaggregated architecture may include one or more components such as a CU, DU, or RU. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2:
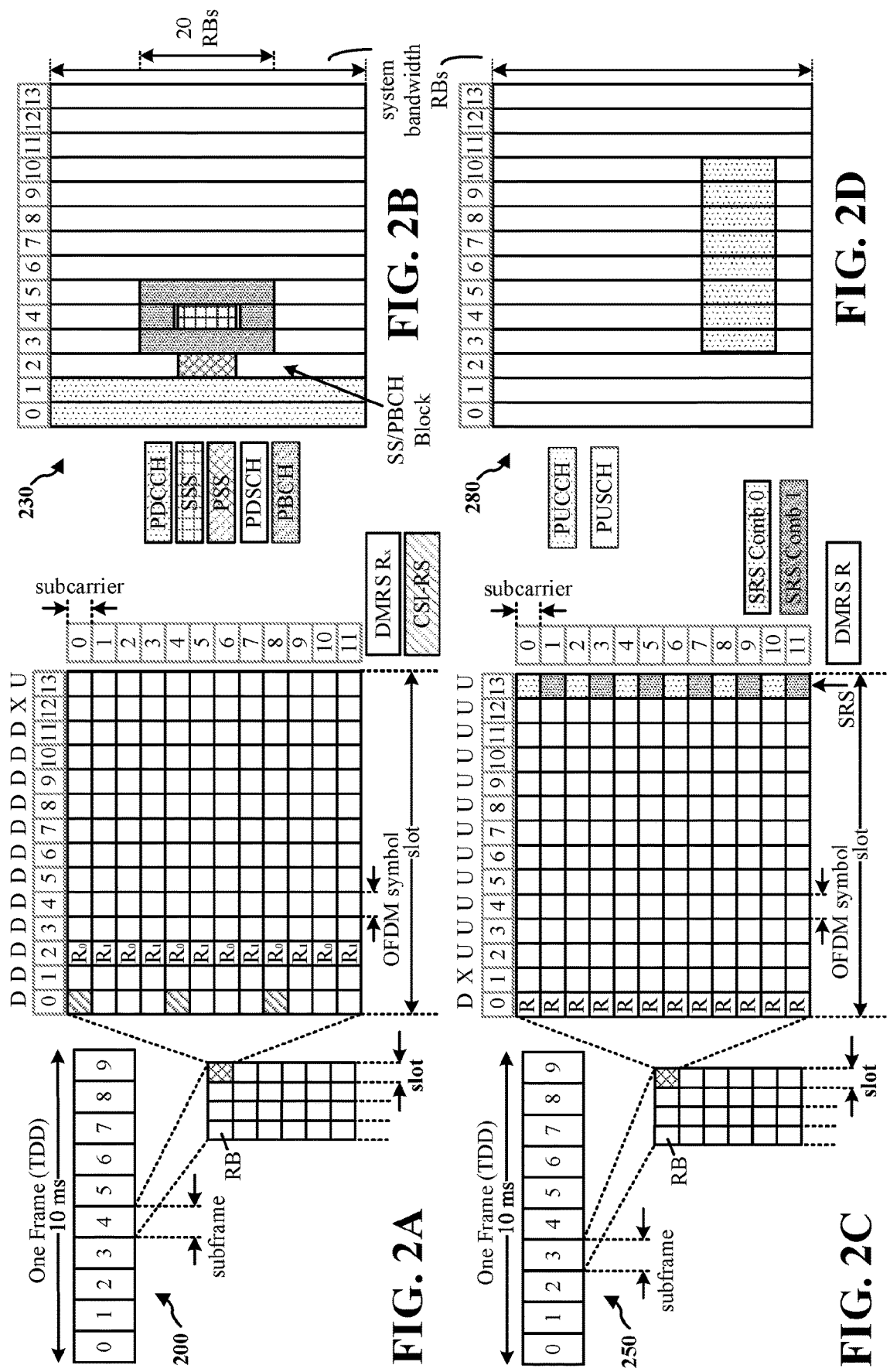
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
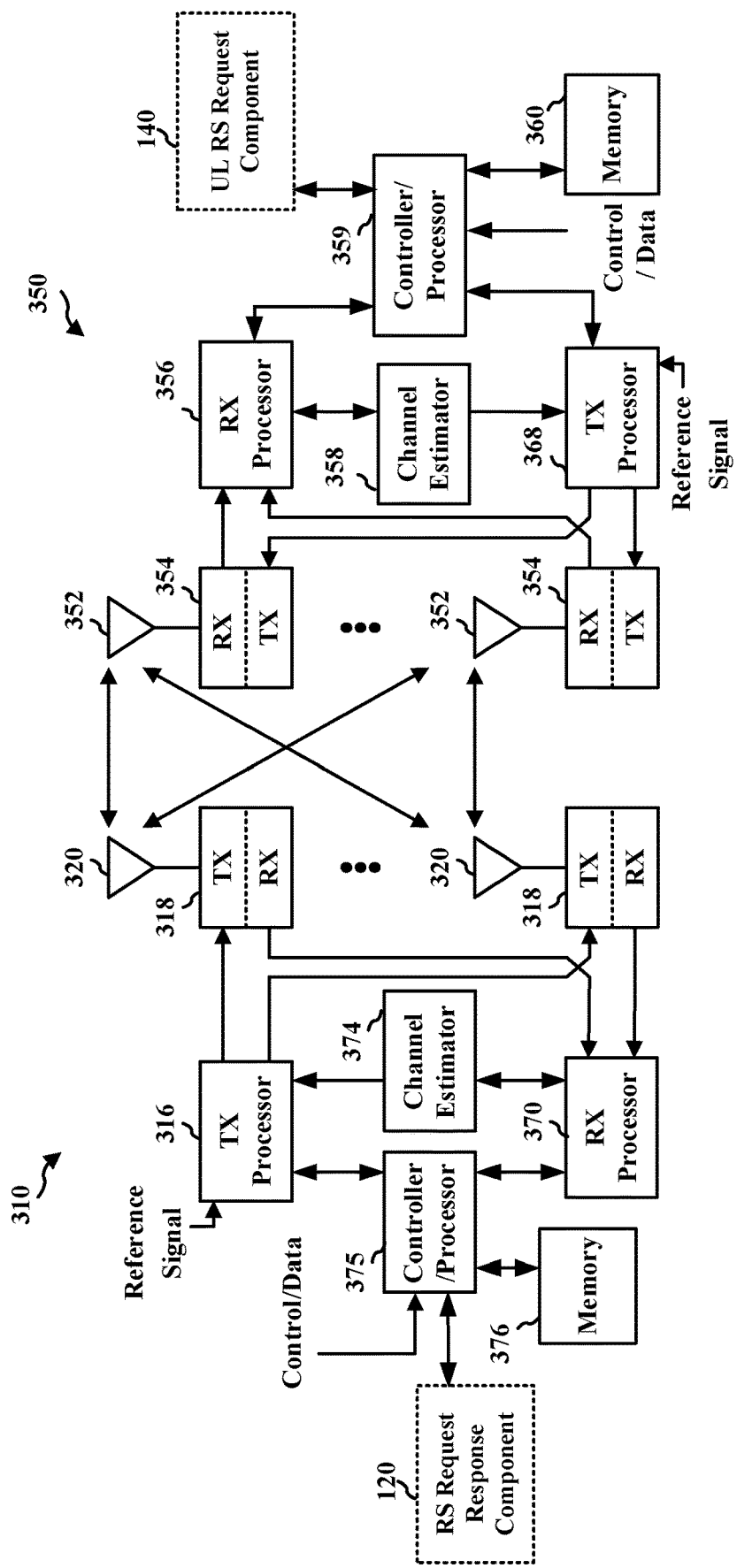
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the UL RS Request component 140 of FIG. 1.

At least one of the TX processor 316, the RX processor 370, and the controller/processor 375 may be configured to perform aspects in connection with the RS request response component 120 of FIG. 1.

Figure 4:
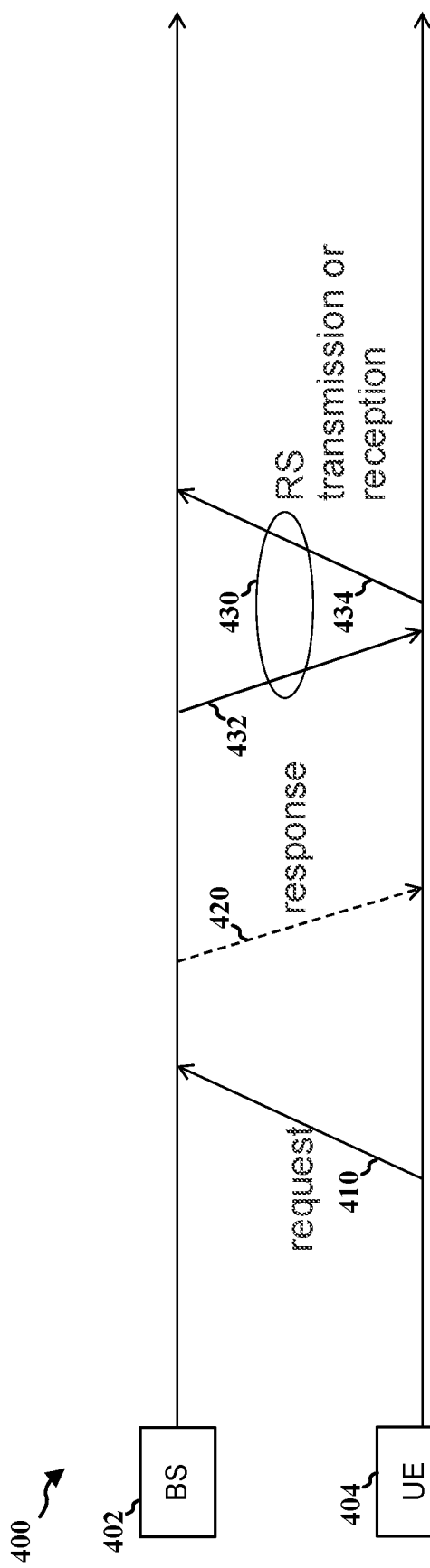
FIG. 4 is a diagram illustrating example messages between a UE and a BS for requesting a reference signal (RS).

FIG. 4 is a diagram illustrating example messages between a UE 404 and a BS 402 for requesting a reference signal (RS) 430. The UE 404 may be an example of the UE 104 including the UL RS request component 140 depicted and described in FIG. 1. The BS 402 may be an example of the base station 102 including the RS request response component 120 depicted and described in FIG. 1. The RS 430 may be, for example, a downlink RS 432 such as a CSI-RS or an uplink RS 434 such as a SRS. The UE 404 may transmit a request 410. The request 410 may be a UE initiated uplink request for the downlink RS 432, the uplink RS 434, or both. For example, a joint request may be used for the UE 404 to transmit an aperiodic SRS (A-SRS) for non-codebook based MIMO following the reception of an aperiodic (A-CSI-RS) associated with the A-SRS. In some implementations, the BS 402 may optionally transmit a response 420. For example, the response 420 may be a downlink control information (DCI) that schedules or requests the reference signal. In some implementations, the response 420 may be unnecessary. For example, the UE 404 may determine resources for the RS 430 based on a mapping from the request 410. In either case, the UE 404 may transmit or receive the RS 430 based on the request 410.

Figure 5:
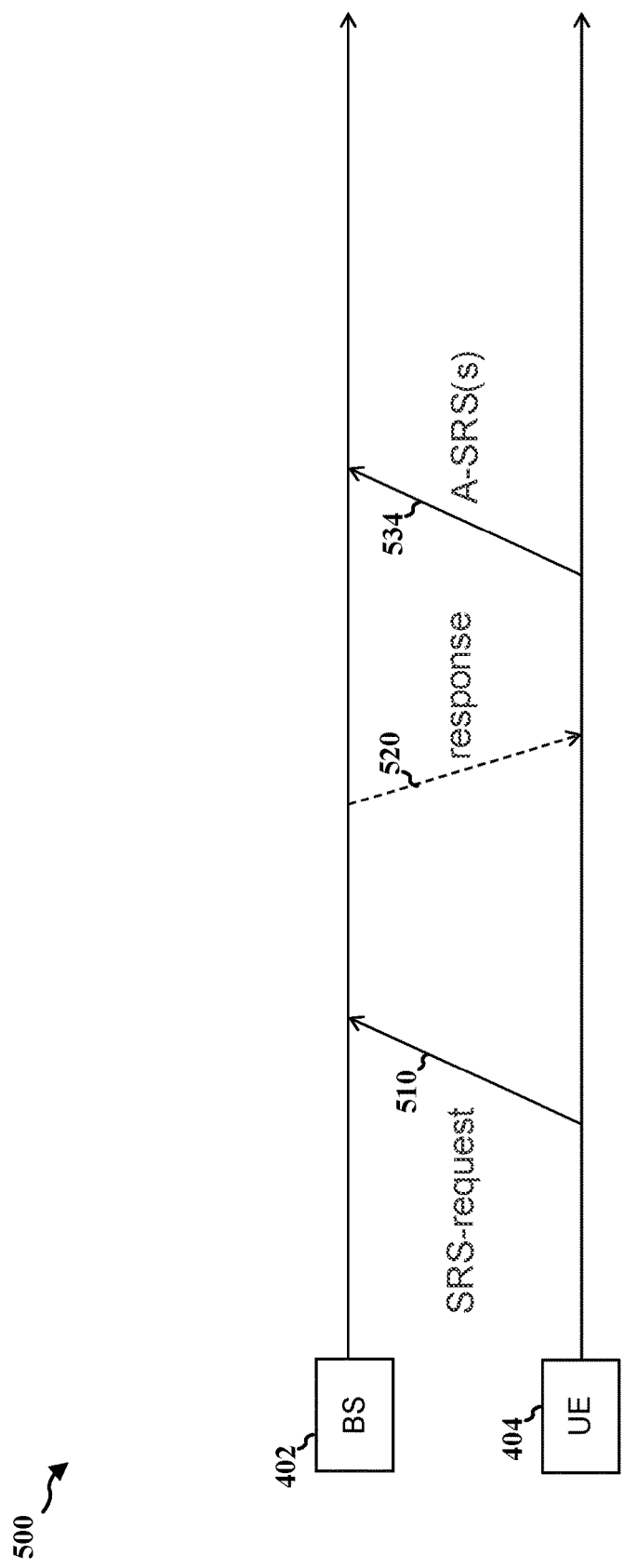
FIG. 5 is a diagram illustrating example messages between a UE and a BS for requesting the UE to transmit a sounding reference signal (SRS).

FIG. 5 is a diagram 500 illustrating example messages between a UE 404 and a BS 402 for the UE 404 to request to transmit one or more SRSs 534. The UE 404 may be an example of the UE 104 including the UL RS request component 140 depicted and described in FIG. 1. The BS 402 may be an example of the base station 102 including the RS request response component 120 depicted and described in FIG. 1. The UE 404 may transmit an SRS request 510. The SRS request 510 may be an example of a UE initiated uplink request for a RS. The SRS request 510 may correspond to a configured SRS trigger state. When configured with a list of uplink SRS triggers, the UE 404 may send the SRS request 510 to the BS 402 by indicating one of the configured uplink SRS triggers. There may be a mapping between the SRS request 510 and SRS triggers.

For example, the SRS request 510 can be sent on PRACH, PUCCH, or on MAC-CE. For instance, PRACH can be Contention-based, non-Contention-based, and can be two-step PRACH. There may be a one-to-one mapping between the SRS request 510 and the configured SRS triggers. For example, if the uplink resource for the SRS request 510 is PRACH, the PRACH preamble, the PRACH occasion, or a combination thereof can be one-to-one mapped to a configured SRS trigger. If the uplink resource for the SRS request 510 is PUCCH, an uplink control information (UCI) codepoint, PUCCH occasion, or combination thereof can be one-to-one mapped with a configured SRS trigger. If the uplink resource for the SRS request 510 is MAC-CE, a bit field of the MAC-CE can be one-to-one mapped with a configured SRS trigger.

In some implementations, the UE 404 may optionally receive a response 520. For example, the response 520 may be a dynamic grant scheduled by the BS 402, which can be a DCI including a SRS request. When the UE 404 is configured to receive the response 520, the UE 404 may refrain from transmitting the one or more A-SRSs 534 if no response 520 is received. When the UE 404 is not configured to receive the response 520, the UE 404 may transmit the one or more A-SRSs 534 at a fixed time offset after the SRS request 510. The time offset may be fixed by, for example, an RRC configuration, a standards document, or regulation. The time offset may be associated with the SRS trigger state.

After UE 404 has sent an SRS request to the BS 402, the UE 404 may transmit one or more A-SRSs 534. The A-SRSs 534 may be in one or more SRS resource sets corresponding to the SRS request 510. For example, the configured SRS trigger state may identify one or more SRS resources or SRS resource sets for transmission of the A-SRSs 534. The UE 404 may transmit the one or more A-SRSs 534 using SRS resources associated with the SRS request 510.

Figure 6:
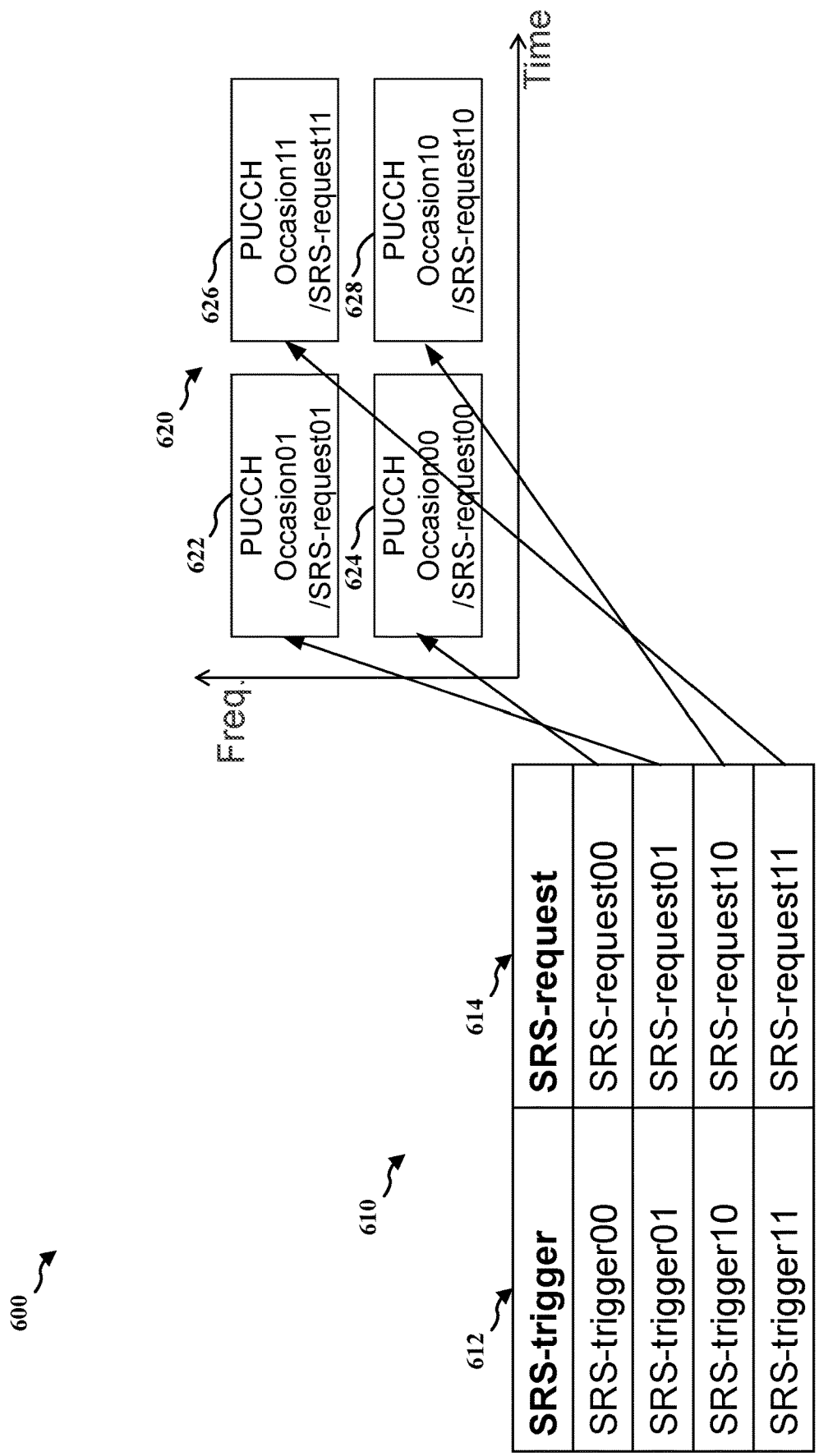
FIG. 6 is a diagram illustrating an example configuration and resources for an SRS request.

FIG. 6 is a diagram 600 illustrating an example configuration 610 and resources 620 for an SRS request. The configuration 610 may include an SRS trigger 612 and a corresponding SRS request 614. The SRS trigger 612 may include an identifier and may identify resources for transmitting an SRS such as a SRS sequence or a number of resource blocks used for the SRS. The SRS request 614 may define the resources 620 for transmitting an SRS request such as SRS request 510 depicted and described in FIG. 5. For example, as illustrated, the resources 620 for each of the SRS requests 614 may be PUCCH resources. The resources 620 may be PUCCH occasions defined by time and frequency domain resources. For instance, a first SRS trigger and SRS request associated with ID 00 may be mapped to a PUCCH occasion 622. Additionally, a second SRS trigger and SRS request associated with ID 01 may be mapped to a PUCCH occasion 624, third SRS trigger and SRS request associated with ID 10 may be mapped to a PUCCH occasion 626, and a fourth SRS trigger and SRS request associated with ID 11 may be mapped to a PUCCH occasion 628. In some other examples, each SRS request 614 may be mapped to a RACH preamble, a PUCCH UCI codepoint, or a MAC-CE bit field.

Figure 7:
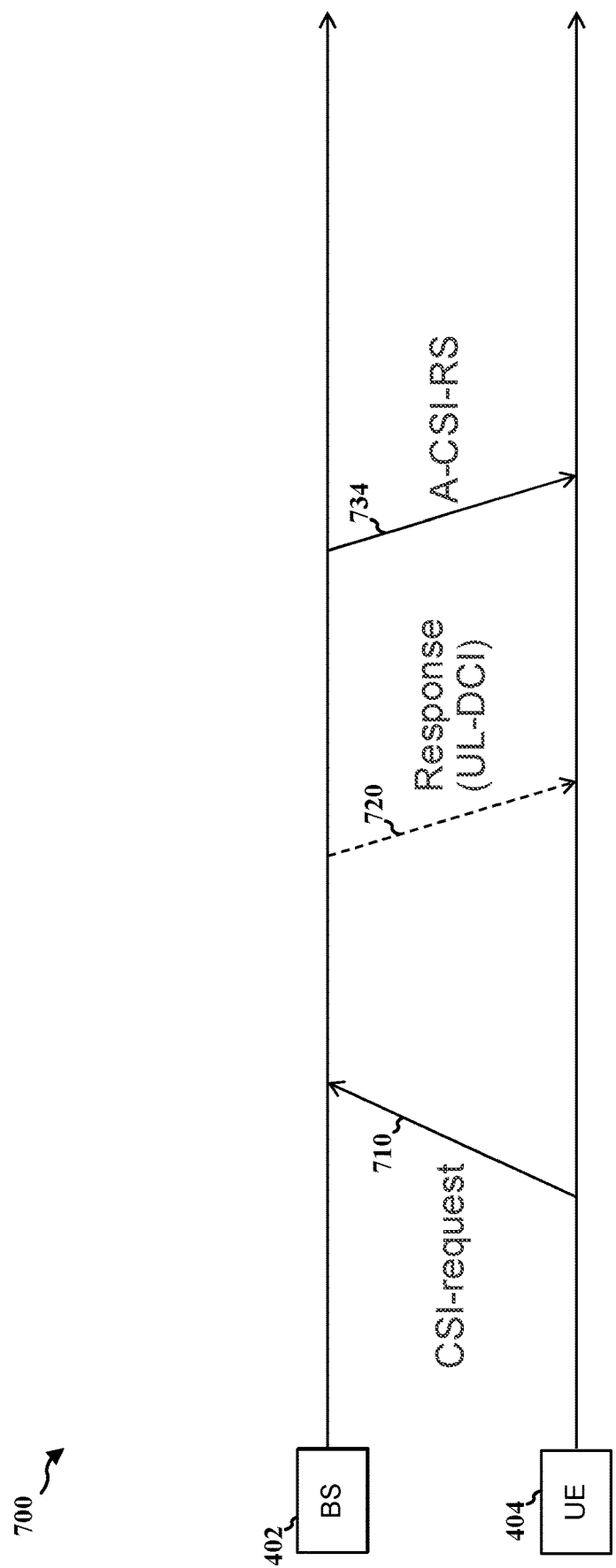
FIG. 7 is a diagram illustrating example messages between a UE and a BS for requesting the UE to transmit a channel state information (CSI) RS.

FIG. 7 is a diagram 700 illustrating example messages between a UE 404 and a BS 402 for the UE to request a CSI-RS 732. The UE 404 may be an example of the UE 104 including the UL RS request component 140 depicted and described in FIG. 1. The BS 402 may be an example of the base station 102 including the RS request response component 120 depicted and described in FIG. 1. The requested CSI-RS 732 may be considered an aperiodic CSI-RS (A-CSI-RS). The UE 404 may transmit CSI request 710. The CSI request 710 may be an example of a UE initiated uplink request for a RS. The CSI request 710 may correspond to a configured CSI trigger state. The CSI trigger state may be configured with corresponding A-CSI RS resources in one or more CSI resource sets. When configured with a list of CSI triggers, the UE 404 may send the CSI request 710 to the BS 402 by indicating one of the configured CSI triggers. There may be a mapping between the CSI request 710 and CSI triggers.

For example, the CSI request 710 can be sent on PRACH, PUCCH, or on MAC-CE. For instance, PRACH can be Contention-based, non-Contention-based, and can be two-step PRACH. There may be a one-to-one mapping between the CSI request 710 and the configured CSI triggers. For example, if the uplink resource for the CSI request 710 is PRACH, the PRACH preamble, the PRACH occasion, or a combination thereof can be one-to-one mapped to a configured CSI trigger. If the uplink resource for the CSI request 710 is PUCCH, a UCI codepoint, PUCCH occasion, or combination thereof can be one-to-one mapped with a configured CSI trigger. If the uplink resource for the CSI request 710 is MAC-CE, a bit field of the MAC-CE can be one-to-one mapped with a configured CSI trigger.

In some implementations, the UE 404 may optionally receive a response 720. For example, the response 720 may be a dynamic grant scheduled by the BS 402, which can be a DCI with CSI request. For instance, the DCI may be format 0_1 and the CSI request may indicate the CSI trigger corresponding to the CSI request 710. When the UE 404 is configured to receive the response 720, the UE 404 may refrain from monitoring for the CSI-RS 734 if no response 720 is received. When the UE 404 is not configured to receive the response 720, the UE 404 may monitor for the CSI-RS at a fixed time offset after the CSI request 710. The time offset may be fixed by, for example, an RRC configuration, a 3GPP standards document, or regulation. The time offset may be associated with the CSI trigger state.

Figure 8:
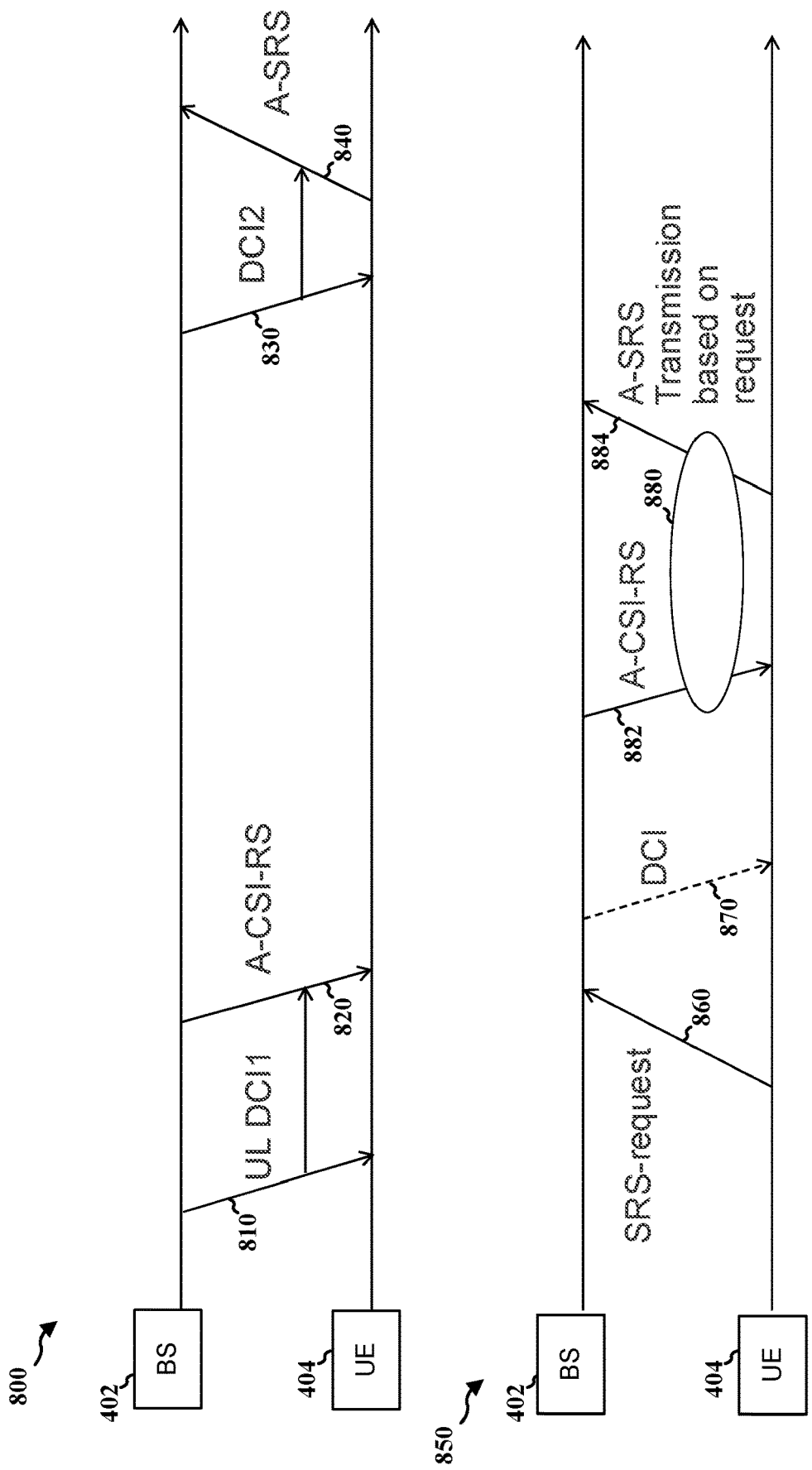
FIG. 8 is a diagram illustrating an example procedure for updating uplink beams with and without UE initiated reference signal requests.

FIG. 8 is a diagram illustrating a procedure for updating uplink beams or precoders with and without UE initiated uplink reference signal requests. The UE 404 may be an example of the UE 104 including the UL RS request component 140 depicted and described in FIG. 1. The BS 402 may be an example of the base station 102 including the RS request response component 120 depicted and described in FIG. 1. In a first example 800 without UE initiated reference signal requests, the base station 402 may first transmit an uplink DCI 810. For example, the uplink DCI 810 may have format 0_1 and may include a CSI request identifying a CSI trigger. The CSI request in the DCI may be referred to as a base station initiated DCI-based request. Accordingly, the uplink DCI 810 may schedule the UE 404 to receive an A-CSI-RS 820. The UE 404 may perform measurements on the A-CSI-RS 820. For example, the UE 404 may determine that one or more beamforming parameters may be adjusted based on the A-CSI-RS. The UE 404, however, may not be able to transmit an SRS due to lack of scheduling. The UE 404 may wait until the BS 402 transmits a second DCI 830. The DCI 830 may schedule an A-SRS 840. The UE 404 may transmit the A-SRS 840 based on updated beamforming or precoding parameters.

In the second example 850, the UE 404 may transmit a joint request 860 for reference signals 880 including a SRS and a CSI-RS associated with the SRS. The SRS request 860 may indicate both a SRS and a CSI-RS associated with the SRS. For instance, the SRS request 860 may use an uplink resource that is mapped to an SRS trigger, which can trigger a SRS transmission based on a measurement of a CSI-RS associated with the SRS. If the measurement of the CSI-RS is based on an A-CSI-RS, the SRS request 860 may be a joint request for the A-SRS and the A-CSI-RS associated with the A-SRS. In some implementations, the BS 402 may transmit a response 870 in response to the request 860. The response 870 may be, for example, a DCI that schedules one or both of the A-CSI-RS 882 and the A-SRS 884. The response 870 also may include an SRS request that schedules the A-SRS 884, and the A-CSI-RS 882 associated with the A-SRS 884. In some implementations, the UE 404 may receive the A-CSI-RS 882 at a first fixed time offset after the SRS request 860, and may transmit the A-SRS 884 at a second fixed time offset after the SRS request 860. In some implementations, the second fixed time offset may be larger than the first fixed time offset. In either case, the UE 404 may perform measurements on the A-CSI-RS 882. The UE 404 may, for example, adjust beamforming or precoding parameters based on the A-CSI-RS 882. The UE 404 may transmit the A-SRS 884 based on the adjusted beamforming parameters without waiting for separate scheduling of the SRS. Accordingly, the second example 850 may provide a UE-initiated procedure for updated beamforming parameters that may have less latency than the first example 800.

Figure 9:
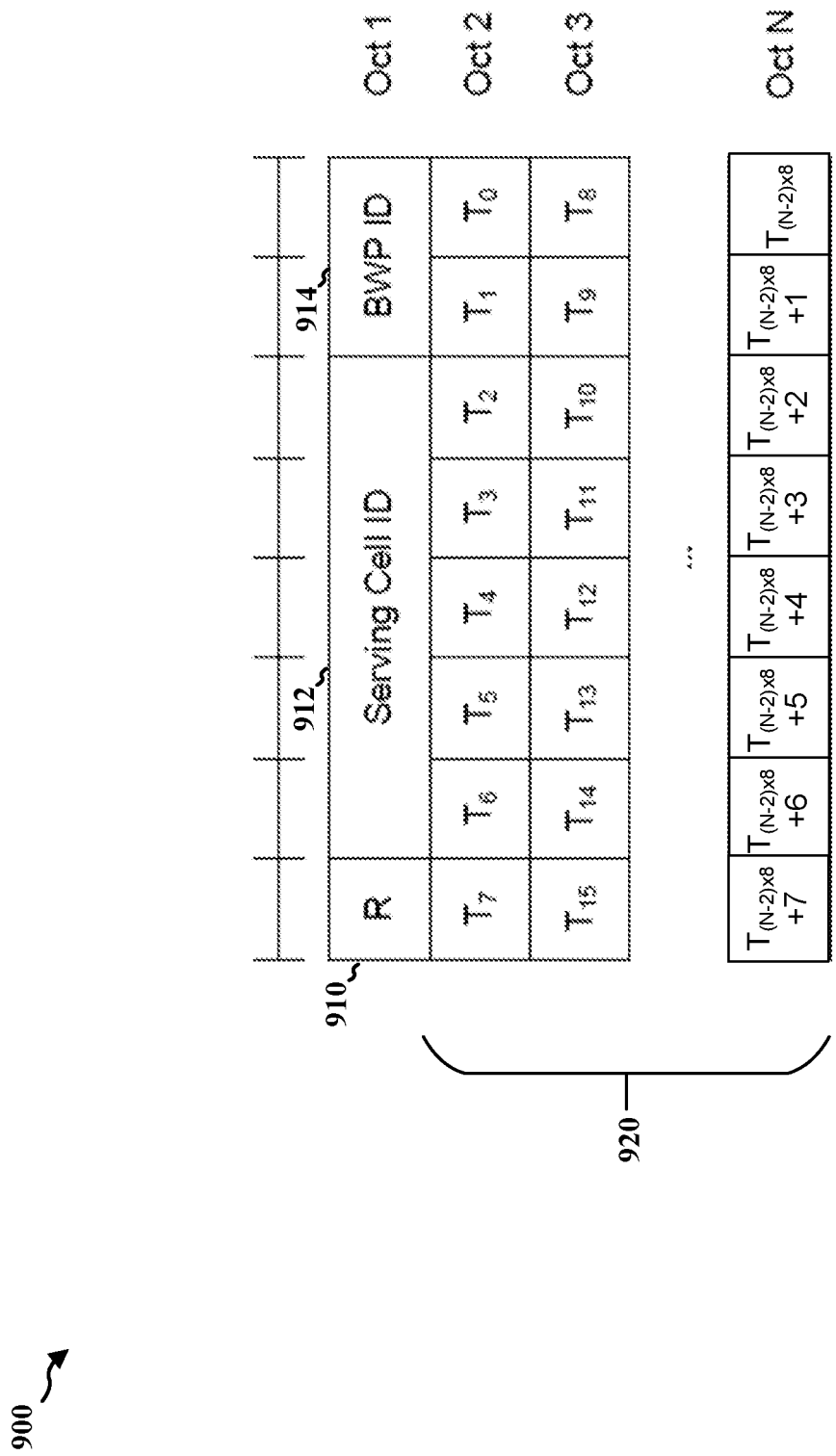
FIG. 9 is a diagram illustrating an example media access control (MAC) control element (CE) for activating trigger states.

FIG. 9 is a diagram illustrating a MAC-CE 900 for activating trigger states. In some implementations, the BS 402 depicted and described in FIG. 4, for example, may configure the UE 404 depicted and described in FIG. 4, for example, with a list of trigger states using RRC signaling. For example, the BS 402 may transmit a RRC configuration message including a list of CSI trigger states or a list of SRS trigger states.

For CSI trigger states, the RRC configuration message may define one or more measurement resources such as a channel measurement resource and one or more interference measurement resources, and may define one or more report resources. Example interference measurement resources include a zero-power (ZP) CSI-RS and a non-zero-power (NZP) CSI-RS. Example report resources may be PUCCH or PUSCH, and the PUSCH can be a configured grant based PUSCH without dynamic DCI grant or a PUSCH of Message A (msgA) in a two-step PRACH procedure. In some implementations, the CSI trigger states may correspond to CSI trigger states that may be triggered via a DCI with CSI request. That is, the MAC-CE used to downselect a sub-list of trigger states for UE initiated uplink CSI requests may be reused from the MAC-CE used to downselect a sub-list of trigger states for BS initiated DCI-based CSI requests. In some implementations, the MAC-CE may select a sub-list of CSI triggers common to both UE initiated uplink requests and base station initiated DCI-based requests. In some implementations, the base station 402 may configure a separate list of CSI trigger states for UE initiated uplink CSI requests. That is, the MAC-CE may configure a sub-list that is applicable only to UE initiated uplink CSI requests.

For SRS trigger states, the RRC configuration message may define one or more of a SRS resource set ID, a number of SRS ports, a resource type, a slot level periodicity, a number of OFDM symbols, an SRS bandwidth, a frequency hopping bandwidth, frequency domain position, configurable shift, cyclic shift, a transmission comb value, a transmission comb offset, an SRS sequence ID, and a spatial relation. The MAC-CE 900 may be used to downselect a number of active trigger states from the list of configured trigger states. In some implementations, the SRS trigger states may correspond to SRS configurations where the resource type is set to aperiodic and the SRS configuration may be triggered by a DCI including a BS initiated DCI-based SRS request. In this case, the list of SRS trigger states is common to both the UE initiated uplink SRS requests and the BS initiated DCI-based SRS requests. In some implementations, the base station may configure a separate list of SRS trigger states for UE RS requests. In some implementations, a single list may include trigger states for both CSI-RS and SRS. For example, the trigger states in the single list may share a set of trigger state IDs. In some implementations, the single list may include trigger states for both CSI-RS and for SRS.

As illustrated, the MAC-CE 900 may include a plurality of octets or bytes. A first octet may include a reserved bit 910, a serving cell ID 912, and a bandwidth part (BWP) ID 914. The MAC-CE 900 may include a bitmap 920. The bitmap 920 may include a bit corresponding to each configured trigger state. The BS 402 may select up to a maximum number of active trigger states by setting the corresponding bits in the bitmap 920 to a specified value. For example, a value of 1 may indicate an active trigger state and a value of 0 may indicate an inactive trigger state. Accordingly, the UE 404 may determine a set of active trigger states based on the MAC-CE 900.

The MAC-CE 900 can be used to activate a sub-list of uplink requests for the UE 404, and the physical resources for transmitting the activated uplink requests may be one-to-one mapped to the requests in the sub-list. Accordingly, the UE 404 may determine which physical resources to use for a request and the BS 402 may determine which uplink request was transmitted based on the physical resources on which the request is received.

Figure 10:
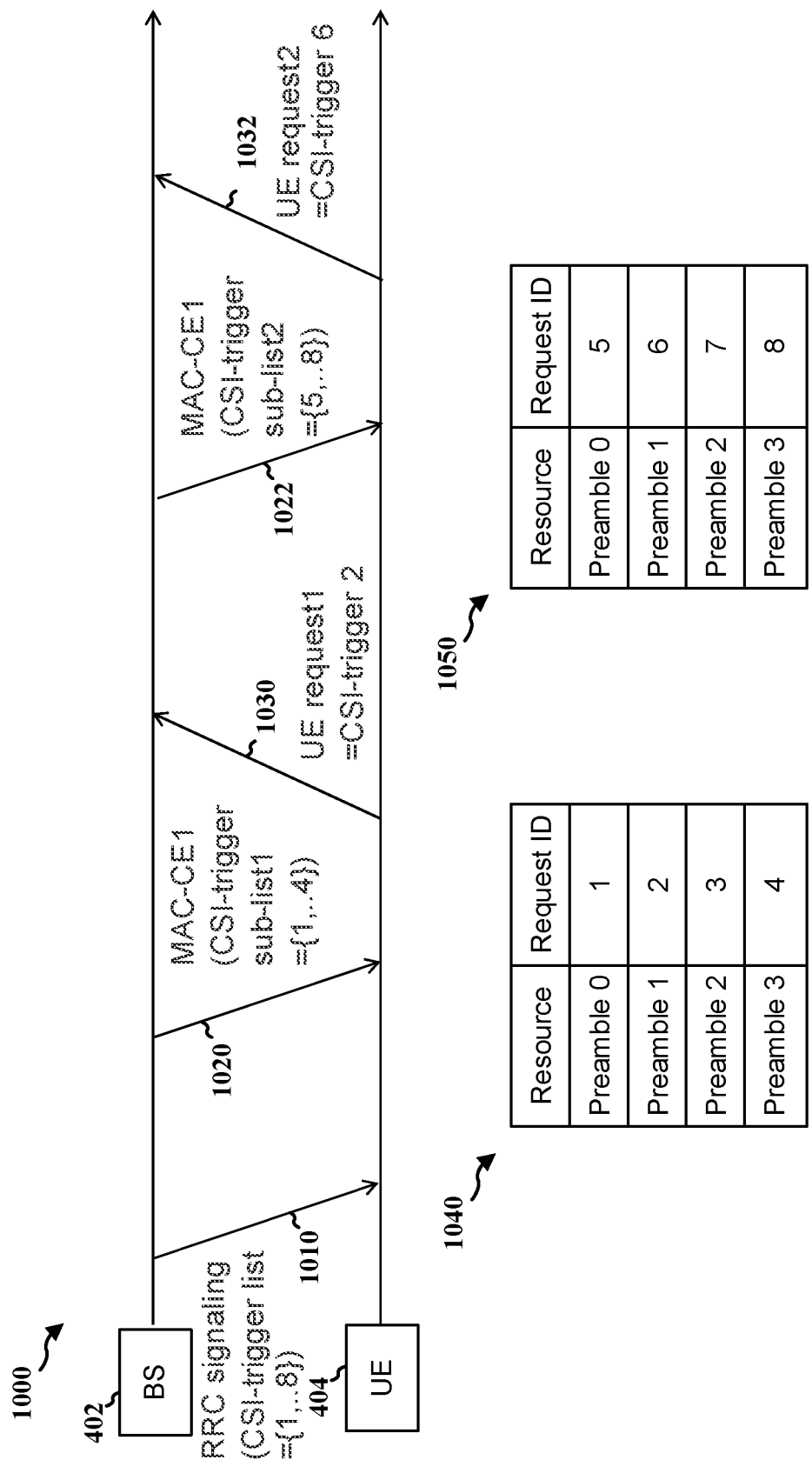
FIG. 10 is a diagram illustrating example RS requests using different active trigger states for CSI triggers.

FIG. 10 is a diagram 1000 illustrating RS requests using different active trigger states indicated by MAC-CEs. The UE 404 may be an example of the UE 104 including the UL RS request component 140 depicted and described in FIG. 1. The BS 402 may be an example of the base station 102 including the RS request response component 120 depicted and described in FIG. 1. The UE 404 may receive RRC signaling 1010. The RRC signaling 1010 may configure a trigger list. For example, the trigger list may be a CSI trigger list defining CSI trigger states with Request IDs 1-8. The UE 404 may receive a MAC-CE 1020. The MAC-CE 1020 may be an example of the MAC-CE 900 including the bitmap 920 indicating active trigger states. For instance, the MAC-CE 1020 may activate a sub-list of trigger states including CSI trigger states with Request IDs 1-4. The activated trigger states may be mapped to resources according to the mapping 1040. In this example, the physical resources may be preambles such as RACH preambles. There may be four (4) available physical resources numbered 0-3 and a maximum number of four (4) active CSI trigger states. The Request IDs may be mapped to the resources in order. The UE 404 may transmit a reference signal request 1030 using preamble 1 corresponding to Request ID 2 according to the mapping 1040. The base station 402 may receive the UE request 1030 and transmit the requested CSI-RS.

The base station 402 may transmit a second MAC-CE 1022 that activates a second sub-list of CSI trigger states. For example, the second MAC-CE 1022 may activate trigger states with Request IDs 5-8. The UE 404 may re-map the configured resources to the active trigger states in order to generate the mapping 1050. The UE 404 may transmit a reference signal request 1032 using preamble 1 again. This time, preamble 1 may correspond to Request ID 6 according to the mapping 1050. The base station 402 may receive the UE request 1032 and transmit the requested CSI-RS.

Figure 11:
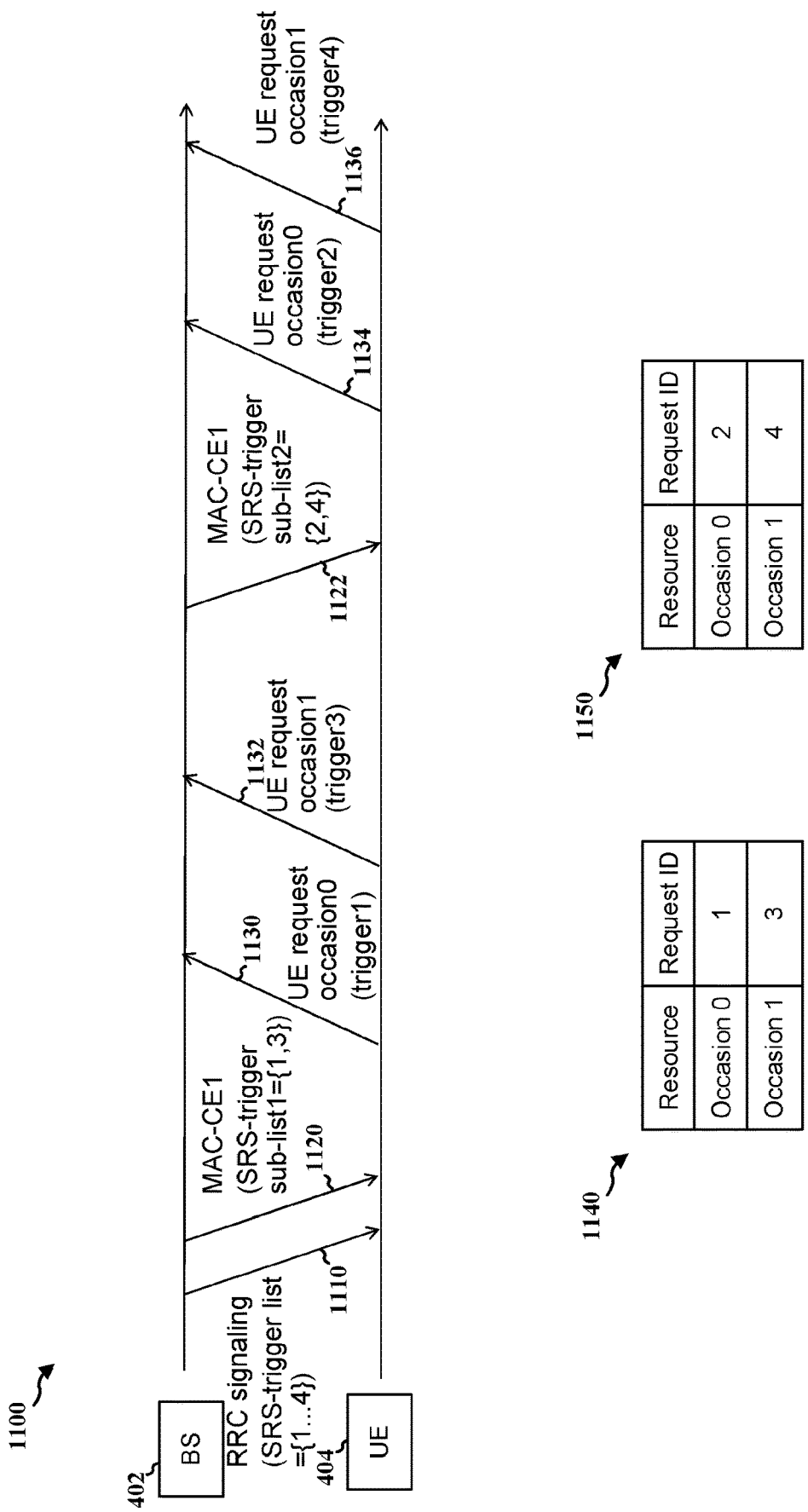
FIG. 11 is a diagram illustrating example RS requests using different active trigger states for SRS triggers.

FIG. 11 is a diagram 1100 illustrating RS requests using different active trigger states indicated by MAC-CEs. The UE 404 may be an example of the UE 104 including the UL RS request component 140 depicted and described in FIG. 1. The BS 402 may be an example of the base station 102 including the RS request response component 120 depicted and described in FIG. 1. The UE 404 may receive RRC signaling 1110. The RRC signaling 1110 may configure a trigger list. For example, the trigger list may be a SRS trigger list defining SRS trigger states with Request IDs 1-4. The UE 404 may receive a MAC-CE 1120. The MAC-CE 1120 may be an example of the MAC-CE 900 including the bitmap 920 indicating active trigger states. For instance, the MAC-CE 1120 may activate a sub-list of trigger states including SRS trigger states with Request IDs 1 and 3. The activated trigger states may be mapped to resources according to the mapping 1140. In this example, the physical resources may be transmission occasions such as PRACH occasions or PUCCH occasions. There may be two (2) available physical resources numbered 0 and 1 and a maximum number of two (2) active SRS trigger states. The request IDs may be mapped to the resources in order. The UE 404 may transmit a reference signal request 1130 using occasion 0 corresponding to Request ID 1 according to the mapping 1140. The base station 402 may receive an SRS (not shown) indicated by Request ID 1. The UE 404 also may transmit a reference signal request 1132 using occasion 1 corresponding to Request ID 3 according to the mapping 1140. The base station 402 may receive an SRS (not shown) indicated by Request ID 3.

The base station 402 may transmit a second MAC-CE 1122 that activates a second sub-list of SRS trigger states. For example, the second MAC-CE 1122 may activate trigger states with Request IDs 2 and 4. The UE 404 may re-map the configured resources to the active trigger states in order to generate the mapping 1150. The UE 404 may transmit a reference signal request 1134 using the occasion 0. This time, occasion 0 may correspond to Request ID 2 according to the mapping 1150. The base station 402 may receive an SRS (not shown) indicated by Request ID 2. The UE 404 also may transmit a reference signal request 1136 using occasion 1 corresponding to Request ID 4 according to the mapping 1150. The base station 402 may receive an SRS (not shown) indicated by Request ID 4.

Figure 12:
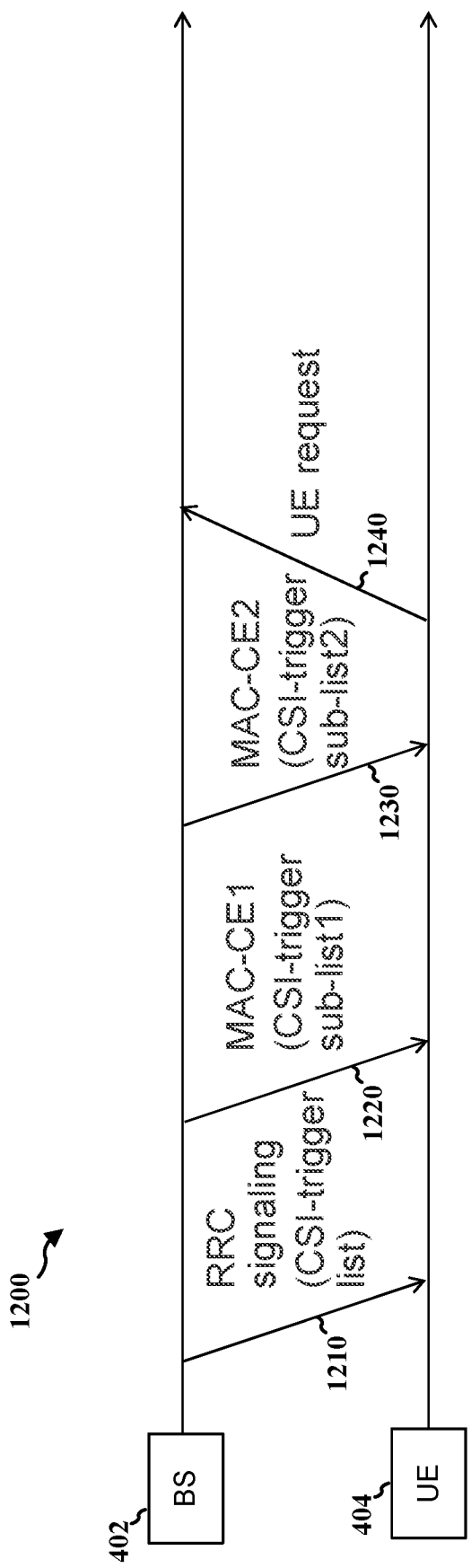
FIG. 12 is a diagram illustrating an example of communications using MAC-CEs for downselecting active trigger states for UE initiated RS requests.

FIG. 12 is a diagram 1200 illustrating an example of communications using MAC-CEs for further downselecting active trigger states for UE initiated uplink RS requests. The UE 404 may be an example of the UE 104 including the UL RS request component 140 depicted and described in FIG. 1. The BS 402 may be an example of the base station 102 including the RS request response component 120 depicted and described in FIG. 1. The base station 402 may transmit RRC signaling 1210. The RRC signaling 1210 may configure a list of CSI trigger states. For example, the CSI trigger states may be for either downlink scheduled A-CSI-RS or UE requested A-CSI-RS. The list of CSI trigger states may be common to both the UE initiated uplink CSI requests and the base station initiated DCI-based CSI requests. The base station 402 may transmit a first MAC-CE 1220 that downselects a first subset of the CSI trigger states. For example, the first sub-set may be for downlink scheduled A-CSI-RS in base station initiated DCI-based CSI requests. The base station 402 may transmit a second MAC-CE 1230. The second MAC-CE 1230 may further downselect a second subset of CSI trigger states. For example, the second subset of CSI trigger states may be for UE requested A-CSI-RS in UE initiated uplink CSI requests. The UE 404 may transmit a UE request 1240 indicating one of the trigger states from the second subset of CSI trigger states.

Figure 13:
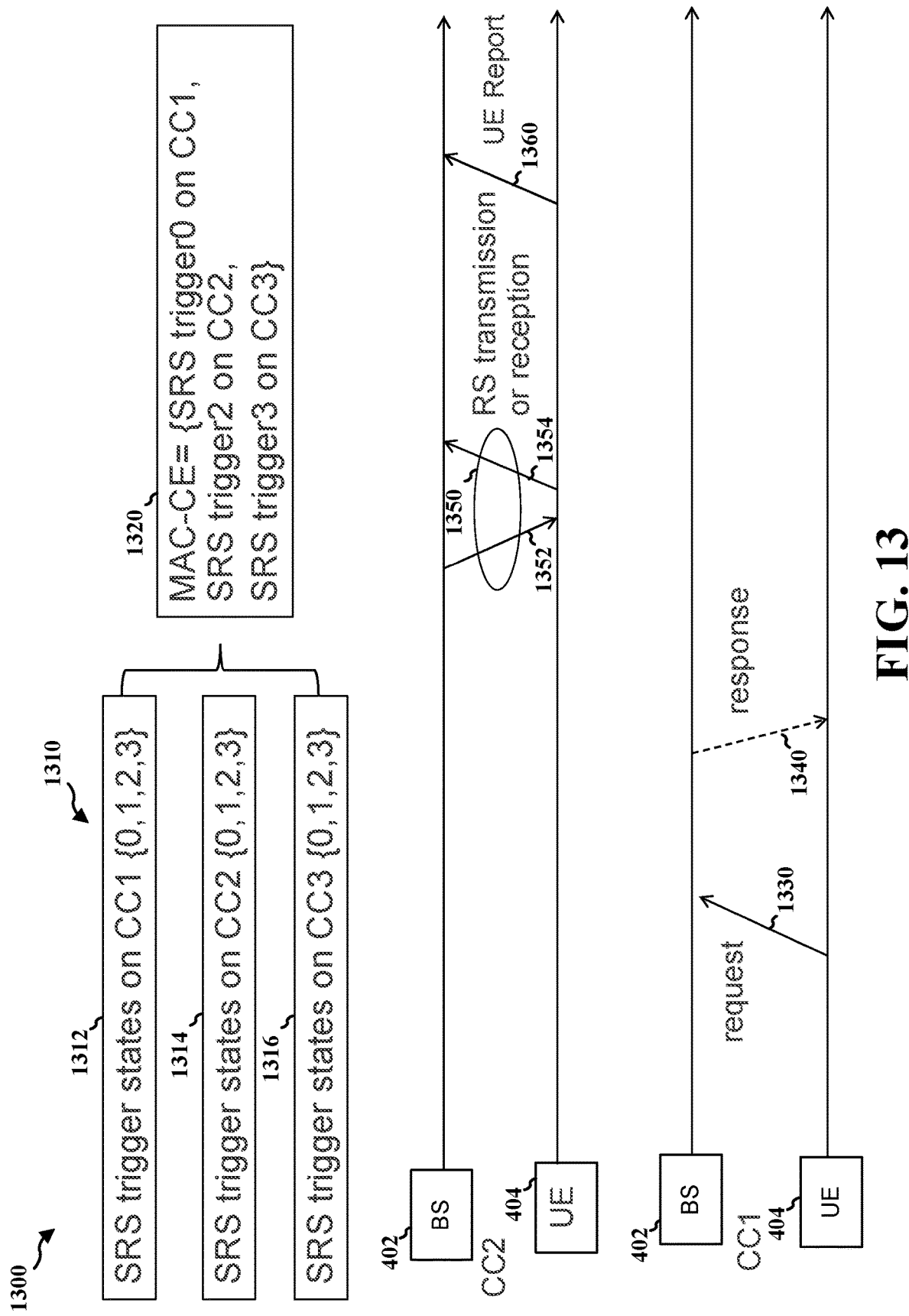
FIG. 13 is a diagram illustrating an example of selection of trigger states for multiple component carriers (CCs).

FIG. 13 is a diagram 1300 illustrating an example of selection of trigger states for multiple component carriers (CCs). The UE 404 may be an example of the UE 104 including the UL RS request component 140 depicted and described in FIG. 1. The BS 402 may be an example of the base station 102 including the RS request response component 120 depicted and described in FIG. 1. RRC signaling 1310 of trigger states may configure trigger states for one or more CCs. For example, the RRC signaling may configure SRS trigger states on CC1 1312 to include the set $\{0, 1, 2, 3\}$. Similarly, the RRC signaling may configure SRS trigger states on CC2 1314 to include the set $\{0, 1, 2, 3\}$. Similarly, the RRC signaling may configure SRS trigger states on CC3 1316 to include the set $\{0, 1, 2, 3\}$.

A MAC-CE 1320 may downselect a sub-list of activated trigger states that is applicable across CCs. For example, the MAC-CE 1320 may select a sub-list including SRS trigger 0 on CC1, SRS trigger 2 on CC2, and SRS trigger 3 on CC3. The MAC-CE 1320 may be a different format than the MAC-CE 900 and include a UE request ID such as SRS trigger state ID, serving cell ID, and BWP ID for each active trigger state. As discussed herein, the activated trigger states may be mapped to configured uplink resources in order.

A UE may request a RS using a cross-carrier request. For example, the UE 404 may transmit the request 1330 on CC1. The request 1330 may indicate an activated trigger state for uplink requests based on the mapping to configured resources. For example, the request 1330 may be transmitted using resources mapped to the SRS trigger 2 on CC2. The base station 402 may optionally transmit a response 1340 on CC1. The response 1340 may schedule the RS 1350 on CC2. If the UE 404 is not configured to receive the response 1340, the UE 404 may transmit or receive the request RS 1350 based on an offset from the request 1330. The UE 404 may receive a downlink RS 1352, transmit an uplink RS 1354, or a combination thereof. For example, the downlink RS 1352 may be a CSI-RS and the uplink RS 1354 may be an SRS. In some implementations, the UE 404 may transmit a UE report 1360 such as a CSI report based on the RS 1350.

Figure 14:
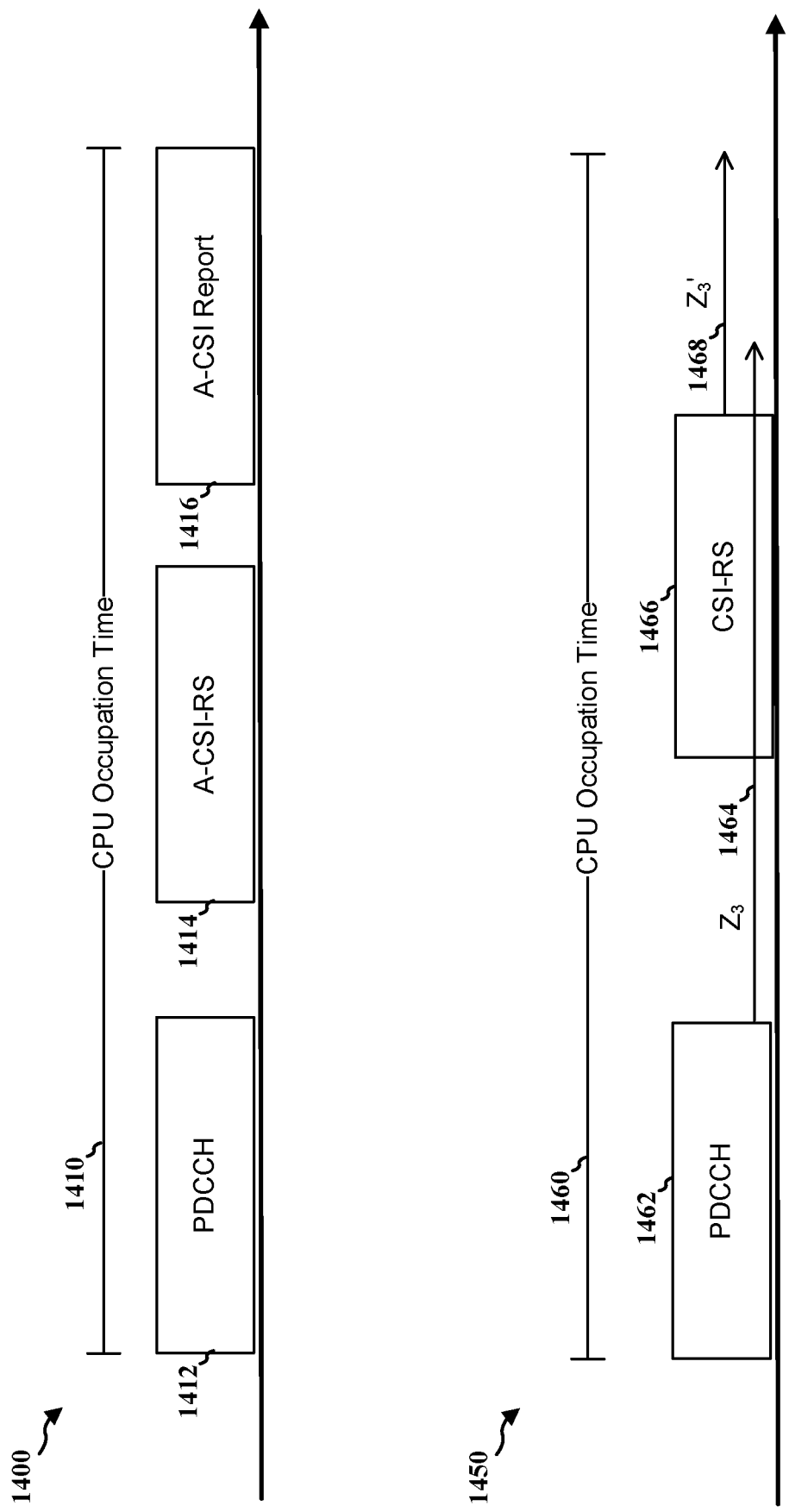
FIG. 14 is a diagram illustrating examples of CSI processing unit (CPU) occupation for downlink scheduled CSI operations.

FIG. 14 is a diagram illustrating examples of CSI processing unit (CPU) occupation for downlink scheduled CSI operations. A UE 104 may include hardware resources that are utilized for performing CSI operations. For example, the hardware resources may include antenna ports, buffers or memory for storing measurements, and processors for performing computations. The UE may have a maximum number of CSI operations that can be performed concurrently based on the hardware resources. The UE 104 may report a CPU capability indicating the maximum number of CSI operations that can be performed concurrently to the base station 102. Both the UE 104 and the base station 102 may track a CPU occupation to determine an accumulated number of CPU occupation such that the UE can perform CSI operations up to the maximum number of concurrent CSI operations.

In a first example 1400, the UE 104 may be scheduled for aperiodic CSI reporting by a PDCCH 1412. The UE 104 may measure an A-CSI-RS 1414 to generate a CSI report. For example, the CSI report may include one or more of: channel quality indicator (CQI), rank indicator (RI), or precoding matrix indicator (PMI). The UE 104 may transmit an A-CSI report 1416 on resources indicated by the PDCCH 1412. A CPU occupation time 1410 may extend from a first symbol of the PDCCH to a last symbol of the A-CSI report 1416.

In a second example 1450, the UE 104 may be scheduled to perform CSI measurements without transmitting a CSI report. For example, the CSI measurements may be used for refining a reception beam. A PDCCH 1462 may schedule the UE 104 to receive a CSI-RS 1466 to perform the CSI measurements. A minimum amount of time after the PDCCH 1462 may be defined as a number of symbols (Z) 1464. A minimum amount of time after the CSI-RS 1466 may be defined as a number of symbols (Z') 1468. When a CSI report is configured with no value to be transmitted, such as, for example when a reportQuantity field associated with the CSI report is set to "none" in RRC signaling, an aperiodic CSI report occupies CPU(s) from the first symbol after the PDCCH 1462 triggering the CSI report until the last symbol between $Z_3$ symbols after the first symbol after the PDCCH 1462 triggering the CSI report and $Z'_3$ symbols after the last symbol of the latest one of each CSI-RS 1466 resource for channel measurement. As illustrated, the $Z'_3$ symbols 1468 end after the $Z_3$ symbols 1464, so the CPU occupation time 1460 extends from the first symbol of the PDCCH 1462 to the last of the $Z'_3$ symbols 1468. $Z_3$ and $Z'_3$ may be determined from the following table, where $\mu$ indicates a subcarrier spacing, $X\mu$ is according to UE reported capability beamReportTiming and KB is according to UE reported capability beamSwitchTiming.

TABLE 1

| $\mu$ | $Z_1$ [symbols] | | $Z_2$ [symbols] | | $Z_3$ [symbols] | |
| --- | --- | --- | --- | --- | --- | --- |
| | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

Figure 15:
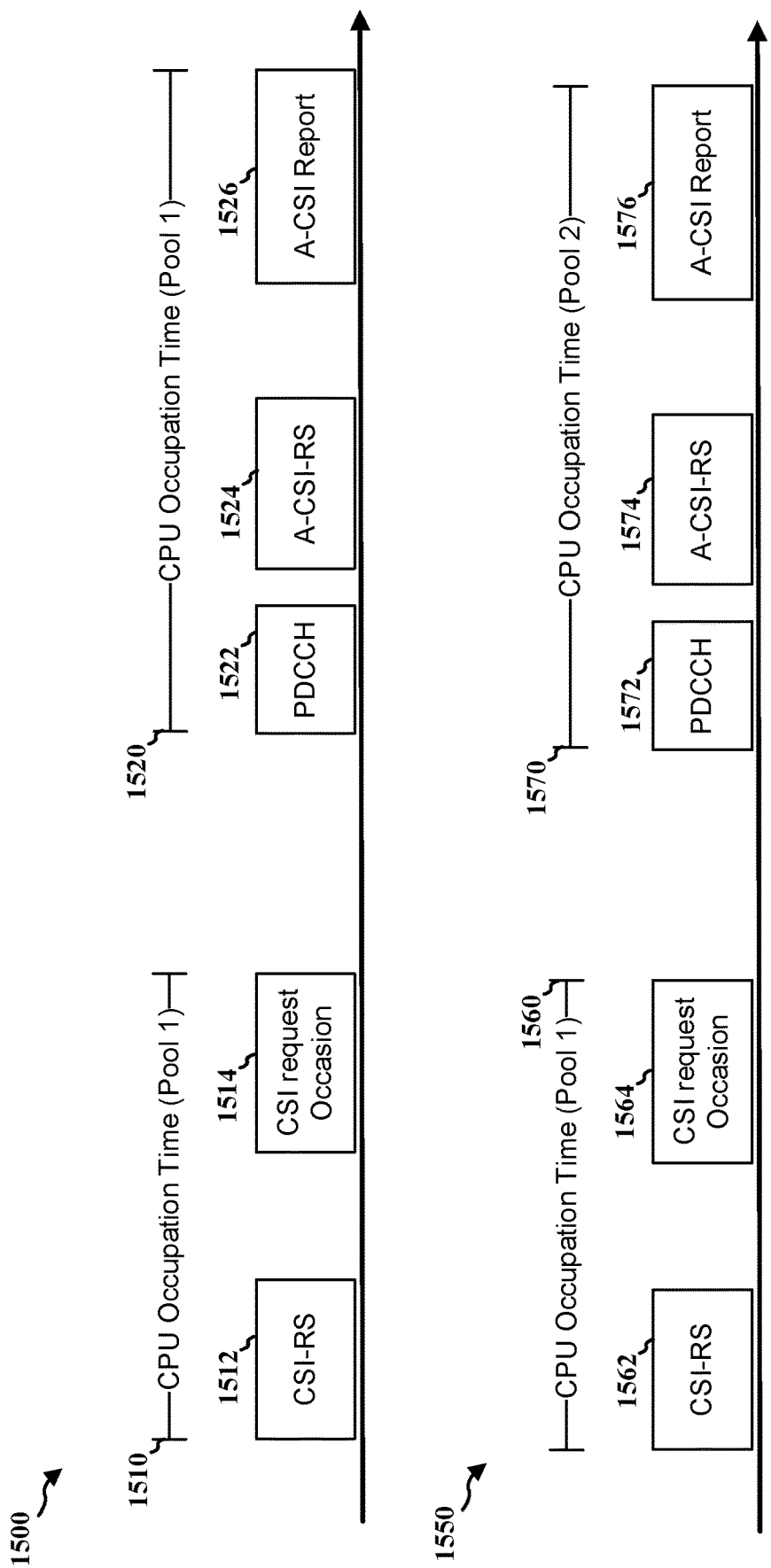
FIG. 15 is a diagram illustrating examples of CPU occupation for UE requested CSI operations with a downlink response.

FIG. 15 is a diagram illustrating examples of CPU occupation for UE requested CSI operations with a downlink response. In a first example 1500, the UE 104 may be configured with a CSI trigger state for uplink requests. The UE 104 may monitor a periodic CSI-RS 1512 to determine whether to transmit the uplink request on CSI request occasion 1514. At least some CPU resources may be utilized to monitor the periodic CSI-RS 1512. Once a CPU is used for triggering a CSI request, the CPU cannot be used for another CSI operation such as a CSI request or CSI report. The CPU resources may be released after the CSI request occasion 1514 regardless of whether the UE transmits the uplink request. Accordingly, a CPU occupation time 1510 may extend from a first symbol of the periodic CSI-RS 1512 to a last symbol of the CSI request occasion 1514. The periodic CSI-RS 1512 may be configured to be associated with the CSI request occasion 1514. In the event that the UE 104 transmits the uplink request, the base station 102 may respond by transmitting a PDCCH 1522, which may correspond to the response 420, 720. The PDCCH 1522 may schedule the A-CSI-RS 1524. The UE 104 may measure the A-CSI-RS 1524 to generate an A-CSI report 1526. The UE 104 may apply the same CPU resources used for triggering the CSI request for reporting the A-CSI report 1526 in response to the PDCCH 1522. Accordingly, the CPU occupation time 1520 may extend from a first symbol of the PDCCH 1522 to a last symbol of the A-CSI report 1526.

In some implementations, the CPU occupation time 1510 and the CPU occupation time 1520 may be applied to a same CPU resource pool. That is, resources for monitoring the CSI-RS 1512 and transmitting the uplink request in UE initiated CSI request procedure may be reused for receiving the A-CSI-RS 1524 and transmitting the A-CSI report 1526 in base-station initiated CSI request procedure. In some implementations, a lesser number of CPUs may be utilized during the CPU occupation time 1510 than during the CPU occupation time 1520. For example, monitoring the CSI-RS 1512 for an uplink CSI request may use fewer resources than measuring the corresponding A-CSI-RS 1524 for a downlink CSI request. The UE 104 may trigger the uplink CSI request based on a rough estimation that uses fewer CPUs than the downlink CSI request.

In a second example 1550, the uplink CSI request in UE initiated CSI request procedure and the downlink CSI request in base station initiated CSI request procedure may use resources from separate CPU resource pools. The UE 104 may be configured with one or more CSI trigger states for uplink requests. Each activated uplink CSI trigger state may occupy a separate number of CPUs depending on the configured resources for the uplink CSI trigger state. The UE 104 may monitor a periodic CSI-RS 1562 to determine whether to transmit the uplink request on CSI request occasion 1564. At least some CPU resources of a first CPU resource pool may be utilized to monitor the periodic CSI-RS 1562. Once a CPU is used for triggering a CSI request, the CPU cannot be used for another CSI operation such as a CSI request or CSI report. The CPU resources may be released after the CSI request occasion 1564 regardless of whether the UE transmits the uplink request. Accordingly, a CPU occupation time 1560 may extend from a first symbol of the periodic CSI-RS 1562 to a last symbol of the CSI request occasion 1564. In the event that the UE 104 transmits the uplink request, the base station 102 may respond by transmitting a PDCCH 1572, which may correspond to the response 420, 720. The PDCCH 1572 may schedule the A-CSI-RS 1574. The UE 104 may measure the A-CSI-RS 1574 to generate an A-CSI report 1576. When the UE 104 is configured with separate resource pools for uplink CSI requests and downlink CSI requests, the UE 104 may apply different CPU resources for reporting the A-CSI report 1576 in response to the PDCCH 1572 than used for triggering the uplink CSI request. Accordingly, the CPU occupation time 1570 may extend from a first symbol of the PDCCH 1572 to a last symbol of the A-CSI report 1576 and apply to a second CPU resource pool.

In some implementations, the CPU resources for uplink CSI requests in the first CPU resource pool may be reserved CPU resources of the second CPU pool. For instance, the CPU resources for the first pool may be reserved for active uplink CSI requests when trigger states for uplink CSI requests are activated. The reserved CPU resources may be subtracted from the reported CPU capability. In some implementations, the CPU resource for uplink CSI requests in the first CPU resource pool may be dedicated CPU resources. For instance, the UE 104 may separately indicate a CPU capability for uplink CSI requests in UE initiated CSI request procedure and the CPU capability for downlink requested CSI operations in base station initiated CSI request procedure.

Figure 16:
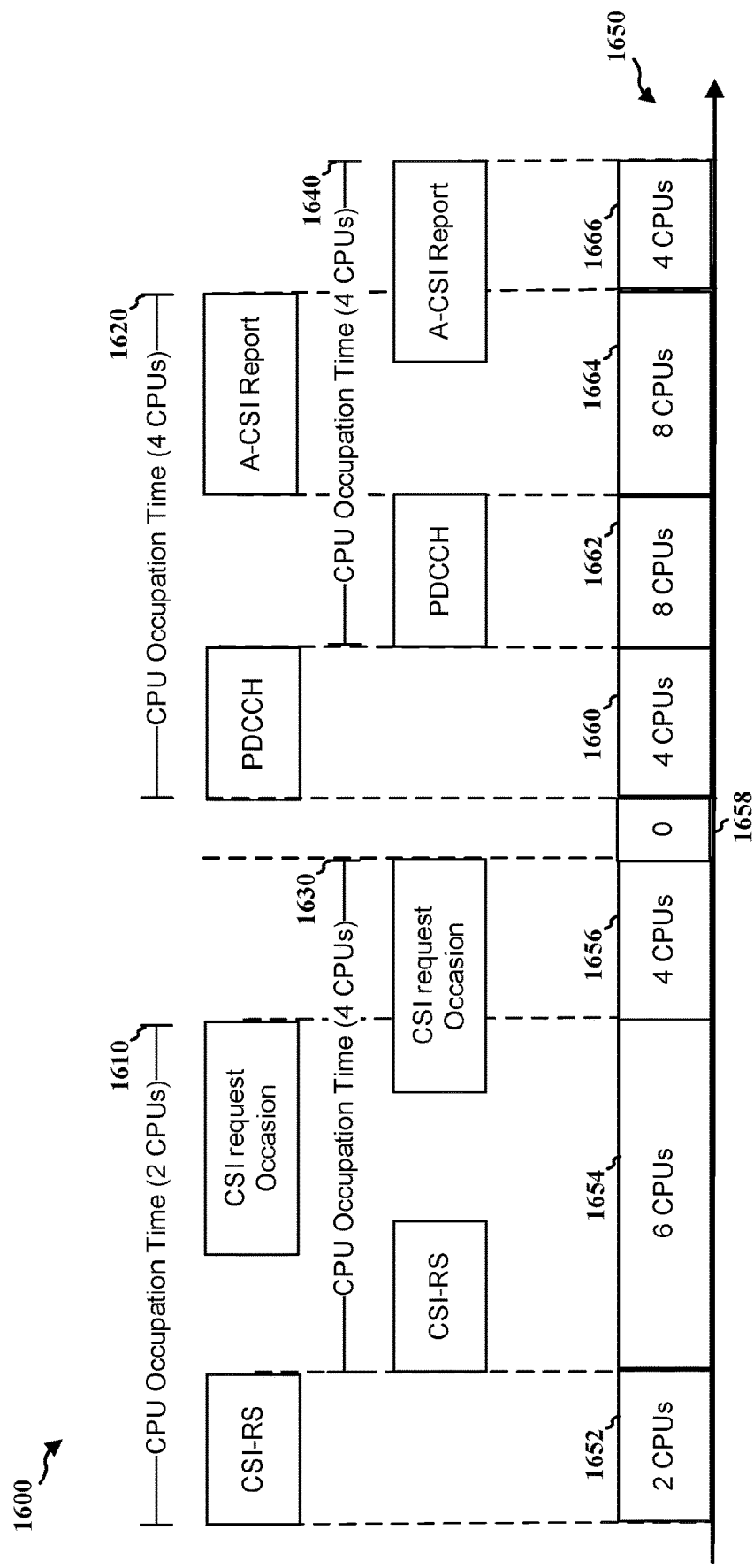
FIG. 16 is a diagram illustrating an example of accumulated CPU occupation for UE requested CSI operations.

FIG. 16 is a diagram 1600 illustrating an example of accumulated CPU occupation 1650 for UE requested CSI operations. The accumulated CPU occupation 1650 may be a total number of CPUs occupied at any time for concurrent CPU operations utilizing the same resource pool. In the illustrated example, a single resource pool as described above with respect to example 1500 may be utilized. A first CPU operation may be an uplink request with an occupation time 1610 that occupies 2 CPUs. A corresponding downlink CSI request may occupy 4 CPUs during occupation time 1620. A second CPU operation may be an uplink request with an occupation time 1630 that occupies 4 CPUs. A corresponding downlink CSI request may occupy 4 CPUs during occupation time 1640.

The accumulated CPU occupation 1650 may be a sum of the number of occupied CPUs for each active CPU occupation time. During a period 1652, the accumulated CPU occupation 1650 may be 2 CPUs because only the CPU occupation time 1610 is active. During a period 1654, in which the CPU occupation time 1610 overlaps with the CPU occupation time 1630, the accumulated CPU occupation 1650 may be 6 CPUs. After the CPU occupation time 1610 ends, during the period 1656, the accumulated CPU occupation 1650 may be 4 CPUs. During a period 1658, the accumulated CPU occupation 1650 may be 0 CPUs. During a period 1660, once the CPU occupation time 1620 starts, the accumulated CPU occupation 1650 may be 4 CPUs. During a period 1662, once the CPU occupation time 1640 starts, the accumulated CPU occupation 1650 may be 8 CPUs. The accumulated CPU occupation 1650 may remain at 8 CPUs during period 1664 while a first A-CSI report is transmitted. In period 1666, when the CPU occupation time 1630 ends, the accumulated CPU occupation 1650 may be 4 CPUs.

In some implementations, the base station 102 may configure the UE 104 such that the accumulated CPU occupation 1650 does not exceed the signaled CPU capability of the UE 104. For example, the base station 102 may configure a number of uplink CSI trigger states such that overlapping occupation times for the configured uplink CSI trigger states do not exceed the CPU capability. The base station 102 may refrain from scheduling downlink CSI requests if doing so would exceed the CPU capability.

Figure 17:
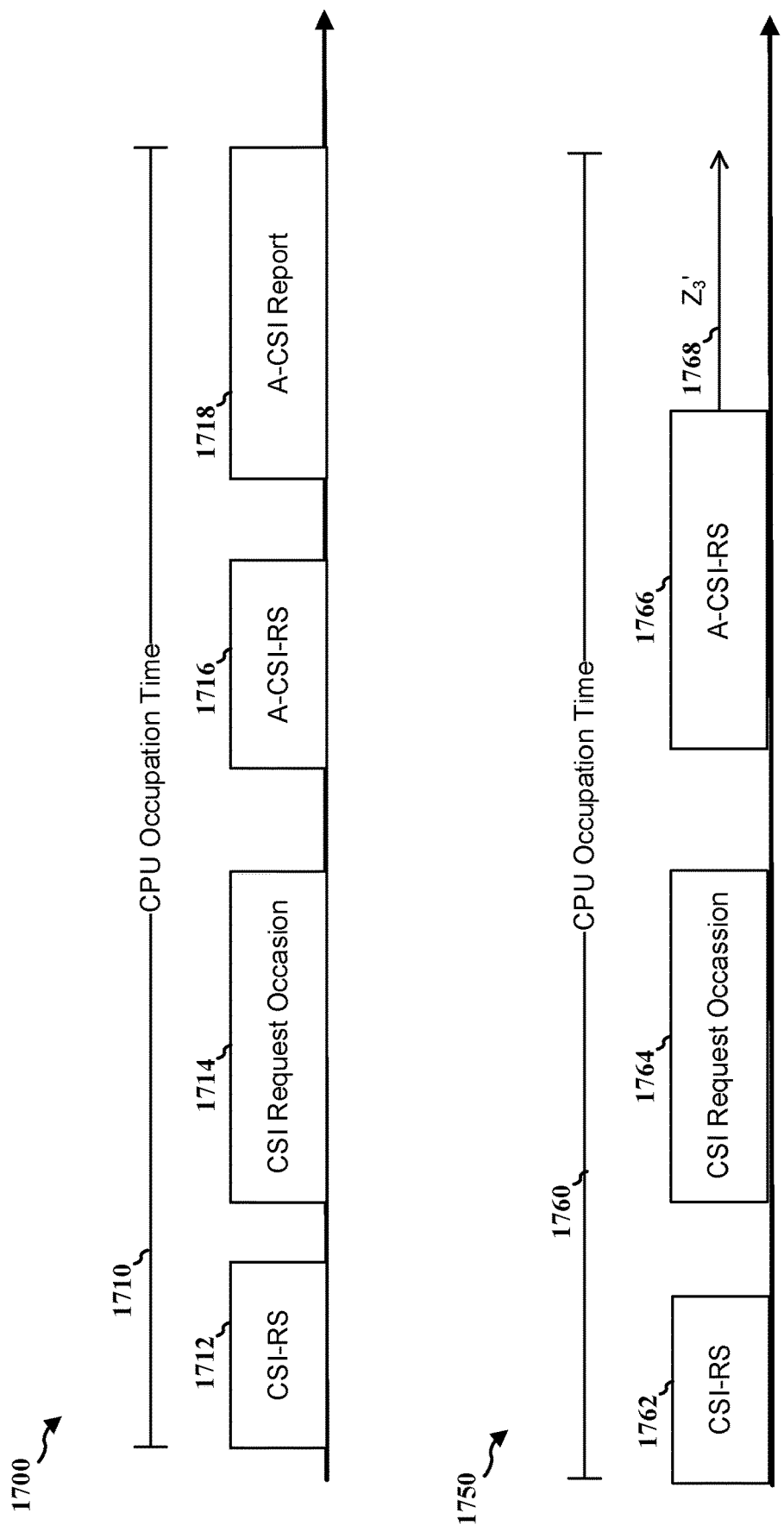
FIG. 17 is a diagram illustrating examples of CPU occupation for UE requested CSI operations without a downlink response.

FIG. 17 is a diagram illustrating examples of CPU occupation for UE requested CSI operations without a downlink response. As discussed above, CPU occupation time for downlink CSI requests may start at a PDCCH scheduling a CSI report. In the case of an uplink CSI request with no response 420, 720, there may be no PDCCH corresponding to the start of the downlink CSI request, but the UE 104 may still generate a CSI report or perform another CSI operation that utilizes CPUs.

In a first example 1700, the UE 104 may transmit an uplink CSI request for generating an A-CSI report. The UE 104 may measure a periodic CSI-RS 1712 associated with the uplink CSI request. The UE 104 may determine whether to transmit the uplink CSI request on the CSI request occasion 1714 based on the measurement to the CSI-RS 1712. If the UE 104 transmits the uplink CSI request, the UE 104 may receive the A-CSI-RS 1716 associated with the uplink CSI request. The UE 104 may generate the A-CSI report 1718 based on the A-CSI-RS 1716. A CPU occupation time 1710 may extend from a first symbol of the CSI-RS 1712 to a last symbol of the A-CSI report 1718. In particular, because there is no PDCCH that schedules the A-CSI-RS, both the UE 104 and the base station 102 may assume that the CPU resources are occupied based on the configured CSI trigger for uplink requests. Additionally, it may be possible for multiple CSI request configurations to overlap during a CPU occupation time 1710. The accumulated CPU occupation 1650 may account for each overlapping CSI request occasion.

In a second example 1750, the UE may request a CSI-RS with no report quantity. For example, the UE 104 may measure the CSI-RS for reception beam refinement in beam management. The UE 104 may not transmit a CSI report that marks the end of the CSI operation. The UE 104 may measure a periodic CSI-RS 1762 associated with the uplink CSI request. The UE 104 may determine whether to transmit the uplink CSI request on the CSI request occasion 1764 based on the measurement of the CSI-RS 1762. If the UE 104 transmits the uplink CSI request, the UE 104 may receive the A-CSI-RS 1766 associated with the uplink CSI request. Because there is no PDCCH, the time period $Z_3$ may not be applicable. The time period $Z_3'$ 1768, however, may be measured from the last symbol of the A-CSI-RS. Accordingly, the CPU occupation time 1760 may extend from the first symbol of the CSI-RS 1762 to the end of the time period $Z_3'$ 1768. Once again, if there are multiple CSI request occasions that overlap during the occupation time 1760, the accumulated CPU occupation 1650 may account for each overlapping CSI request occasion.

FIG. 18 is a diagram 1800 illustrating example communications and components of a base station 102 and a UE 104. An example of the base station 102 can be the BS 402, and an example of the UE 104 can be the UE 404 in the examples described herein. The UE 104 may include the UL RS request component 140. The base station 102 may include the RS request response component 120.

As discussed with respect to FIG. 1, the UL RS request component 140 may include the request transmitter 143 and the RS communication component 145. In some implementations, the RS communication component 145 may include a CSI-RS receiver 1802 configured to receive a CSI-SR. In some implementations, the RS communication component 145 may include a SRS transmitter 1804 configured to transmit an SRS. In some implementations, the UL RS request component 140 may include one or more of the configuration component 141, the activation component 142, the response receiver 144, or the report component 147. The UL RS request component 140 also may include a receiver component 1870 and a transmitter component 1872. The receiver component 1870 may include, for example, a radio-frequency (RF) receiver for receiving the signals described herein. The transmitter component 1872 may include for example, an RF transmitter for transmitting the signals described herein. In some implementations, the receiver component 1870 and the transmitter component 1872 may be co-located in a transceiver.

The RS request response component 120 may include the request receiving component 122 and the RS communication component 124. In some implementations, the RS communication component 124 may include a CSI-RS transmitter 1854 configured to transmit a CSI-RS. In some implementations, the RS communication component 124 may include a SRS receiver 1856 configured to receive a SRS. In some implementations, the RS request response component 120 also may optionally include one or more of a configuration transmitter 1860, an activation transmitter 1862, a response transmitter 1864, and a report receiver 1866. The RS request response component 120 also may include a receiver component 1850 and a transmitter component 1852. The receiver component 1850 may include, for example, a RF receiver for receiving the signals described herein. The transmitter component 1852 may include for example, an RF transmitter for transmitting the signals described herein. In some implementations, the receiver component 1850 and the transmitter component 1852 may be co-located in a transceiver.

The base station 102 or the RS request response component 120 may transmit a trigger state configuration 1810. The trigger state configuration 1810 may correspond to the RRC signaling 1010, 1110, 1210, or 1310, for example.

The base station 102 or the RS request response component 120 may transmit an activation/deactivation command 1812. The activation/deactivation command 1812 may correspond to the MAC-CE 900, 1020, 1022, 1120, 1122, 1220, 1230, or 1320, for example.

The UE 104 or the UL RS request component 140 may transmit an RS request 1814. The RS request 1814 may correspond to the request 410, 510, 710, 860, 1030, 1032, 1130, 1132, 1134, 1136, 1240, or 1330, for example.

The base station 102 or the RS request response component 120 may optionally transmit a response 1816. The response 1816 may correspond to the response 420, 520, 720, 870, or 1340, for example.

The base station 102 or the RS request response component 120 may transmit a CSI-RS 1818. The CSI-RS 1818 may correspond to the downlink reference signal 432 or 1352 or the A-CSI-RS 734 or 882.

The UE 104 or the UL RS request component 140 may transmit a SRS 1820. The SRS 1820 may correspond to the uplink reference signal 434 or 1354 or the A-SRS 534 or 884.

The UE 104 or the UL RS request component 140 may transmit a CSI report 1822. The CSI report 1822 may correspond to the report 1360, for example. The CSI report 1822 may include one or more of CQI 1840, RI 1842, or PMI 1844.

FIG. 19 is a conceptual data flow diagram 1900 illustrating the data flow between different means/components in an example base station 1902, which may be an example of the base station 102 including the RS request response component 120, which may be apparatus of a base station for wireless communication. The RS request response component 120 can be a component of a base station, such as a CU, a DU, or RU, or other component of a distributed architecture.

The receiver component 1850 may receive uplink signals from the UE 104 including the RS request 1814, the SRS 1820, and the CSI report 1822. In some implementations, the receiver component 1850 may receive UE capabilities. The receiver component 1850 may provide the CSI report to the report receiver 1866. The receiver component 1850 may provide the SRS to the RS communication component 124. The receiver component 1850 may provide the RS request 1814 to the request receiving component 122. The receiver component 1850 may provide the UE capabilities to the configuration transmitter 1860 or the activation transmitter 1862.

The request receiving component 122 may receive the RS request 1814 from the receiver component 1850. The request receiving component 122 may determine a requested RS based on a mapping from active trigger states to the uplink resource on which the RS request 1814 is received. The request receiving component 122 may provide the requested RS to the RS communication component 124 and the response transmitter 1864.

The RS communication component 124 may receive the requested RS from the request receiving component 122. The RS communication component 124 may control the receiver component 1850 and the transmitter component 1852 to communicate the requested RS. For example, the SRS receiver 1856 may control the receiver component 1850 to receive the SRS. As another example, the CSI-RS transmitter 1854 may control the transmitter component 1852 to transmit a CSI-RS.

In some implementations, the response transmitter 1864 may determine whether to transmit a grant scheduling the requested RS. For example, the response transmitter 1864 may include a scheduler configured to determine whether the resources for the requested RS are available or are scheduled for a different transmission. The response transmitter 1864 may transmit the response 1816 including the grant via the transmitter component 1852.

In some implementations, the configuration transmitter 1860 may generate the trigger state configuration 1810. The trigger state configuration 1810 may include one or more trigger states. For example, the trigger states may be based on UE capabilities including a number of CPUs in a resource pool for uplink requests. The configuration transmitter 1860 may transmit the trigger state configuration 1810 via the transmitter component 1852.

In some implementations, the activation transmitter 1862 may generate the activation/deactivation command 1812. The activation/deactivation command 1812 may be a MAC-CE that that activates a subset of the one or more CSI trigger states or SRS trigger states. The MAC-CE may deactivate trigger states that are not included in the subset. For example, the trigger states may be activated based on UE capabilities including a number of CPUs in a resource pool for uplink requests. The activation transmitter 1862 may transmit the activation/deactivation command 1812 via the transmitter component 1852.

In some implementations, the report receiver 1866 may receive a CSI report 1822. For example, where the RS communication component 124 transmits a CSI-RS 1818, the CSI report 1822 may be in response to the CSI-RS 1818.

Figure 20:
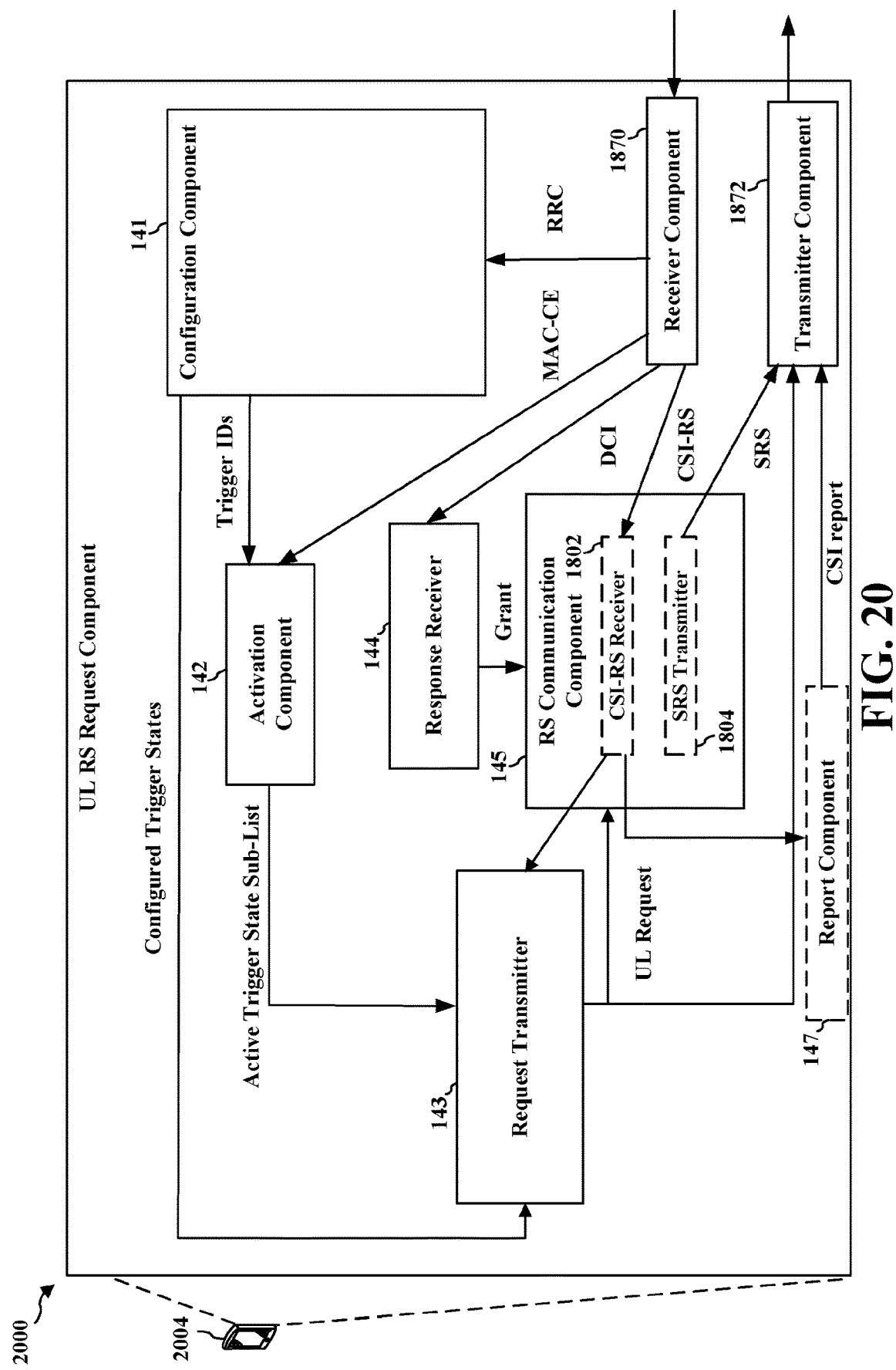
FIG. 20 is a conceptual data flow diagram illustrating the data flow between different means/components in an example UE.

FIG. 20 is a conceptual data flow diagram 2000 illustrating the data flow between different means/components in an example UE 2004, which may be an example of the UE 104 and include the UL RS request component 140. The UL RS request component 140 may be apparatus of a user equipment for wireless communication.

The receiver component 1870 may receive downlink signals such as the trigger state configuration 1810, the activation/deactivation command 1812, the response 1816, and the CSI-RS 1818. The receiver component 1870 may provide trigger state configuration 1810 to the configuration component 141. The receiver component 1870 may provide the activation/deactivation command 1812 to the activation component 142. The receiver component 1870 may provide the response 1816 to the response receiver 144. The receiver component 1870 may provide the CSI-RS 1818 to the CSI-RS receiver 1802.

The configuration component 141 may receive the trigger state configuration 1810 from the receiver component 1870. The configuration component 141 may extract a list of triggers such as SRS trigger states, CSI trigger states, or a combination thereof from the trigger state configuration 1810. The configuration component 141 may configure the request transmitter 143 with the configured trigger states.

The configuration component 141 may configure the activation component 142 with the trigger IDs of the configured trigger states.

The activation component 142 may receive the activation/deactivation command 1812, which may be a MAC-CE. The activation component 142 may determine a subset of configured trigger states that are activated. The activation component 142 may provide the subset of activated trigger states to the request transmitter 143.

The request transmitter 143 may receive configured trigger states from the configuration component 141. The request transmitter 143 may receive an active trigger state sub-list from the activation component 142. The request transmitter 143 may receive measurements from the CSI-RS receiver 1802. The request transmitter 143 may determine to request reference signal based on an active trigger state on the active trigger state sub-list. For example, the request transmitter 143 may determine that a measurement satisfies a threshold or that an event has occurred. The request transmitter 143 may determine an uplink resource mapped to the active trigger state. The request transmitter 143 may generate an uplink request indicating the active trigger state. For example, the request transmitter 143 may select an uplink resource, preamble, sequence, or value for the uplink request based on the mapping between uplink resources and active trigger states. The request transmitter 143 may provide the uplink request to the transmitter component 1872 for transmission. The request transmitter 143 also may provide the uplink request to the RS communication component 145.

The response receiver 144 may receive the response 1816 from the receiver component 1870. The response receiver 144 may determine whether the response 1816 includes a grant for a reference signal. The response receiver 144 may provide the grant to the RS communication component 145.

The RS communication component 145 may receive the UL request from the request transmitter 143. In some implementations, the RS communication component 145 may receive a grant from the response receiver 144. The RS communication component 145 may determine which reference signals to communicate based on the uplink request and the grant, if received. The RS communication component 145 or the CSI-RS receiver 1802 may receive a CSI-RS. The RS communication component 145 or the SRS transmitter 1804 may transmit an SRS.

The report component 147 may receive the measurements from the RS communication component 145. The report component 147 may generate a CSI report based on the measurements. The report component 147 may transmit the CSI report via the transmitter component 1872.

Figure 21:
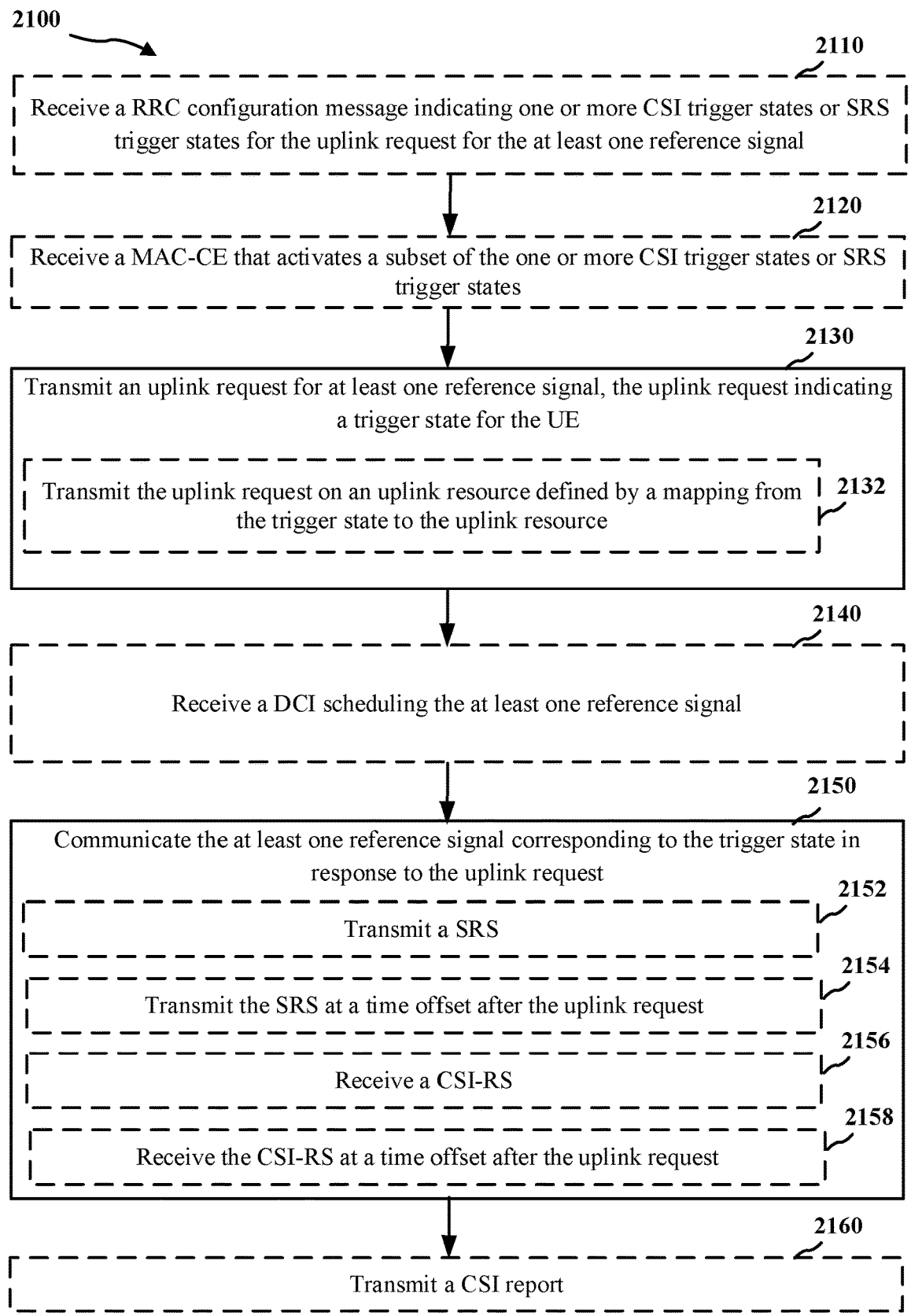
FIG. 21 is a flowchart of an example method for a UE to request a reference signal.

FIG. 21 is a flowchart of an example method 2100 for a UE to request at least one reference signal. The method 2100 may be performed by a UE (such as the UE 104, which may include the memory 360 and which may be the entire UE 104 or a component of the UE 104 such as the UL RS request component 140, TX processor 368, the RX processor 356, or the controller/processor 359). The method 2100 may be performed by the UL RS request component 140 in communication with the RS request response component 120 of the base station 102. Optional blocks are shown with dashed lines.

At block 2110, the method 2100 may optionally include receiving a RRC configuration message indicating one or more CSI trigger states or SRS trigger states for the uplink request for the at least one reference signal. In some implementations, for example, the UE 104, the RX processor 356, or the controller/processor 359 may execute the UL RS request component 140 or the configuration component 141 to receive the trigger state configuration 1810 indicating one or more CSI trigger states or SRS trigger states for the uplink request for the at least one reference signal. Accordingly, the UE 104, the RX processor 356, or the controller/processor 359 executing the UL RS request component 140 or the configuration component 141 may provide means for receiving a RRC configuration message indicating one or more CSI trigger states or SRS trigger states for the uplink request for the at least one reference signal.

At block 2120, the method 2100 may optionally include receiving a MAC-CE that activates a subset of the one or more CSI trigger states or SRS trigger states. In some implementations, for example, the UE 104, the RX processor 356 or the controller/processor 359 may execute the UL RS request component 140 or the activation component 142 to receive a MAC-CE that activates a subset of the one or more CSI trigger states or SRS trigger states. Accordingly, the UE 104, the RX processor 356, or the controller/processor 359 executing the UL RS request component 140 or the activation component 142 may provide means for receiving a MAC-CE that activates a subset of the one or more CSI trigger states or SRS trigger states.

At block 2130, the method 2100 may include transmitting an uplink request for at least one reference signal, the uplink request indicating a trigger state for the UE. In some implementations, for example, the UE 104, the TX processor 368, or the controller/processor 359 may execute the UL RS request component 140 or the request transmitter 143 to transmit the RS request 1814 for at least one reference signal, the RS request 1814 indicating a trigger state for the UE. In some implementations, at sub-block 2132, the block 2130 may optionally include transmitting the uplink request on an uplink resource defined by a mapping 1040, 1050, 1140, or 1150 from the trigger state to the uplink resource. For example, when the uplink resource is a PRACH, the trigger state may be mapped to a PRACH preamble, a PRACH occasion, or a combination thereof. The PRACH may be one of a contention based PRACH, a non-contention based PRACH, or a two-step PRACH. As another example, when the uplink resource is a PUCCH, the trigger state may be mapped to a UCI code point, a PUCCH occasion, or a combination thereof. As another example, when the uplink resource is a MAC-CE, the trigger state may be mapped to a bit field of the MAC-CE. Accordingly, the UE 104, the Tx processor 368, or the controller/processor 359 executing the UL RS request component 140 or the request transmitter 143 may provide means for transmitting an uplink request for at least one reference signal, the uplink request indicating a trigger state for the UE.

At block 2140, the method 2100 may optionally include receiving a DCI scheduling the at least one reference signal. In some implementations, for example, the UE 104, the RX processor 356 or the controller/processor 359 may execute the UL RS request component 140 or the response receiver 144 to receive a DCI scheduling the at least one reference signal. In some implementations, the DCI includes a SRS request. In some implementations, the DCI includes a CSI request. Accordingly, the UE 104, the RX processor 356, or the controller/processor 359 executing the UL RS request component 140 or the response receiver 144 may provide means for receiving a DCI scheduling the at least one reference signal.

At block 2150, the method 2100 may include communicating the at least one reference signal corresponding to the trigger state in response to the uplink request. In some implementations, for example, the UE 104, the RX processor 356, the TX processor 368, or the controller/processor 359 may execute the UL RS request component 140 or the RS communication component 145 to communicate the at least one reference signal corresponding to the trigger state in response to the uplink request. In some implementations, at sub-block 2152, the block 2150 may optionally include transmitting an SRS. For instance, the SRS transmitter 1804 may transmit the SRS when the uplink request indicates an SRS trigger state. In some implementations, at sub-block 2154 the block 2150 or the sub-block 2152 may include transmitting the SRS at a time offset after the uplink request. For example, where the UE 104 is not configured to receive a grant, the SRS transmitter 1804 may transmit the SRS at a time offset after the uplink request. The time offset may be associated with the trigger state. In some implementations, at sub-block 2156, the block 2150 may optionally include receiving a CSI-RS. For instance, the CSI-RS receiver 182 may receive the CSI-RS when the uplink request indicates a CSI trigger state. In some implementations, at sub-block 2158 the block 2150 or the sub-block 2156 may include receiving the CSI-RS at a time offset after the uplink request. For example, where the UE 104 is not configured to receive a grant, the CSI-RS receiver 1802 may receive the CSI-RS at a time offset after the uplink request. The time offset may be associated with the trigger state. Accordingly, the UE 104, the RX processor 356, the TX processor 368, or the controller/processor 359 executing the UL RS request component 140 or the RS communication component 145 may provide means for communicating the at least one reference signal corresponding to the trigger state in response to the uplink request.

At block 2160, the method 2100 may optionally include transmitting a CSI report. In some implementations, for example, the UE 104, the RX processor 356 or the controller/processor 359 may execute the UL RS request component 140 or the report component 147 to transmit the CSI report. Accordingly, the UE 104, the RX processor 356, or the controller/processor 359 executing the UL RS request component 140 or the report component 147 may provide means for transmitting a CSI report.

Figure 22:
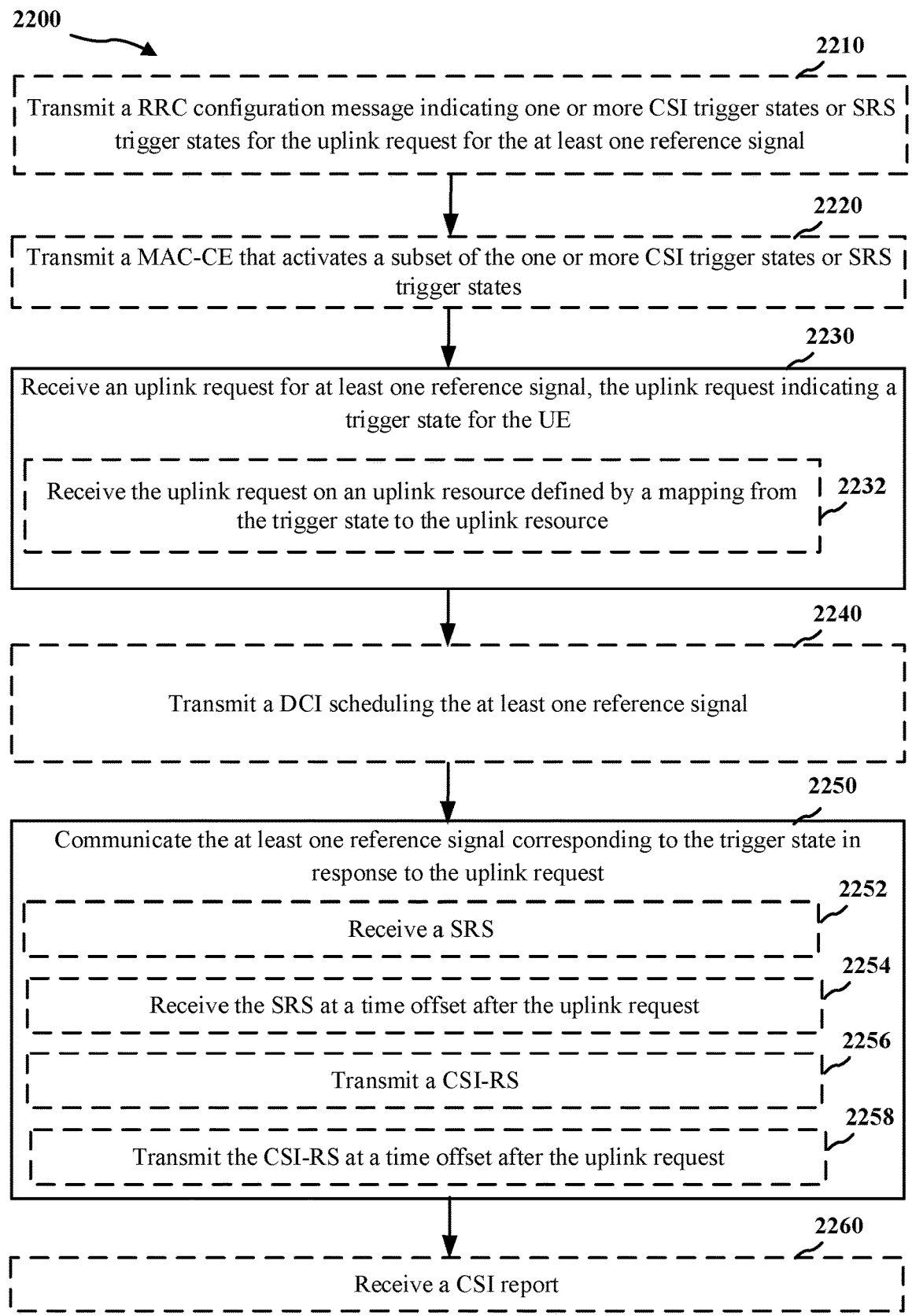
FIG. 22 is a flowchart of an example method for a BS to receive a UE initiated request for a reference signal.

FIG. 22 is a flowchart of an example method 2200 for a base station to receive an uplink RS request. The method 2200 may be performed by a base station (such as the base station 102, which may include the memory 376 and which may be the entire base station 102 or a component of the base station 102 such as the RS request response component 120, TX processor 316, the RX processor 370, or the controller/processor 375). The method 2200 may be performed by the RS request response component 120 in communication with the UL RS request component 140 of the UE 104.

At block 2210, the method 2200 may optionally include transmitting a RRC configuration message indicating one or more CSI trigger states or SRS trigger states for the uplink request for the at least one reference signal. In some implementations, for example, the base station 102, TX processor 316, or the controller/processor 375 may execute the RS request response component 120 or the configuration transmitter 1860 to transmit the trigger state configuration 1810 indicating one or more CSI trigger states or SRS trigger states for the uplink request for the at least one reference signal. Accordingly, the base station 102, TX processor 316, or the controller/processor 375 executing the RS request response component 120 or the configuration transmitter 1860 may provide means for transmitting a RRC configuration message indicating one or more CSI trigger states or SRS trigger states for the uplink request for the at least one reference signal.

At block 2220, the method 2200 may optionally include transmitting a MAC-CE that activates a subset of the one or more CSI trigger states or SRS trigger states. In some implementations, for example, the base station 102, TX processor 316, the RX processor 370, or the controller/processor 375 may execute the RS request response component 120 or the activation transmitter 1862 to transmit a MAC-CE that activates a subset of the one or more CSI trigger states or SRS trigger states. Accordingly, the base station 102, TX processor 316, or the controller/processor 375 executing the RS request response component 120 or the activation transmitter 1862 may provide means for transmitting a MAC-CE that activates a subset of the one or more CSI trigger states or SRS trigger states.

At block 2230, the method 2200 may include receiving an uplink request for at least one reference signal, the uplink request indicating a trigger state for the UE. In some implementations, for example, the base station 102, the RX processor 370, or the controller/processor 375 may execute the RS request response component 120 or the request receiving component 122 to receive the uplink request 1814 for at least one reference signal, the uplink request 1814 indicating a trigger state for the UE. In some implementations, at sub-block 2232, the block 2230 may optionally include receiving the uplink request on an uplink resource defined by a mapping 1040, 1050, 1140, or 1150 from the trigger state to the uplink resource. For example, when the uplink resource is a PRACH, the trigger state may be mapped to a PRACH preamble, a PRACH occasion, or a combination thereof. The PRACH may be one of a contention based PRACH, a non-contention based PRACH, or a two-step PRACH. As another example, when the uplink resource is a PUCCH, the trigger state may be mapped to a UCI code point, a PUCCH occasion, or a combination thereof. As another example, when the uplink resource is a MAC-CE, the trigger state may be mapped to a bit field of the MAC-CE. Accordingly, the base station 102, the RX processor 370, or the controller/processor 375 executing the RS request response component 120 or the request receiving component 122 may provide means for receiving an uplink request for at least one reference signal, the uplink request indicating a trigger state for the UE.

At block 2240, the method 2200 may optionally include transmitting a DCI scheduling the at least one reference signal. In some implementations, for example, the base station 102, TX processor 316, the RX processor 370, or the controller/processor 375 may execute the RS request response component 120 or the response transmitter 1864 to transmit a DCI scheduling the at least one reference signal. In some implementations, the DCI includes a SRS request. In some implementations, the DCI includes a CSI request. Accordingly, the base station 102, TX processor 316, or the controller/processor 375 executing the RS request response component 120 or the response transmitter 1864 may provide means for transmitting a DCI scheduling the at least one reference signal.

At block 2250, the method 2200 may include communicating the at least one reference signal corresponding to the trigger state in response to the uplink request. In some implementations, for example, the base station 102, TX processor 316, the RX processor 370, or the controller/processor 375 may execute the RS request response component 120 or the RS communication component 124 to communicate the at least one reference signal corresponding to the trigger state in response to the uplink request. In some implementations, at sub-block 2252, the block 2150 may optionally include receiving an SRS. For instance, the SRS receiver 1856 may receive the SRS when the uplink request indicates an SRS trigger state. In some implementations, at sub-block 2254 the block 2250 or the sub-block 2252 may include receiving the SRS at a time offset after the uplink request. For example, where the UE 104 is not configured to receive a grant, the SRS receiver 1856 may receive the SRS at a time offset after the uplink request. The time offset may be associated with the trigger state. In some implementations, at sub-block 2256, the block 2250 may optionally include transmitting a CSI-RS. For instance, the CSI-RS transmitter 1854 may transmit the CSI-RS when the uplink request indicates a CSI trigger state. In some implementations, at sub-block 2258, the block 2250 or the sub-block 2256 may include transmitting the CSI-RS at a time offset after the uplink request. For example, where the UE 104 is not configured to receive a grant, the CSI-RS transmitter 1854 may transmit the CSI-RS at a time offset after the uplink request. The time offset may be associated with the trigger state. Accordingly, the base station 102, TX processor 316, the RX processor 370, or the controller/processor 375 executing the RS request response component 120 or the RS communication component 124 may provide means for communicating the at least one reference signal corresponding to the trigger state in response to the uplink request.

At block 2260, the method 2200 may optionally include receiving a CSI report. In some implementations, for example, base station 102, the RX processor 370, or the controller/processor 375 may execute the RS request response component 120 or the report component 147 to receive the CSI report. Accordingly, the base station 102, the RX processor 370, or the controller/processor 375 executing the RS request response component 120 or the report receiver 1866 may provide means for receiving a CSI report.

Figure 23:
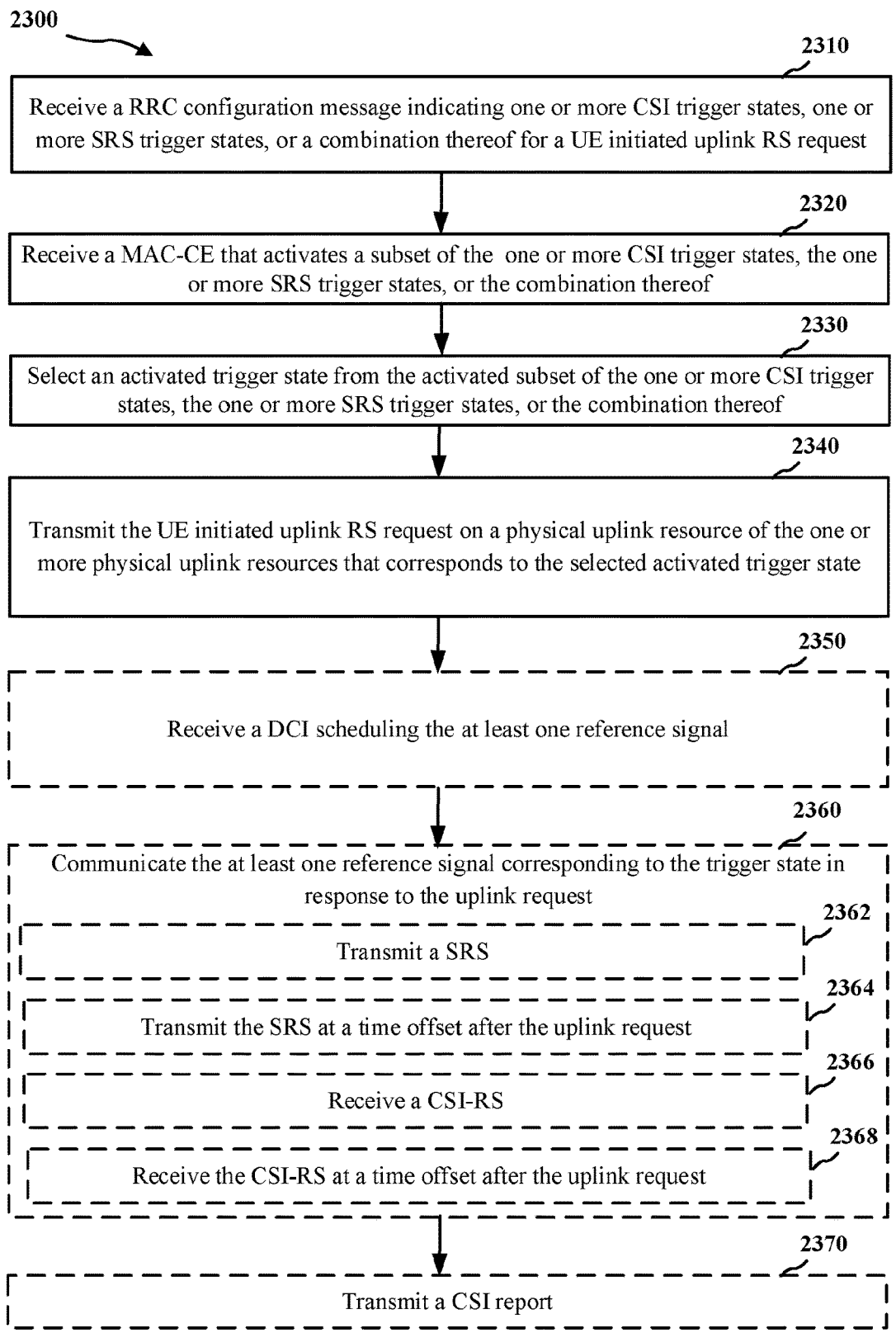
FIG. 23 is a flowchart of an example method for a UE to request a reference signal based on a MAC-CE.

FIG. 23 is a flowchart of an example method 2300 for a UE to request at least one reference signal. The method 2300 may be performed by a UE (such as the UE 104, which may include the memory 360 and which may be the entire UE 104 or a component of the UE 104 such as the UL RS request component 140, TX processor 368, the RX processor 356, or the controller/processor 359). The method 2300 may be performed by the UL RS request component 140 in communication with the RS request response component 120 of the base station 102. Optional blocks are shown with dashed lines.

At block 2310, the method 2300 may include receiving a RRC configuration message indicating one or more CSI trigger states, one or more SRS trigger states, or a combination thereof. In some implementations, for example, the UE 104, the RX processor 356, or the controller/processor 359 may execute the UL RS request component 140 or the configuration component 141 to receive the trigger state configuration 1810 indicating the one or more CSI trigger states, the one or more SRS trigger states, or the combination thereof for the UE initiated uplink RS request. Accordingly, the UE 104, the RX processor 356, or the controller/processor 359 executing the UL RS request component 140 or the configuration component 141 may provide means for receiving a RRC configuration message indicating the one or more CSI trigger states, the one or more SRS trigger states, or the combination thereof for a UE initiated uplink RS request.

At block 2320, the method 2300 may include receiving a MAC-CE that activates a subset of the one or more CSI trigger states, the one or more SRS trigger states, or the combination thereof. In some implementations, for example, the UE 104, the RX processor 356 or the controller/processor 359 may execute the UL RS request component 140 or the activation component 142 to receive the MAC-CE such as the activation/deactivation command 1812 that activates a subset of the one or more CSI trigger states, the one or more SRS trigger states, or the combination thereof. There may be a one-to-one mapping between the activated subset of the one or more CSI trigger states, the one or more SRS trigger states, or the combination thereof and one or more physical uplink resources. Accordingly, the UE 104, the RX processor 356, or the controller/processor 359 executing the UL RS request component 140 or the activation component 142 may provide means for receiving a MAC-CE that activates a subset of the one or more CSI trigger states, the one or more SRS trigger states, or the combination thereof.

At block 2330, the method 2300 may include selecting an activated trigger state from the activated subset of the one or more CSI trigger states, the one or more SRS trigger states, or the combination thereof. In some implementations, for example, the UE 104, the TX processor 368, or the controller/processor 359 may execute the UL RS request component 140 or the request transmitter 143 to select an activated trigger state from the activated subset of the one or more CSI trigger states, the one or more SRS trigger states, or the combination thereof. Accordingly, the UE 104, the Tx processor 368, or the controller/processor 359 executing the UL RS request component 140 or the request transmitter 143 may provide means for selecting an activated trigger state from the activated subset of the one or more CSI trigger states, the one or more SRS trigger states, or the combination thereof.

At block 2340, the method 2300 may include transmitting the UE initiated uplink RS request on a physical uplink resource of the one or more physical uplink resources that corresponds to the selected activated trigger state. In some implementations, for example, the UE 104, the TX processor 368, or the controller/processor 359 may execute the UL RS request component 140 or the transmitter component 1872 to transmit the RS request 1814 on a physical uplink resource of the one or more physical uplink resources that corresponds to the selected activated trigger state. For example, when the uplink resource is a PRACH, the trigger state may be mapped to a PRACH preamble, a PRACH occasion, or a combination thereof. The PRACH may be one of a contention based PRACH, a non-contention based PRACH, or a two-step PRACH. As another example, when the uplink resource is a PUCCH, the trigger state may be mapped to a UCI code point, a PUCCH occasion, or a combination thereof. As another example, when the uplink resource is a MAC-CE, the trigger state may be mapped to a bit field of the MAC-CE. Accordingly, the UE 104, the Tx processor 368, or the controller/processor 359 executing the UL RS request component 140 or the transmitter component 1872 may provide means transmitting the UE initiated uplink RS request on a physical uplink resource of the one or more physical uplink resources that corresponds to the selected activated trigger state.

At block 2350, the method 2300 may optionally include receiving a DCI scheduling the at least one reference signal. In some implementations, for example, the UE 104, the RX processor 356 or the controller/processor 359 may execute the UL RS request component 140 or the response receiver 144 to receive a DCI scheduling the at least one reference signal. In some implementations, the DCI includes a SRS request. In some implementations, the DCI includes a CSI request. Accordingly, the UE 104, the RX processor 356, or the controller/processor 359 executing the UL RS request component 140 or the response receiver 144 may provide means for receiving a DCI scheduling the at least one reference signal.

At block 2360, the method 2300 may optionally include communicating the at least one reference signal corresponding to the trigger state in response to the uplink request. In some implementations, for example, the UE 104, the RX processor 356, the TX processor 368, or the controller/processor 359 may execute the UL RS request component 140 or the RS communication component 145 to communicate the at least one reference signal corresponding to the trigger state in response to the uplink request. In some implementations, at sub-block 2362, the block 2360 may optionally include transmitting an SRS. For instance, the SRS transmitter 1804 may transmit the SRS when the uplink request indicates an SRS trigger state. In some implementations, at sub-block 2364 the block 2360 or the sub-block 2362 may include transmitting the SRS at a time offset after the uplink request. For example, where the UE 104 is not configured to receive a grant, the SRS transmitter 1804 may transmit the SRS at a time offset after the uplink request. The time offset may be associated with the trigger state. In some implementations, at sub-block 2366, the block 2360 may optionally include receiving a CSI-RS. For instance, the CSI-RS receiver 182 may receive the CSI-RS when the uplink request indicates a CSI trigger state. In some implementations, at sub-block 2368 the block 2360 or the sub-block 2366 may include receiving the CSI-RS at a time offset after the uplink request. For example, where the UE 104 is not configured to receive a grant, the CSI-RS receiver 1802 may receive the CSI-RS at a time offset after the uplink request. The time offset may be associated with the trigger state. Accordingly, the UE 104, the RX processor 356, the TX processor 368, or the controller/processor 359 executing the UL RS request component 140 or the RS communication component 145 may provide means for communicating the at least one reference signal corresponding to the trigger state in response to the uplink request.

At block 2370, the method 2300 may optionally include transmitting a CSI report. In some implementations, for example, the UE 104, the RX processor 356 or the controller/processor 359 may execute the UL RS request component 140 or the report component 147 to transmit the CSI report. Accordingly, the UE 104, the RX processor 356, or the controller/processor 359 executing the UL RS request component 140 or the report component 147 may provide means for transmitting a CSI report.

Figure 24:
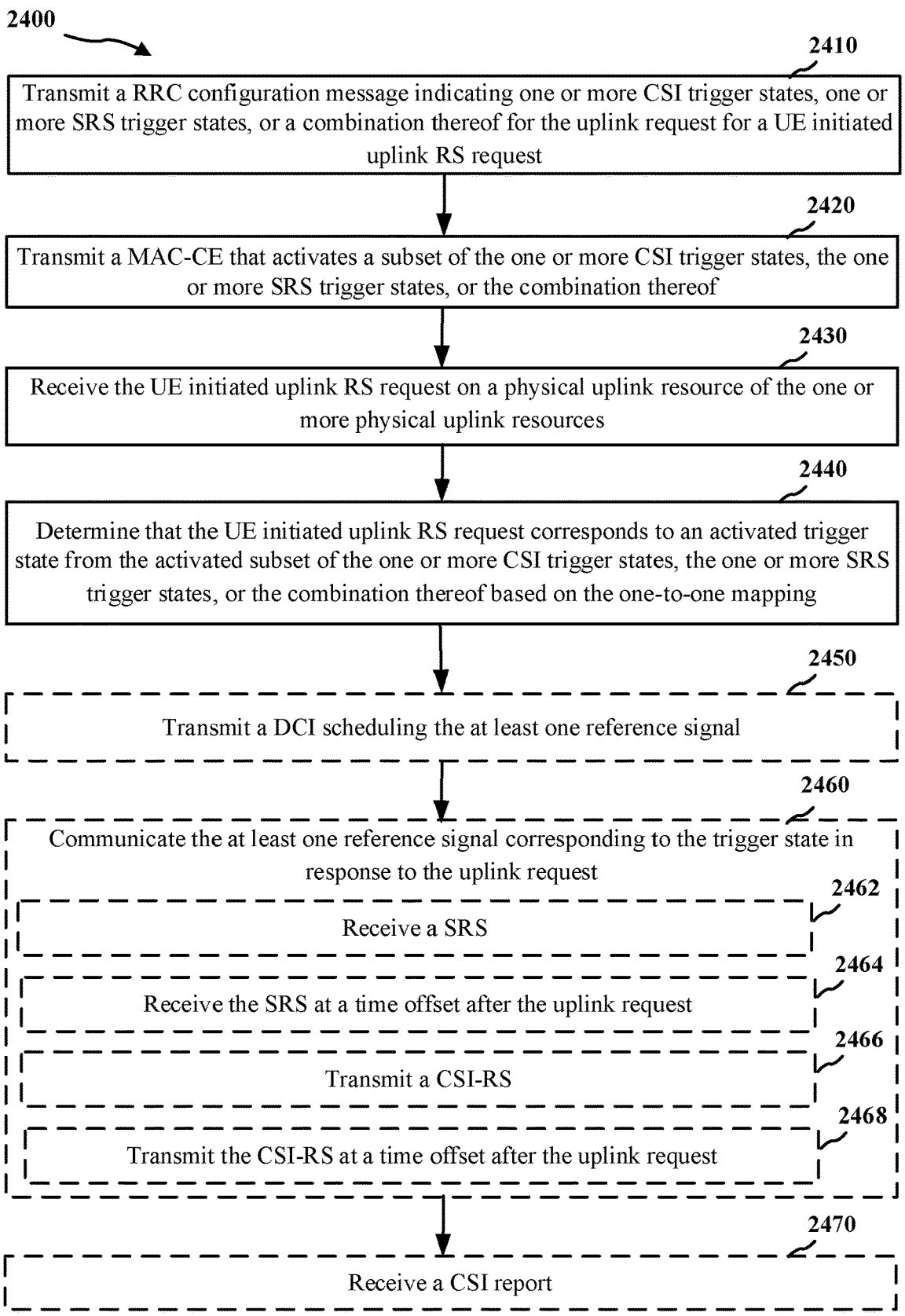
FIG. 24 is a flowchart of an example method for a BS to receive a UE initiated request for a reference signal based on a MAC-CE.

FIG. 24 is a flowchart of an example method 2400 for a base station to receive an uplink RS request. The method 2400 may be performed by a base station (such as the base station 102, which may include the memory 376 and which may be the entire base station 102 or a component of the base station 102 such as the RS request response component 120, TX processor 316, the RX processor 370, or the controller/processor 375). The method 2400 may be performed by the RS request response component 120 in communication with the UL RS request component 140 of the UE 104.

At block 2410, the method 2400 may include transmitting a RRC configuration message indicating one or more CSI trigger states or SRS trigger states for the uplink request for a UE initiated uplink RS request. In some implementations, for example, the base station 102, TX processor 316, or the controller/processor 375 may execute the RS request response component 120 or the configuration transmitter

1860 to transmit the trigger state configuration 1810 indicating one or more CSI trigger states or SRS trigger states for the UE initiated uplink RS request. Accordingly, the base station 102, TX processor 316, or the controller/processor 375 executing the RS request response component 120 or the configuration transmitter 1860 may provide means for transmitting a RRC configuration message indicating one or more CSI trigger states or SRS trigger states for the uplink request for a UE initiated uplink RS request.

At block 2420, the method 2400 may include transmitting a MAC-CE that activates a subset of the one or more CSI trigger states or SRS trigger states. In some implementations, for example, the base station 102, TX processor 316, the RX processor 370, or the controller/processor 375 may execute the RS request response component 120 or the activation transmitter 1862 to transmit a MAC-CE that activates a subset of the one or more CSI trigger states or SRS trigger states. There may be a one-to-one mapping between one or more activated trigger states in the subset and one or more physical uplink resources. Accordingly, the base station 102, TX processor 316, or the controller/processor 375 executing the RS request response component 120 or the activation transmitter 1862 may provide means for transmitting a MAC-CE that activates a subset of the one or more CSI trigger states or SRS trigger states.

At block 2430, the method 2400 may include receiving the UE initiated uplink RS request on a physical uplink resource of the one or more physical uplink resources. In some implementations, for example, the base station 102, the RX processor 370, or the controller/processor 375 may execute the RS request response component 120 or the receiver component 1850 to receive the uplink request 1814 on a physical uplink resource of the one or more physical uplink resources. Accordingly, the base station 102, the RX processor 370, or the controller/processor 375 executing the RS request response component 120 or the receiver component 1850 may provide means for receiving an uplink request for at least one reference signal, the uplink request indicating a trigger state for the UE.

At block 2440, the method 2400 may include determining that the UE initiated uplink RS request corresponds to an activated trigger state from the activated subset of the one or more CSI trigger states, the one or more SRS trigger states, or the combination thereof based on the one-to-one mapping. In some implementations, for example, the base station 102, the RX processor 370, or the controller/processor 375 may execute the RS request response component 120 or the request receiving component 122 to determine that the UE initiated uplink RS request corresponds to the activated trigger state from the activated subset of the one or more CSI trigger states, the one or more SRS trigger states, or the combination thereof based on the one-to-one mapping. For example, when the uplink resource is a PRACH, the trigger state may be mapped to a PRACH preamble, a PRACH occasion, or a combination thereof. The PRACH may be one of a contention based PRACH, a non-contention based PRACH, or a two-step PRACH. As another example, when the uplink resource is a PUCCH, the trigger state may be mapped to a UCI code point, a PUCCH occasion, or a combination thereof. As another example, when the uplink resource is a MAC-CE, the trigger state may be mapped to a bit field of the MAC-CE. Accordingly, the base station 102, the RX processor 370, or the controller/processor 375 executing the RS request response component 120 or the request receiving component 122 may provide means for determining that the UE initiated uplink RS request corresponds to an activated trigger state from the activated subset of the one or more CSI trigger states, the one or more SRS trigger states, or the combination thereof based on the one-to-one mapping.

At block 2450, the method 2400 may optionally include transmitting a DCI scheduling the at least one reference signal. In some implementations, for example, the base station 102, TX processor 316, the RX processor 370, or the controller/processor 375 may execute the RS request response component 120 or the response transmitter 1864 to transmit a DCI scheduling the at least one reference signal. In some implementations, the DCI includes a SRS request. In some implementations, the DCI includes a CSI request. Accordingly, the base station 102, TX processor 316, or the controller/processor 375 executing the RS request response component 120 or the response transmitter 1864 may provide means for transmitting a DCI scheduling the at least one reference signal.

At block 2460, the method 2400 may optionally include communicating the at least one reference signal corresponding to the trigger state in response to the uplink request. In some implementations, for example, the base station 102, TX processor 316, the RX processor 370, or the controller/processor 375 may execute the RS request response component 120 or the RS communication component 124 to communicate the at least one reference signal corresponding to the trigger state in response to the uplink request. In some implementations, at sub-block 2462, the block 2360 may optionally include receiving an SRS. For instance, the SRS receiver 1856 may receive the SRS when the uplink request indicates an SRS trigger state. In some implementations, at sub-block 2464 the block 2460 or the sub-block 2462 may include receiving the SRS at a time offset after the uplink request. For example, where the UE 104 is not configured to receive a grant, the SRS receiver 1856 may receive the SRS at a time offset after the uplink request. The time offset may be associated with the trigger state. In some implementations, at sub-block 2466, the block 2460 may optionally include transmitting a CSI-RS. For instance, the CSI-RS transmitter 1854 may transmit the CSI-RS when the uplink request indicates a CSI trigger state. In some implementations, at sub-block 2468, the block 2460 or the sub-block 2466 may include transmitting the CSI-RS at a time offset after the uplink request. For example, where the UE 104 is not configured to receive a grant, the CSI-RS transmitter 1854 may transmit the CSI-RS at a time offset after the uplink request. The time offset may be associated with the trigger state. Accordingly, the base station 102, TX processor 316, the RX processor 370, or the controller/processor 375 executing the RS request response component 120 or the RS communication component 124 may provide means for communicating the at least one reference signal corresponding to the trigger state in response to the uplink request.

At block 2470, the method 2400 may optionally include receiving a CSI report. In some implementations, for example, base station 102, the RX processor 370, or the controller/processor 375 may execute the RS request response component 120 or the report component 147 to receive the CSI report. Accordingly, the base station 102, the RX processor 370, or the controller/processor 375 executing the RS request response component 120 or the report component 147 may provide means for receiving a CSI report.

Some Further Example Clauses

Implementation examples are described in the following numbered clauses:

1. A method of wireless communication at an apparatus of a user equipment (UE), including:
   transmitting an uplink request for at least one reference signal, the uplink request indicating a trigger state for the UE; and
   communicating the at least one reference signal corresponding to the trigger state in response to the uplink request.
2. The method of clause 1, further including receiving a downlink control information (DCI) scheduling the at least one reference signal.
3. The method of clause 2, where the DCI includes a sounding reference signal (SRS) request.
4. The method of clause 2, where the DCI includes a channel state information (CSI) request.
5. The method of any of clauses 1-4, where transmitting the uplink request includes transmitting the uplink request on an uplink resource defined by a mapping from the trigger state to the uplink resource.
6. The method of clause 5, where the uplink resource is a physical random access channel (PRACH) and the trigger state is mapped to a PRACH preamble, a PRACH occasion, or a combination thereof.
7. The method of clause 6, where the PRACH is one of a contention based PRACH, a non-contention based PRACH, or a two-step PRACH.
8. The method of clause 5, where the uplink resource is a physical uplink control channel (PUCCH) and the trigger state is mapped to an uplink control information (UCI) code point, a PUCCH occasion, or a combination thereof.
9. The method of clause 5, where the uplink resource is a media access control (MAC) control element (CE) and the trigger state is mapped to a bit field of the MAC-CE.
10. The method of any of clauses 1-9, where communicating the at least one reference signal includes transmitting a sounding reference signal (SRS).
11. The method of clause 10, where transmitting the SRS includes transmitting the SRS at a time offset after the uplink request.
12. The method of clause 11, where the time offset is associated with the trigger state.
13. The method of any of clauses 1-12, where communicating the at least one reference signal includes receiving a channel state information reference signal (CSI-RS).
14. The method of clause 13, where receiving the CSI-RS includes receiving the CSI-RS at a time offset after the uplink request.
15. The method of clause 14, where the time offset is associated with the trigger state.
16. The method of any of clauses 1-15, further including:
   receiving a radio resource control (RRC) configuration message indicating one or more CSI trigger states or SRS trigger states for the uplink request for the at least one reference signal; and
   receiving a media access control (MAC) control element (CE) that activates a subset of the one or more CSI trigger states or SRS trigger states, where there is a one-to-one mapping between activated trigger states and physical uplink resources, and where transmitting the uplink request for the at least one reference signal is on a physical uplink resource corresponding to the indicated trigger state of the UE.
17. The method of clause 16, where the one or more CSI trigger states or the one or more SRS trigger states are also for a downlink scheduled reference signal.
18. The method of clause 17, where the MAC-CE also activates the subset of the one or more CSI trigger states or the one or more SRS trigger states for the downlink scheduled reference signal.
19. The method of clause 16, where the MAC-CE activates the subset of the one or more CSI trigger states or the one or more SRS trigger states only for uplink requests for reference signals.
20. The method of clause 19, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.
21. The method of clause 16, where the one or more CSI trigger states are separate from a configuration of CSI trigger states for downlink scheduled CSI-RS or the one or more SRS trigger states are separate from a configuration of SRS trigger states for downlink scheduled SRS.
22. The method of clause 21, where the MAC-CE activates the one or more CSI trigger states or the one or more SRS trigger states for different component carriers.
23. The method of clause 22, where the MAC-CE includes a request identifier (ID), a serving cell ID, and a bandwidth part ID for each of the different component carriers.
24. An apparatus of a user equipment (UE) for wireless communication, including:
   an interface; and
   a processing system coupled to the interface and configured to:
      output an uplink request for at least one reference signal, the uplink request indicating a trigger state for the UE; and
      communicate, via the interface, the at least one reference signal corresponding to the trigger state in response to the uplink request.
25. The apparatus of clause 24, where the interface is further configured to obtain a downlink control information (DCI) scheduling the at least one reference signal.
26. The apparatus of clause 25, where the DCI includes a sounding reference signal (SRS) request.
27. The apparatus of clause 25, where the DCI includes a channel state information (CSI) request.
28. The apparatus of any of clauses 24-27, where the outputting the uplink request includes transmitting the uplink request on an uplink resource defined by a mapping from the trigger state to the uplink resource.
29. The apparatus of clause 28, where the uplink resource is a physical random access channel (PRACH) and the trigger state is mapped to a PRACH preamble, a PRACH occasion, or a combination thereof.
30. The apparatus of clause 29, where the PRACH is one of a contention based PRACH, a non-contention based PRACH, or a two-step PRACH.
31. The apparatus of clause 28, where the uplink resource is a physical uplink control channel (PUCCH) and the trigger state is mapped to an uplink control information (UCI) code point, a PUCCH occasion, or a combination thereof.
32. The apparatus of clause 28, where the uplink resource is a media access control (MAC) control element (CE) and the trigger state is mapped to a bit field of the MAC-CE.
33. The apparatus of any of clauses 24-32, where the communicating the at least one reference signal includes transmitting a sounding reference signal (SRS).

34. The apparatus of clause 33, where the transmitting the SRS occurs at a time offset after the uplink request.
35. The apparatus of clause 34, where the time offset is associated with the trigger state.
36. The apparatus of any of clauses 24-36, where the communicating the at least one reference signal includes receiving a channel state information reference signal (CSI-RS).
37. The apparatus of clause 36, where the receiving the CSI-RS occurs at a time offset after the uplink request.
38. The apparatus of clause 37, where the time offset is associated with the trigger state.
39. The apparatus of any of clauses 24-38, where the interface is further configured to:
  obtain a radio resource control (RRC) configuration message indicating one or more CSI trigger states or SRS trigger states for the uplink request for the at least one reference signal; and
  obtain a media access control (MAC) control element (CE) that activates a subset of the one or more CSI trigger states or SRS trigger states,
  where there is a one-to-one mapping between activated trigger states and physical uplink resources, and where outputting the uplink request for the at least one reference signal is on a physical uplink resource corresponding to the indicated trigger state of the UE.
40. The apparatus of clause 39, where the one or more CSI trigger states or the one or more SRS trigger states are also for a downlink scheduled reference signal.
41. The apparatus of clause 40, where the MAC-CE also activates the subset of the one or more CSI trigger states or the one or more SRS trigger states for the downlink scheduled reference signal.
42. The apparatus of clause 39, where the MAC-CE activates the subset of the one or more CSI trigger states or the one or more SRS trigger states only for uplink requests for reference signals.
43. The apparatus of clause 42, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.
44. The apparatus of clause 39, where the one or more CSI trigger states are separate from a configuration of CSI trigger states for downlink scheduled CSI-RS or the one or more SRS trigger states are separate from a configuration of SRS trigger states for downlink scheduled SRS.
45. The apparatus of clause 44, where the MAC-CE activates the one or more CSI trigger states or the one or more SRS trigger states for different component carriers.
46. The apparatus of clause 45, where the MAC-CE includes a request identifier (ID), a serving cell ID, and a bandwidth part ID for each of the different component carriers.
47. An apparatus of a user equipment (UE) for wireless communication, including:
  means for transmitting an uplink request for at least one reference signal, the uplink request indicating a trigger state for the UE; and
  means for communicating the at least one reference signal corresponding to the trigger state in response to the uplink request.
48. The apparatus of clause 47, further including means for receiving a downlink control information (DCI) scheduling the at least one reference signal.
49. The apparatus of clause 48, where the DCI includes a sounding reference signal (SRS) request.
50. The apparatus of clause 48, where the DCI includes a channel state information (CSI) request.
51. The apparatus of any of clauses 47-50, where the means for transmitting the uplink request is configured to transmit the uplink request on an uplink resource defined by a mapping from the trigger state to the uplink resource.
52. The apparatus of clause 51, where the uplink resource is a physical random access channel (PRACH) and the trigger state is mapped to a PRACH preamble, a PRACH occasion, or a combination thereof.
53. The apparatus of clause 52, where the PRACH is one of a contention based PRACH, a non-contention based PRACH, or a two-step PRACH.
54. The apparatus of clause 51, where the uplink resource is a physical uplink control channel (PUCCH) and the trigger state is mapped to an uplink control information (UCI) code point, a PUCCH occasion, or a combination thereof.
55. The apparatus of clause 51, where the uplink resource is a media access control (MAC) control element (CE) and the trigger state is mapped to a bit field of the MAC-CE.
56. The apparatus of any of clauses 47-55, where the means for communicating the at least one reference signal is configured to transmit a sounding reference signal (SRS).
57. The apparatus of clause 56, where the communicating the at least one reference signal is configured to transmit the SRS at a time offset after the uplink request.
58. The apparatus of clause 57, where the time offset is associated with the trigger state.
59. The apparatus of any of clause 47, where the means for communicating the at least one reference signal is configured to receive a channel state information reference signal (CSI-RS).
60. The apparatus of clause 59, where the means communicating the at least one reference signal is configured to receive the CSI-RS at a time offset after the uplink request.
61. The apparatus of clause 60, where the time offset is associated with the trigger state.
62. The apparatus of any of clauses 47-61, further including:
  means for receiving a radio resource control (RRC) configuration message indicating one or more CSI trigger states or SRS trigger states for the uplink request for the at least one reference signal; and
  means for receiving a media access control (MAC) control element (CE) that activates a subset of the one or more CSI trigger states or SRS trigger states, where there is a one-to-one mapping between activated trigger states and physical uplink resources, and where transmitting the uplink request for the at least one reference signal is on a physical uplink resource corresponding to the indicated trigger state of the UE.
63. The apparatus of clause 62, where the one or more CSI trigger states or the one or more SRS trigger states are also for a downlink scheduled reference signal.
64. The apparatus of clause 63, where the MAC-CE also activates the subset of the one or more CSI trigger states or the one or more SRS trigger states for the downlink scheduled reference signal.
65. The apparatus of clause 62, where the MAC-CE activates the subset of the one or more CSI trigger states or the one or more SRS trigger states only for uplink requests for reference signals.
66. The apparatus of clause 65, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.

67. The apparatus of clause 62, where the one or more CSI trigger states are separate from a configuration of CSI trigger states for downlink scheduled CSI-RS or the one or more SRS trigger states are separate from a configuration of SRS trigger states for downlink scheduled SRS.

68. The apparatus of clause 67, where the MAC-CE activates the one or more CSI trigger states or the one or more SRS trigger states for different component carriers.

69. The apparatus of clause 68, where the MAC-CE includes a request identifier (ID), a serving cell ID, and a bandwidth part ID for each of the different component carriers.

70. A non-transitory computer-readable medium including stored instructions for wireless communication at an apparatus of a user equipment (UE), executable by a processor to:
transmit an uplink request for at least one reference signal, the uplink request indicating a trigger state for the UE; and
communicate the at least one reference signal corresponding to the trigger state in response to the uplink request.

71. The non-transitory computer-readable medium of clause 70, where the instructions are further executable by the processor to receive a downlink control information (DCI) scheduling the at least one reference signal.

72. The non-transitory computer-readable medium of clause 71, where the DCI includes a sounding reference signal (SRS) request.

73. The non-transitory computer-readable medium of clause 71, where the DCI includes a channel state information (CSI) request.

74. The non-transitory computer-readable medium of any of clauses 70-73, where to transmit the uplink request includes to transmit the uplink request on an uplink resource defined by a mapping from the trigger state to the uplink resource.

75. The non-transitory computer-readable medium of clause 74, where the uplink resource is a physical random access channel (PRACH) and the trigger state is mapped to a PRACH preamble, a PRACH occasion, or a combination thereof.

76. The non-transitory computer-readable medium of clause 75, where the PRACH is one of a contention based PRACH, a non-contention based PRACH, or a two-step PRACH.

77. The non-transitory computer-readable medium of clause 74, where the uplink resource is a physical uplink control channel (PUCCH) and the trigger state is mapped to an uplink control information (UCI) code point, a PUCCH occasion, or a combination thereof.

78. The non-transitory computer-readable medium of clause 74, where the uplink resource is a media access control (MAC) control element (CE) and the trigger state is mapped to a bit field of the MAC-CE.

79. The non-transitory computer-readable medium of any of clauses 70-78, where to communicate the at least one reference signal includes to transmit a sounding reference signal (SRS).

80. The non-transitory computer-readable medium of clause 79, where to transmit the SRS includes to transmit the SRS at a time offset after the uplink request.

81. The non-transitory computer-readable medium of clause 80, where the time offset is associated with the trigger state.

82. The non-transitory computer-readable medium of any of clauses 70-81, where to communicate the at least one reference signal includes receiving a channel state information reference signal (CSI-RS).

83. The non-transitory computer-readable medium of clause 82, where receiving the CSI-RS includes receiving the CSI-RS at a time offset after the uplink request.

84. The non-transitory computer-readable medium of clause 83, where the time offset is associated with the trigger state.

85. The non-transitory computer-readable medium of any of clauses 70-84, where the instructions are further executable by the processor to:
receive a radio resource control (RRC) configuration message indicating one or more CSI trigger states or SRS trigger states for the uplink request for the at least one reference signal; and
receive a media access control (MAC) control element (CE) that activates a subset of the one or more CSI trigger states or SRS trigger states,
where there is a one-to-one mapping between activated trigger states and physical uplink resources, and where transmitting the uplink request for the at least one reference signal is on a physical uplink resource corresponding to the indicated trigger state of the UE.

86. The non-transitory computer-readable medium of clause 85, where the one or more CSI trigger states or the one or more SRS trigger states are also for a downlink scheduled reference signal.

87. The non-transitory computer-readable medium of clause 86, where the MAC-CE also activates the subset of the one or more CSI trigger states or the one or more SRS trigger states for the downlink scheduled reference signal.

88. The non-transitory computer-readable medium of clause 85, where the MAC-CE activates the subset of the one or more CSI trigger states or the one or more SRS trigger states only for uplink requests for reference signals.

89. The non-transitory computer-readable medium of clause 88, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.

90. The non-transitory computer-readable medium of clause 85, where the one or more CSI trigger states are separate from a configuration of CSI trigger states for downlink scheduled CSI-RS or the one or more SRS trigger states are separate from a configuration of SRS trigger states for downlink scheduled SRS.

91. The non-transitory computer-readable medium of clause 90, where the MAC-CE activates the one or more CSI trigger states or the one or more SRS trigger states for different component carriers.

92. The non-transitory computer-readable medium of clause 91, where the MAC-CE includes a request identifier (ID), a serving cell ID, and a bandwidth part ID for each of the different component carriers.

93. A method of wireless communication at an apparatus of a base station, including:
receiving, from a user equipment (UE), an uplink request for at least one reference signal, the uplink request indicating a trigger state for the UE; and
communicating the at least one reference signal corresponding to the trigger state in response to the uplink request.

94. The method of clause 93, further including transmitting a downlink control information (DCI) scheduling the at least one reference signal.

95. The method of clause 94, where the DCI includes a sounding reference signal (SRS) request.

96. The method of clause 94, where the DCI includes a channel state information (CSI) request.

97. The method of any of clauses 93-96, where receiving the uplink request includes determining the trigger state based on a mapping between the trigger state and an uplink resource on which the uplink request is received.

98. The method of clause 97, where the uplink resource is a physical random access channel (PRACH) and the trigger state is mapped to a PRACH preamble, a PRACH occasion, or a combination thereof.

99. The method of clause 98, where the PRACH is one of a contention based PRACH, a non-contention based PRACH, or a two-step PRACH.

100. The method of clause 97, where the uplink resource is a physical uplink control channel (PUCCH) and the trigger state is mapped to an uplink control information (UCI) code point, a PUCCH occasion, or a combination thereof.

101. The method of clause 97, where the uplink resource is a media access control (MAC) control element (CE) and the trigger state is mapped to a bit field of the MAC-CE.

102. The method of any of clauses 93-101, where communicating the at least one reference signal includes receiving a sounding reference signal (SRS).

103. The method of clause 102, where receiving the SRS includes receiving the SRS at a time offset after the uplink request.

104. The method of clause 103, where the time offset is associated with the trigger state.

105. The method of any of clauses 93-104, where communicating the at least one reference signal includes transmitting a channel state information reference signal (CSI-RS).

106. The method of clause 105, where transmitting the CSI-RS includes transmitting the CSI-RS at a time offset after the uplink request.

107. The method of clause 106, where the time offset is associated with the trigger state.

108. The method of any of clauses 93-107, further including:
    transmitting a radio resource control (RRC) configuration message indicating one or more CSI trigger states or SRS trigger states for the uplink request for the at least one reference signal; and
    transmitting a media access control (MAC) control element (CE) that activates a subset of the one or more CSI trigger states or SRS trigger states,
where there is a one-to-one mapping between activated trigger states and physical uplink resources, and where receiving the uplink request for the at least one reference signal is on a physical uplink resource corresponding to the indicated trigger state of the UE.

109. The method of clause 108, where the one or more CSI trigger states or the one or more SRS trigger states are also for a downlink scheduled reference signal.

110. The method of clause 109, where the MAC-CE also activates the subset of the one or more CSI trigger states or the one or more SRS trigger states for the downlink scheduled reference signal.

111. The method of clause 108, where the MAC-CE activates the subset of the one or more CSI trigger states or the one or more SRS trigger states only for uplink requests for reference signals.

112. The method of clause 111, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.

113. The method of clause 108, where the one or more CSI trigger states are separate from a configuration of CSI trigger states for downlink scheduled CSI-RS or the one or more SRS trigger states are separate from a configuration of SRS trigger states for downlink scheduled SRS.

114. The method of clause 113, where the MAC-CE activates the one or more CSI trigger states or the one or more SRS trigger states for different component carriers.

115. The method of clause 114, where the MAC-CE includes a request identifier (ID), a serving cell ID, and a bandwidth part ID for each of the different component carriers.

116. An apparatus of a base station for wireless communication, including:
    an interface; and
    a processing system coupled to the interface and configured to:
        obtain an uplink request for at least one reference signal, the uplink request indicating a trigger state for a user equipment (UE); and
        communicate the at least one reference signal corresponding to the trigger state in response to the uplink request.

117. The apparatus of clause 116, where the interface is further configured to output a downlink control information (DCI) scheduling the at least one reference signal.

118. The apparatus of clause 117, where the DCI includes a sounding reference signal (SRS) request.

119. The apparatus of clause 117, where the DCI includes a channel state information (CSI) request.

120. The apparatus of any of clauses 116-119, where the obtaining the uplink request includes determining the trigger state based on a mapping between the trigger state and an uplink resource on which the uplink request is received.

121. The apparatus of clause 120, where the uplink resource is a physical random access channel (PRACH) and the trigger state is mapped to a PRACH preamble, a PRACH occasion, or a combination thereof.

122. The apparatus of clause 121, where the PRACH is one of a contention based PRACH, a non-contention based PRACH, or a two-step PRACH.

123. The apparatus of clause 120, where the uplink resource is a physical uplink control channel (PUCCH) and the trigger state is mapped to an uplink control information (UCI) code point, a PUCCH occasion, or a combination thereof.

124. The apparatus of clause 120, where the uplink resource is a media access control (MAC) control element (CE) and the trigger state is mapped to a bit field of the MAC-CE.

125. The apparatus of any of clauses 116-124, where the communicating the at least one reference signal includes receiving a sounding reference signal (SRS).

126. The apparatus of clause 125, where the receiving the SRS occurs at a time offset after the uplink request.

127. The apparatus of clause 126, where the time offset is associated with the trigger state.

128. The apparatus of any of clauses 116-127, where the communicating the at least one reference signal includes transmitting a channel state information reference signal (CSI-RS).

129. The apparatus of clause 128, where the transmitting the CSI-RS occurs at a time offset after the uplink request.

130. The apparatus of clause 129, where the time offset is associated with the trigger state.

131. The apparatus of any of clauses 116-130, where the interface is further configured to:
    output a radio resource control (RRC) configuration message indicating one or more CSI trigger states or SRS trigger states for the uplink request for the at least one reference signal; and
    output a media access control (MAC) control element (CE) that activates a subset of the one or more CSI trigger states or SRS trigger states, where there is a one-to-one mapping between activated trigger states and physical uplink resources, and where obtaining the uplink request for the at least one reference signal is on a physical uplink resource corresponding to the indicated trigger state of the UE.

132. The apparatus of clause 131, where the one or more CSI trigger states or the one or more SRS trigger states are also for a downlink scheduled reference signal.

133. The apparatus of clause 132, where the MAC-CE also activates the subset of the one or more CSI trigger states or the one or more SRS trigger states for the downlink scheduled reference signal.

134. The apparatus of clause 131, where the MAC-CE activates the subset of the one or more CSI trigger states or the one or more SRS trigger states only for uplink requests for reference signals.

135. The apparatus of clause 134, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.

136. The apparatus of clause 131, where the one or more CSI trigger states are separate from a configuration of CSI trigger states for downlink scheduled CSI-RS or the one or more SRS trigger states are separate from a configuration of SRS trigger states for downlink scheduled SRS.

137. The apparatus of clause 136, where the MAC-CE activates the one or more CSI trigger states or the one or more SRS trigger states for different component carriers.

138. The apparatus of clause 137, where the MAC-CE includes a request identifier (ID), a serving cell ID, and a bandwidth part ID for each of the different component carriers.

139. An apparatus for wireless communication at an apparatus of a base station, including:
  means for receiving, from a user equipment (UE), an uplink request for at least one reference signal, the uplink request indicating a trigger state for the UE; and
  means for communicating the at least one reference signal corresponding to the trigger state in response to the uplink request.

140. The apparatus of clause 139, further including means for transmitting a downlink control information (DCI) scheduling the at least one reference signal.

141. The apparatus of clause 140, where the DCI includes a sounding reference signal (SRS) request.

142. The apparatus of clause 140, where the DCI includes a channel state information (CSI) request.

143. The apparatus of any of clauses 139-142, where the means for receiving the uplink request is configured to determine the trigger state based on a mapping between the trigger state and an uplink resource on which the uplink request is received.

144. The apparatus of clause 143, where the uplink resource is a physical random access channel (PRACH) and the trigger state is mapped to a PRACH preamble, a PRACH occasion, or a combination thereof.

145. The apparatus of clause 144, where the PRACH is one of a contention based PRACH, a non-contention based PRACH, or a two-step PRACH.

146. The apparatus of clause 143, where the uplink resource is a physical uplink control channel (PUCCH) and the trigger state is mapped to an uplink control information (UCI) code point, a PUCCH occasion, or a combination thereof.

147. The apparatus of clause 143, where the uplink resource is a media access control (MAC) control element (CE) and the trigger state is mapped to a bit field of the MAC-CE.

148. The apparatus of any of clauses 139-147, where the means for communicating the at least one reference signal is configured to receive a sounding reference signal (SRS).

149. The apparatus of clause 148, where the means for communicating the at least one reference signal is configured to receive the SRS at a time offset after the uplink request.

150. The apparatus of clause 149, where the time offset is associated with the trigger state.

151. The apparatus of any of clauses 139-150, where the means for communicating the at least one reference signal is configured to transmit a channel state information reference signal (CSI-RS).

152. The apparatus of clause 151, the means for communicating the at least one reference signal is configured to transmit the CSI-RS at a time offset after the uplink request.

153. The apparatus of clause 152, where the time offset is associated with the trigger state.

154. The apparatus of any of clauses 139-153, further including:
  means for transmitting a radio resource control (RRC) configuration message indicating one or more CSI trigger states or SRS trigger states for the uplink request for the at least one reference signal; and
  means for transmitting a media access control (MAC) control element (CE) that activates a subset of the one or more CSI trigger states or SRS trigger states, where there is a one-to-one mapping between activated trigger states and physical uplink resources, and where receiving the uplink request for the at least one reference signal is on a physical uplink resource corresponding to the indicated trigger state of the UE.

155. The apparatus of clause 154, where the one or more CSI trigger states or the one or more SRS trigger states are also for a downlink scheduled reference signal.

156. The apparatus of clause 155, where the MAC-CE also activates the subset of the one or more CSI trigger states or the one or more SRS trigger states for the downlink scheduled reference signal.

157. The apparatus of clause 154, where the MAC-CE activates the subset of the one or more CSI trigger states or the one or more SRS trigger states only for uplink requests for reference signals.

158. The apparatus of clause 157, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.

159. The apparatus of clause 154, where the one or more CSI trigger states are separate from a configuration of CSI trigger states for downlink scheduled CSI-RS or the one or more SRS trigger states are separate from a configuration of SRS trigger states for downlink scheduled SRS.

160. The apparatus of clause 159, where the MAC-CE activates the one or more CSI trigger states or the one or more SRS trigger states for different component carriers.

161. The apparatus of clause 160, where the MAC-CE includes a request identifier (ID), a serving cell ID, and a bandwidth part ID for each of the different component carriers.

162. A non-transitory computer-readable medium including stored instructions for wireless communication at an apparatus of a base station, executable by a processor to:

receive, from a user equipment (UE), an uplink request for at least one reference signal, the uplink request indicating a trigger state for the UE; and communicate the at least one reference signal corresponding to the trigger state in response to the uplink request.

163. The non-transitory computer-readable medium of clause 162, where the instructions are further executable by the processor to transmit a downlink control information (DCI) scheduling the at least one reference signal.

164. The non-transitory computer-readable medium of clause 163, where the DCI includes a sounding reference signal (SRS) request.

165. The non-transitory computer-readable medium of clause 163, where the DCI includes a channel state information (CSI) request.

166. The non-transitory computer-readable medium of any of clauses 162-165, where to receive the uplink request includes determining the trigger state based on a mapping between the trigger state and an uplink resource on which the uplink request is received.

167. The non-transitory computer-readable medium of clause 166, where the uplink resource is a physical random access channel (PRACH) and the trigger state is mapped to a PRACH preamble, a PRACH occasion, or a combination thereof.

168. The non-transitory computer-readable medium of clause 167, where the PRACH is one of a contention based PRACH, a non-contention based PRACH, or a two-step PRACH.

169. The non-transitory computer-readable medium of clause 166, where the uplink resource is a physical uplink control channel (PUCCH) and the trigger state is mapped to an uplink control information (UCI) code point, a PUCCH occasion, or a combination thereof.

170. The non-transitory computer-readable medium of clause 166, where the uplink resource is a media access control (MAC) control element (CE) and the trigger state is mapped to a bit field of the MAC-CE.

171. The non-transitory computer-readable medium of any of clauses 162-170, where to communicate the at least one reference signal includes to receive a sounding reference signal (SRS).

172. The non-transitory computer-readable medium of clause 171, where to receive the SRS includes receiving the SRS at a time offset after the uplink request.

173. The non-transitory computer-readable medium of clause 172, where the time offset is associated with the trigger state.

174. The non-transitory computer-readable medium of any of clauses 162-173, where to communicate the at least one reference signal includes transmitting a channel state information reference signal (CSI-RS).

175. The non-transitory computer-readable medium of clause 174, where transmitting the CSI-RS includes transmitting the CSI-RS at a time offset after the uplink request.

176. The non-transitory computer-readable medium of clause 175, where the time offset is associated with the trigger state.

177. The non-transitory computer-readable medium of any of clauses 162-176, where the instructions are further executable by the processor to:

transmit a radio resource control (RRC) configuration message indicating one or more CSI trigger states or SRS trigger states for the uplink request for the at least one reference signal; and transmit a media access control (MAC) control element (CE) that activates a subset of the one or more CSI trigger states or SRS trigger states, where there is a one-to-one mapping between activated trigger states and physical uplink resources, and where receiving the request for the at least one reference signal is on a physical uplink resource corresponding to the indicated trigger state of the UE.

178. The non-transitory computer-readable medium of clause 177, where the one or more CSI trigger states or the one or more SRS trigger states are also for a downlink scheduled reference signal.

179. The non-transitory computer-readable medium of clause 178, where the MAC-CE also activates the subset of the one or more CSI trigger states or the one or more SRS trigger states for the downlink scheduled reference signal.

180. The non-transitory computer-readable medium of clause 177, where the MAC-CE activates the subset of the one or more CSI trigger states or the one or more SRS trigger states only for uplink requests for reference signals.

181. The non-transitory computer-readable medium of clause 180, where the MAC-CE downselects the subset of the one or more CSI trigger states or the one or more SRS trigger states only for uplink requests for reference signals from a set of one or more CSI trigger states or one or more SRS trigger states for a downlink scheduled reference signal.

182. The non-transitory computer-readable medium of clause 177, where the one or more CSI trigger states are separate from a configuration of CSI trigger states for downlink scheduled CSI-RS or the one or more SRS trigger states are separate from a configuration of SRS trigger states for downlink scheduled SRS.

183. The non-transitory computer-readable medium of clause 182, where the MAC-CE activates the one or more CSI trigger states or the one or more SRS trigger states for different component carriers.

184. The non-transitory computer-readable medium of clause 183, where the MAC-CE includes a request identifier (ID), a serving cell ID, and a bandwidth part ID for each of the different component carriers.

185. A method of wireless communication at an apparatus of a user equipment (UE), including:

receiving a radio resource control (RRC) configuration message indicating one or more channel state information (CSI) trigger states, one or more sounding reference signal (SRS) trigger states, or a combination thereof for a UE initiated uplink reference signal (RS) request;

receiving a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources;

selecting an activated trigger state from the activated subset of the one or more CSI trigger states, the one or more SRS trigger states, or the combination thereof; and transmitting the UE initiated uplink RS request on a physical uplink resource of the one or more physical uplink resources that corresponds to the selected activated trigger state.

186. The method of clause 185, where the one or more CSI trigger states, the one or more SRS trigger states, or the combination thereof is associated with a downlink scheduled reference signal.

187. The method of clause 186, where the MAC-CE activates the subset of the one or more CSI trigger states, the one or more SRS trigger states, or the combination thereof for the downlink scheduled reference signal.

188. The method of any of clauses 185-187, where the MAC-CE activates the subset of the one or more CSI trigger states, the one or more SRS trigger states, or the combination thereof for uplink RS requests.

189. The method of clause 188, where the MAC-CE downselects the subset of the one or more CSI trigger states, the one or more SRS trigger states, or the combination thereof for uplink RS requests from a set of the one or more CSI trigger states, the one or more SRS trigger states, or the combination thereof for a downlink scheduled reference signal.

190. The method of any of clauses 185, where:
  the one or more CSI trigger states are separate from a configuration of CSI trigger states for downlink scheduled CSI-RS, or
  the one or more SRS trigger states are separate from a configuration of SRS trigger states for downlink scheduled SRS.

191. The method of clause 190, where the MAC-CE activates the subset of the one or more CSI trigger states, the one or more SRS trigger states, or the combination thereof for different component carriers.

192. The method of clause 191, where the MAC-CE includes a request identifier (ID), a serving cell ID, and a bandwidth part ID for each of the different component carriers.

193. An apparatus of a user equipment (UE) for wireless communication, including: an interface configured to:
  obtain a radio resource control (RRC) configuration message indicating one or more channel state information (CSI) trigger states, one or more sounding reference signal (SRS) trigger states, or a combination thereof for a UE initiated uplink reference signal (RS) request; and
  obtain a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources; and
a processing system configured to:
  select an activated trigger state from the activated subset of the one or more CSI trigger states, the one or more SRS trigger states, or the combination thereof; and
  the interface further configured to output the UE initiated uplink RS request for transmission on a physical uplink resource of the one or more physical uplink resources that corresponds to the selected activated trigger state.

194. The apparatus of clause 193, where the one or more CSI trigger states, the one or more SRS trigger states, or the combination thereof are also for a downlink scheduled reference signal.

195. The apparatus of clause 194, where the MAC-CE also activates the subset of the one or more CSI trigger states, the one or more SRS trigger states, or the combination thereof for the downlink scheduled reference signal.

196. The apparatus of any of clauses 193, where the MAC-CE activates the subset of the one or more CSI trigger states, the one or more SRS trigger states, or the combination thereof for uplink RS requests.

197. The apparatus of clause 196, where the MAC-CE downselects the subset of the one or more CSI trigger states or the one or more SRS trigger states for uplink RS requests from a set of one or more CSI trigger states or one or more SRS trigger states for a downlink scheduled reference signal.

198. The apparatus of clause 193, where:
  the one or more CSI trigger states are separate from a configuration of CSI trigger states for downlink scheduled CSI-RS, or
  the one or more SRS trigger states are separate from a configuration of SRS trigger states for downlink scheduled SRS.

199. The apparatus of clause 198, where the MAC-CE activates the subset of the one or more CSI trigger states, the one or more SRS trigger states, or the combination thereof for different component carriers.

200. The apparatus of clause 199, where the MAC-CE includes a request identifier (ID), a serving cell ID, and a bandwidth part ID for each of the different component carriers.

201. An apparatus of a user equipment (UE) for wireless communication, including:
  means for receiving a radio resource control (RRC) configuration message indicating one or more channel state information (CSI) trigger states, one or more sounding reference signal (SRS) trigger states, or a combination thereof for a UE initiated uplink reference signal (RS) request;
  means for receiving a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources;
  means for selecting an activated trigger state from the activated subset of the one or more CSI trigger states, the one or more SRS trigger states, or the combination thereof; and
  means for transmitting the UE initiated uplink RS request on a physical uplink resource of the one or more physical uplink resources that corresponds to the selected activated trigger state.

202. The apparatus of clause 201, where the one or more CSI trigger states, the one or more SRS trigger states, or the combination thereof are also for a downlink scheduled reference signal.

203. The apparatus of clause 202, where the MAC-CE also activates the subset of the one or more CSI trigger states, the one or more SRS trigger states, or the combination thereof for the downlink scheduled reference signal.

204. The apparatus of clause 201, where the MAC-CE activates the subset of the one or more CSI trigger states, the one or more SRS trigger states, or the combination thereof for uplink RS requests.

205. The apparatus of clause 204, where the MAC-CE downselects the subset of the one or more CSI trigger states, the one or more SRS trigger states, or the combination thereof for uplink RS requests from a set of one or more CSI trigger states or one or more SRS trigger states for a downlink scheduled reference signal.

206. The apparatus of clause 201, where:
the one or more CSI trigger states are separate from a configuration of CSI trigger states for downlink scheduled CSI-RS, or
the one or more SRS trigger states are separate from a configuration of SRS trigger states for downlink scheduled SRS.

207. The apparatus of clause 206, where the MAC-CE activates the subset of the one or more CSI trigger states, the one or more SRS trigger states, or the combination thereof for different component carriers.

208. The apparatus of clause 207, where the MAC-CE includes a request identifier (ID), a serving cell ID, and a bandwidth part ID for each of the different component carriers.

209. A non-transitory computer-readable medium including stored instructions for wireless communication at an apparatus of a user equipment (UE), executable by a processor to:
receive a radio resource control (RRC) configuration message indicating one or more channel state information (CSI) trigger states, one or more sounding reference signal (SRS) trigger states, or a combination thereof for a UE initiated uplink reference signal (RS) request;
receive a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources;
select an activated trigger state from the activated subset of the one or more CSI trigger states, the one or more SRS trigger states, or the combination thereof; and
transmit the UE initiated uplink RS request on a physical uplink resource of the one or more physical uplink resources that corresponds to the selected activated trigger state based on the one-to-one mapping.

210. The non-transitory computer-readable medium of clause 209, where the one or more CSI trigger states, the one or more SRS trigger states, or the combination thereof are also for a downlink scheduled reference signal.

211. The non-transitory computer-readable medium of clause 210, where the MAC-CE also activates the subset of the one or more CSI trigger states, the one or more SRS trigger states, or the combination thereof for the downlink scheduled reference signal.

212. The non-transitory computer-readable medium of clause 209, where the MAC-CE activates the subset of the one or more CSI trigger states, the one or more SRS trigger states, or the combination thereof for uplink RS requests.

213. The non-transitory computer-readable medium of clause 212, where the MAC-CE downselects the subset of the one or more CSI trigger states, the one or more SRS trigger states, or the combination thereof from a set of one or more CSI trigger states or one or more SRS trigger states for a downlink scheduled reference signal.

214. The non-transitory computer-readable medium of clause 209, where:
the one or more CSI trigger states are separate from a configuration of CSI trigger states for downlink scheduled CSI-RS, or
the one or more SRS trigger states are separate from a configuration of SRS trigger states for downlink scheduled SRS.

215. The non-transitory computer-readable medium of clause 214, where the MAC-CE activates the one or more CSI trigger states, the one or more SRS trigger states, or the combination thereof for different component carriers.

216. The non-transitory computer-readable medium of clause 215, where the MAC-CE includes a request identifier (ID), a serving cell ID, and a bandwidth part ID for each of the different component carriers.

217. A method of wireless communication at an apparatus of a base station (BS), including:
transmitting a radio resource control (RRC) configuration message indicating one or more channel state information (CSI) trigger states, one or more sounding reference signal (SRS) trigger states, or a combination thereof for a UE initiated uplink reference signal (RS) request;
transmitting a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources;
receiving the UE initiated uplink RS request on a physical uplink resource of the one or more physical uplink resources; and
determining that the UE initiated uplink RS request corresponds to an activated trigger state from the activated subset of the one or more CSI trigger states, the one or more SRS trigger states, or the combination thereof based on the one-to-one mapping.

218. The method of clause 217, where the one or more CSI trigger states or the one or more SRS trigger states are also for a downlink scheduled reference signal.

219. The method of clause 218, where the MAC-CE also activates the subset of the one or more CSI trigger states or the one or more SRS trigger states for the downlink scheduled reference signal.

220. The method of clause 217, where the MAC-CE activates the subset of the one or more CSI trigger states or the one or more SRS trigger states only for uplink RS requests.

221. The method of clause 220, where the MAC-CE downselects the subset of the one or more CSI trigger states or the one or more SRS trigger states only for uplink RS requests from a set of one or more CSI trigger states or one or more SRS trigger states for a downlink scheduled reference signal.

222. The method of clause 217, where the one or more CSI trigger states are separate from a configuration of CSI trigger states for downlink scheduled CSI-RS or the one or more SRS trigger states are separate from a configuration of SRS trigger states for downlink scheduled SRS.

223. The method of clause 222, where the MAC-CE activates the one or more CSI trigger states or the one or more SRS trigger states for different component carriers.

224. The method of clause 223, where the MAC-CE includes a request identifier (ID), a serving cell ID, and a bandwidth part ID for each of the different component carriers.

225. An apparatus of a base station (BS) for wireless communication, including: at least one interface configured to:
output a radio resource control (RRC) configuration message indicating one or more channel state information (CSI) trigger states, one or more sounding reference signal (SRS) trigger states, or a combination thereof for a UE initiated uplink reference signal (RS) request;

output a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources; and obtain the UE initiated uplink RS request on a physical uplink resource of the one or more physical uplink resources; and a processing system configured to:

determine that the UE initiated uplink RS request corresponds to an activated trigger state from the activated subset of the one or more CSI trigger states, the one or more SRS trigger states, or the combination thereof based on the one-to-one mapping.

226. The apparatus of clause 225, where the one or more CSI trigger states, the one or more SRS trigger states, or the combination thereof are also for a downlink scheduled reference signal.

227. The apparatus of clause 226, where the MAC-CE also activates the subset of the one or more CSI trigger states, the one or more SRS trigger states, or the combination thereof for the downlink scheduled reference signal.

228. The apparatus of clause 225, where the MAC-CE activates the subset of the one or more CSI trigger states, the one or more SRS trigger states, or the combination thereof for uplink RS requests.

229. The apparatus of clause 228, where the MAC-CE downselects the subset of the one or more CSI trigger states, the one or more SRS trigger states, or the combination thereof for uplink RS requests from a set of one or more CSI trigger states or one or more SRS trigger states for a downlink scheduled reference signal.

230. The apparatus of clause 225, where:

the one or more CSI trigger states are separate from a configuration of CSI trigger states for downlink scheduled CSI-RS, or the one or more SRS trigger states are separate from a configuration of SRS trigger states for downlink scheduled SRS.

231. The apparatus of clause 230, where the MAC-CE activates the one or more CSI trigger states, the one or more SRS trigger states, or the combination thereof for different component carriers.

232. The apparatus of clause 231, where the MAC-CE includes a request identifier (ID), a serving cell ID, and a bandwidth part ID for each of the different component carriers.

233. An apparatus of a base station for wireless communication, including: means for transmitting a radio resource control (RRC) configuration message indicating one or more channel state information (CSI) trigger states, one or more sounding reference signal (SRS) trigger states, or a combination thereof for a UE initiated uplink reference signal (RS) request;

means for transmitting a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources;

means for receiving the UE initiated uplink RS request on a physical uplink resource of the one or more physical uplink resources; and means for determining that the UE initiated uplink RS request corresponds to an activated trigger state from the activated subset of the one or more CSI trigger states, the one or more SRS trigger states, or the combination thereof based on the one-to-one mapping.

234. The apparatus of clause 233, where the one or more CSI trigger states, the one or more SRS trigger states, or the combination thereof are also for a downlink scheduled reference signal.

235. The apparatus of clause 234, where the MAC-CE also activates the subset of the one or more CSI trigger states, the one or more SRS trigger states, or the combination thereof for the downlink scheduled reference signal.

236. The apparatus of clause 233, where the MAC-CE activates the subset of the one or more CSI trigger states, the one or more SRS trigger states, or the combination thereof for uplink RS requests.

237. The apparatus of clause 236, where the MAC-CE downselects the subset of the one or more CSI trigger states, the one or more SRS trigger states, or the combination thereof for uplink RS requests from a set of one or more CSI trigger states or one or more SRS trigger states for a downlink scheduled reference signal.

238. The apparatus of clause 233, where:

the one or more CSI trigger states are separate from a configuration of CSI trigger states for downlink scheduled CSI-RS, or the one or more SRS trigger states are separate from a configuration of SRS trigger states for downlink scheduled SRS.

239. The apparatus of clause 238, where the MAC-CE activates the one or more CSI trigger states, the one or more SRS trigger states, or the combination thereof for different component carriers.

240. The apparatus of clause 239, where the MAC-CE includes a request identifier (ID), a serving cell ID, and a bandwidth part ID for each of the different component carriers.

241. A non-transitory computer-readable medium including stored instructions for wireless communication at an apparatus of a base station, executable by a processor to: transmit a radio resource control (RRC) configuration message indicating one or more channel state information (CSI) trigger states, one or more sounding reference signal (SRS) trigger states, or a combination thereof for a UE initiated uplink reference signal (RS) request;

transmit a media access control (MAC) control element (CE) that activates a subset of the one or more CSI trigger states, the one or more SRS trigger states, or the combination thereof, where there is a one-to-one mapping between the activated subset of the one or more CSI trigger states, the one or more SRS trigger states, or the combination thereof and one or more physical uplink resources;

receive the UE initiated uplink RS request on a physical uplink resource of the one or more physical uplink resources; and determine that the UE initiated uplink RS request corresponds to an activated trigger state from the activated subset of the one or more CSI trigger states, the one or more SRS trigger states, or the combination thereof based on the one-to-one mapping.

242. The non-transitory computer-readable medium of clause 241, where the one or more CSI trigger states, the one or more SRS trigger states, or the combination thereof are also for a downlink scheduled reference signal.

243. The non-transitory computer-readable medium of clause 242, where the MAC-CE also activates the subset of the one or more CSI trigger states, the one or more SRS trigger states, or the combination thereof for the downlink scheduled reference signal.

244. The non-transitory computer-readable medium of clause 241, where the MAC-CE activates the subset oft the one or more CSI trigger states, the one or more SRS trigger states, or the combination thereof for uplink RS requests.

245. The non-transitory computer-readable medium of clause 244, where the MAC-CE downselects the subset of the one or more CSI trigger states, the one or more SRS trigger states, or the combination thereof for uplink RS requests from a set of one or more CSI trigger states or one or more SRS trigger states for a downlink scheduled reference signal.

246. The non-transitory computer-readable medium of clause 241, where:
  the one or more CSI trigger states are separate from a configuration of CSI trigger states for downlink scheduled CSI-RS, or
  the one or more SRS trigger states are separate from a configuration of SRS trigger states for downlink scheduled SRS.

247. The non-transitory computer-readable medium of clause 246, where the MAC-CE activates the one or more CSI trigger states, the one or more SRS trigger states, or the combination thereof for different component carriers.

248. The non-transitory computer-readable medium of clause 247, where the MAC-CE includes a request identifier (ID), a serving cell ID, and a bandwidth part ID for each of the different component carriers.

As used herein, "or" is used intended to be interpreted in the inclusive sense, unless otherwise explicitly indicated. For example, "a or b" may include a only, b only, or a combination of a and b. As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at an apparatus of a user equipment (UE), comprising:
   transmitting an uplink request for at least one reference signal, the uplink request indicating a trigger state for the UE, wherein transmitting the uplink request comprises transmitting the uplink request on an uplink resource based on a mapping from the trigger state to the uplink resource; and
   communicating the at least one reference signal corresponding to the trigger state in response to the uplink request.

2. The method of claim 1, further comprising receiving a downlink control information (DCI) scheduling the at least one reference signal.

3. The method of claim 1, wherein communicating the at least one reference signal comprises transmitting a sounding reference signal (SRS).

4. The method of claim 1, wherein communicating the at least one reference signal comprises receiving a channel state information reference signal (CSI-RS).

5. The method of claim 1, further comprising:
   receiving a radio resource control (RRC) configuration message indicating one or more channel state information (CSI) trigger states, one or more sounding reference signal (SRS) trigger states, or a combination thereof for a UE initiated uplink reference signal (RS) request; and
   receiving a media access control (MAC) control element (CE) that activates a subset of the one or more CSI trigger states, the one or more SRS trigger states, or the combination thereof,
   wherein the mapping from the trigger state to the uplink resource is a one-to-one mapping between the activated subset of the one or more CSI trigger states, the one or more SRS trigger states, or the combination thereof and one or more physical uplink resources, and wherein transmitting the uplink request for the at least one reference signal is on a physical uplink resource corresponding to the indicated trigger state of the UE.

6. The method of claim 5, further comprising selecting an activated trigger state from the activated subset of the one or more CSI trigger states, the one or more SRS trigger states, or the combination thereof, wherein the uplink request for at least one reference signal is transmitted on the physical uplink resource corresponding to the activated trigger state.

7. The method of claim 5, wherein the one or more CSI trigger states, the one or more SRS trigger states, or the combination thereof is associated with a downlink scheduled reference signal.

8. The method of claim 5, wherein the MAC-CE activates the subset of the one or more CSI trigger states, the one or more SRS trigger states, or the combination thereof for uplink RS requests.

9. The method of claim 5, wherein:
   the one or more CSI trigger states are separate from a configuration of CSI trigger states for downlink scheduled CSI-RS, or
   the one or more SRS trigger states are separate from a configuration of SRS trigger states for downlink scheduled SRS.

10. An apparatus of a user equipment (UE) for wireless communication, comprising:
    an interface; and
    a processing system coupled to the interface and configured to:
      output an uplink request for at least one reference signal, the uplink request indicating a trigger state for the UE, wherein the outputting the uplink request includes transmitting the uplink request on an uplink resource based on a mapping from the trigger state to the uplink resource; and
      communicate, via the interface, the at least one reference signal corresponding to the trigger state in response to the uplink request.

11. The apparatus of claim 10, wherein the interface is further configured to obtain a downlink control information (DCI) scheduling the at least one reference signal.

12. The apparatus of claim 10, wherein the communicating the at least one reference signal includes transmitting a sounding reference signal (SRS).

13. The apparatus of claim 10, wherein the communicating the at least one reference signal includes receiving a channel state information reference signal (CSI-RS).

14. The apparatus of claim 10, wherein the interface is further configured to:
    obtain a radio resource control (RRC) configuration message indicating one or more channel state information (CSI) trigger states, one or more sounding reference signal (SRS) trigger states, or a combination thereof for a UE initiated uplink reference signal (RS) request; and
    obtain a media access control (MAC) control element (CE) that activates a subset of the one or more CSI trigger states, the one or more SRS trigger states, or the combination thereof,
    wherein the mapping from the trigger state to the uplink resource is a one-to-one mapping between the activated subset of the one or more CSI trigger states, the one or more SRS trigger states, or the combination thereof and one or more physical uplink resources.

15. The apparatus of claim 14, wherein the processing system is further configured to select an activated trigger state from the activated subset of the one or more CSI trigger states, the one or more SRS trigger states, or the combination thereof, wherein the uplink request for the at least one reference signal is transmitted on the physical uplink resource corresponding to the activated trigger state.

16. The apparatus of claim 14, wherein the one or more CSI trigger states, the one or more SRS trigger states, or the combination thereof is associated with a downlink scheduled reference signal.

17. The apparatus of claim 14, wherein the MAC-CE activates the subset of the one or more CSI trigger states, the one or more SRS trigger states, or the combination thereof for uplink RS requests.

18. The apparatus of claim 14, wherein:
the one or more CSI trigger states are separate from a configuration of CSI trigger states for downlink scheduled CSI-RS, or
the one or more SRS trigger states are separate from a configuration of SRS trigger states for downlink scheduled SRS.

19. A method of wireless communication at an apparatus of a base station, comprising:
receiving, from a user equipment (UE), an uplink request for at least one reference signal, the uplink request indicating a trigger state for the UE, wherein receiving the uplink request comprises determining the trigger state based on a mapping between the trigger state and an uplink resource on which the uplink request is received; and
communicating the at least one reference signal corresponding to the trigger state in response to the uplink request.

20. The method of claim 19, further comprising transmitting a downlink control information (DCI) scheduling the at least one reference signal.

21. The method of claim 19, wherein communicating the at least one reference signal comprises receiving a sounding reference signal (SRS).

22. The method of claim 19, wherein communicating the at least one reference signal comprises transmitting a channel state information reference signal (CSI-RS).

23. The method of claim 19, further comprising:
transmitting a radio resource control (RRC) configuration message indicating one or more channel state information (CSI) trigger states, one or more sounding reference signal (SRS) trigger states, or a combination thereof for a UE initiated uplink reference signal (RS) request; and
transmitting a media access control (MAC) control element (CE) that activates a subset of the one or more CSI trigger states, the one or more SRS trigger states, or the combination thereof, wherein the mapping from the trigger state to the uplink resource is a one-to-one mapping between activated trigger states and physical uplink resources, and wherein receiving the uplink request for the at least one reference signal is on a physical uplink resource corresponding to the indicated trigger state of the UE.

24. The method of claim 23, further comprising determining that the UE initiated uplink RS request corresponds to an activated trigger state from the activated subset of the one or more CSI trigger states, the one or more SRS trigger states, or the combination thereof based on the one-to-one mapping.

25. An apparatus of a base station for wireless communication, comprising:
an interface; and
a processing system coupled to the interface and configured to:
obtain an uplink request for at least one reference signal, the uplink request indicating a trigger state for a user equipment (UE), wherein the obtaining the uplink request includes determining the trigger state based on a mapping between the trigger state and an uplink resource on which the uplink request is received; and
communicate the at least one reference signal corresponding to the trigger state in response to the uplink request.

26. The apparatus of claim 25, wherein the interface is further configured to:
output a radio resource control (RRC) configuration message indicating one or more channel state information (CSI) trigger states, one or more sounding reference signal (SRS) trigger states, or a combination thereof for a UE initiated uplink reference signal (RS) request; and
output a media access control (MAC) control element (CE) that activates a subset of the one or more CSI trigger states, the one or more SRS trigger states, or the combination thereof,
wherein the mapping from the trigger state to the uplink resource is a one-to-one mapping between the activated subset of the one or more CSI trigger states, the one or more SRS trigger states, or the combination thereof and one or more physical uplink resources, and
wherein obtaining the uplink request for the at least one reference signal is on a physical uplink resource corresponding to the indicated trigger state of the UE.

27. The apparatus of claim 26, wherein the processing system is configured to determine that the UE initiated uplink RS request corresponds to an activated trigger state from the activated subset of the one or more CSI trigger states, the one or more SRS trigger states, or the combination thereof based on the one-to-one mapping.

* * * * *